US012585771B2

(12) United States Patent
Zawadowskiy et al.

(10) Patent No.: US 12,585,771 B2
(45) Date of Patent: Mar. 24, 2026

(54) LEARNED CONTROL FLOW MONITORING AND ENFORCEMENT OF UNOBSERVED TRANSITIONS

(71) Applicant: Cisco Technology, Inc., San Jose, CA (US)

(72) Inventors: Andrew Zawadowskiy, Hollis, NH (US); Vincent E. Parla, North Hampton, NH (US); Oleg Bessonov, Littleton, MA (US)

(73) Assignee: Cisco Technology, Inc., San Jose, CA (US)

( * ) Notice: Subject to any disclaimer, the term of this patent is extended or adjusted under 35 U.S.C. 154(b) by 634 days.

(21) Appl. No.: 18/084,045

(22) Filed: Dec. 19, 2022

(65) Prior Publication Data

US 2024/0028742 A1      Jan. 25, 2024

Related U.S. Application Data

(60) Provisional application No. 63/391,518, filed on Jul. 22, 2022, provisional application No. 63/391,560, filed on Jul. 22, 2022.

(51) Int. Cl.
*G06F 21/56*          (2013.01)
*G06F 8/41*          (2018.01)
(Continued)

(52) U.S. Cl.
CPC ............ *G06F 21/566* (2013.01); *G06F 8/433* (2013.01); *G06F 8/75* (2013.01); *G06F 9/44589* (2013.01);
(Continued)

(58) Field of Classification Search
CPC .... G06F 21/566; G06F 8/433; G06F 9/44589; G06F 11/3616; G06F 21/51; G06F 21/53;
(Continued)

(56) References Cited

U.S. PATENT DOCUMENTS

| | | | |
|---|---|---|---|
| 5,933,640 A | 8/1999 | Dion | |
| 7,984,304 B1 | 7/2011 | Waldspurger | |

(Continued)

FOREIGN PATENT DOCUMENTS

| | | |
|---|---|---|
| CN | 110268411 A | 9/2019 |
| CN | 111062038 | 4/2020 |

(Continued)

OTHER PUBLICATIONS

Altinay, et al; "BinRec: Dynamic Binary Lifting and Recompilation", Proceedings of the 12th IEEE/ACM International Conference on Utility and Cloud Computing, Apr. 15, 2020, pp. 1-16.
(Continued)

*Primary Examiner* — Kaveh Abrishamkar
(74) *Attorney, Agent, or Firm* — Lee & Hayes, P.C.

(57) ABSTRACT

Techniques and systems described herein relate to monitoring executions of computer instructions on computing devices based on learning and generating a control flow directed graph. The techniques and systems include determining a learned control flow diagram for a process on a computing system and monitoring execution of the process on the computing system using the control flow diagram. An unobserved transition is determined based on the learned control flow diagram and the unobserved transition is classified as safe or unsafe based on a monitoring component analysis. An action is performed based on the safety classification and the learned control flow diagram.

18 Claims, 24 Drawing Sheets

100 ⟶

(51) Int. Cl.

| | |
|---|---|
| *G06F 8/75* | (2018.01) |
| *G06F 9/445* | (2018.01) |
| *G06F 11/3604* | (2025.01) |
| *G06F 21/51* | (2013.01) |
| *G06F 21/53* | (2013.01) |
| *G06F 21/54* | (2013.01) |
| *G06F 21/55* | (2013.01) |
| *G06F 21/57* | (2013.01) |
| *H04L 9/40* | (2022.01) |

(52) U.S. Cl.
CPC .......... *G06F 11/3616* (2013.01); *G06F 21/51* (2013.01); *G06F 21/53* (2013.01); *G06F 21/54* (2013.01); *G06F 21/552* (2013.01); *G06F 21/577* (2013.01); *H04L 63/1416* (2013.01); *H04L 63/1425* (2013.01); *H04L 63/1433* (2013.01); *G06F 2221/033* (2013.01)

(58) Field of Classification Search
CPC ...... G06F 21/54; G06F 21/552; G06F 21/577; G06F 2221/033; H04L 63/1416; H04L 63/1425; H04L 63/1433
See application file for complete search history.

(56) References Cited

U.S. PATENT DOCUMENTS

| | | | |
|---|---|---|---|
| 8,230,505 B1 | 7/2012 | Ahrens et al. | |
| 8,407,322 B1 | 3/2013 | Sasikumar et al. | |
| 8,682,985 B2 | 3/2014 | Pulla et al. | |
| 9,021,589 B2* | 4/2015 | Anderson | G06F 21/566 |
| | | | 713/189 |
| 9,158,915 B1 | 10/2015 | Yumer | |
| 9,454,659 B1* | 9/2016 | Daymont | G06F 21/566 |
| 9,696,989 B1 | 7/2017 | Korotaev | |
| 9,953,158 B1 | 4/2018 | Benameur et al. | |
| 10,084,815 B2 | 9/2018 | Falkowitz et al. | |
| 10,203,968 B1 | 2/2019 | Lawson | |
| 10,310,863 B1 | 6/2019 | Poimboeuf | |
| 10,691,575 B2 | 6/2020 | Lengauer et al. | |
| 10,706,144 B1 | 7/2020 | Moritz | |
| 10,915,636 B1 | 2/2021 | Kaplan | |
| 11,003,746 B1 | 5/2021 | Vashishtha et al. | |
| 11,018,959 B1 | 5/2021 | Neill | |
| 11,138,314 B1 | 10/2021 | Gettys et al. | |
| 11,349,670 B1 | 5/2022 | Miller | |
| 11,556,444 B1 | 1/2023 | Rohithakshappa et al. | |
| 11,556,452 B2 | 1/2023 | Danielson et al. | |
| 11,809,535 B2 | 11/2023 | Magi et al. | |
| 11,847,044 B2 | 12/2023 | Krishnan et al. | |
| 11,947,663 B2 | 4/2024 | Sethumadhavan et al. | |
| 11,971,807 B2 | 4/2024 | Kroehling | |
| 12,326,936 B2* | 6/2025 | Zawadowskiy | G06F 11/3612 |
| 2003/0078782 A1 | 4/2003 | Blair | |
| 2005/0010804 A1* | 1/2005 | Bruening | G06F 21/52 |
| | | | 726/1 |
| 2006/0161978 A1 | 7/2006 | Abadi et al. | |
| 2006/0174077 A1 | 8/2006 | Abadi et al. | |
| 2007/0160191 A1 | 7/2007 | Blair | |
| 2009/0055571 A1 | 2/2009 | Budko et al. | |
| 2009/0328211 A1* | 12/2009 | Abraham | G06F 21/54 |
| | | | 726/22 |
| 2010/0180258 A1 | 7/2010 | Takahashi | |
| 2010/0275186 A1 | 10/2010 | McGarvey et al. | |
| 2012/0066166 A1 | 3/2012 | Curbera et al. | |
| 2012/0222019 A1* | 8/2012 | Gounares | G06F 8/433 |
| | | | 717/136 |
| 2013/0031531 A1 | 1/2013 | Keynes | |
| 2013/0055210 A1 | 2/2013 | Murthy et al. | |
| 2013/0151831 A1 | 6/2013 | Bealkowski et al. | |
| 2013/0291113 A1 | 10/2013 | Dewey | |
| 2013/0326625 A1 | 12/2013 | Anderson et al. | |
| 2014/0337086 A1 | 11/2014 | Asenjo | |
| 2015/0161383 A1 | 6/2015 | Chen et al. | |

| | | | |
|---|---|---|---|
| 2015/0356294 A1 | 12/2015 | Tan | |
| 2016/0283712 A1 | 9/2016 | Kanhere et al. | |
| 2016/0300063 A1* | 10/2016 | Daymont | G06F 21/577 |
| 2017/0017789 A1* | 1/2017 | Daymont | G06F 21/566 |
| 2017/0024562 A1 | 1/2017 | Rombouts et al. | |
| 2017/0090929 A1 | 3/2017 | Muttik | |
| 2017/0116108 A1 | 4/2017 | Miskelly | |
| 2017/0169229 A1 | 6/2017 | Brucker et al. | |
| 2017/0185775 A1 | 6/2017 | Boehm et al. | |
| 2017/0212829 A1 | 7/2017 | Bales et al. | |
| 2017/0255416 A1 | 9/2017 | Zhang et al. | |
| 2017/0359220 A1 | 12/2017 | Weith | |
| 2018/0004946 A1 | 1/2018 | LeMay et al. | |
| 2018/0060209 A1 | 3/2018 | Kim | |
| 2018/0095764 A1 | 4/2018 | Sultana | |
| 2018/0096147 A1 | 4/2018 | Ince et al. | |
| 2018/0101565 A1 | 4/2018 | Pike | |
| 2018/0121654 A1 | 5/2018 | Bobritsky | |
| 2018/0211046 A1 | 7/2018 | Muttik et al. | |
| 2018/0225446 A1 | 8/2018 | Liu | |
| 2018/0316698 A1 | 11/2018 | David et al. | |
| 2018/0349603 A1 | 12/2018 | Yamada et al. | |
| 2019/0042730 A1 | 2/2019 | Yamada et al. | |
| 2019/0050566 A1 | 2/2019 | LeMay et al. | |
| 2019/0065743 A1 | 2/2019 | Shibahara et al. | |
| 2019/0108342 A1 | 4/2019 | Conikee et al. | |
| 2019/0121979 A1* | 4/2019 | Chari | G06F 8/433 |
| 2019/0129825 A1 | 5/2019 | Bardin et al. | |
| 2019/0171423 A1 | 6/2019 | Mishra | |
| 2019/0207969 A1 | 7/2019 | Brown | |
| 2019/0266322 A1 | 8/2019 | Jones et al. | |
| 2019/0294790 A1* | 9/2019 | Chang | G06F 21/563 |
| 2019/0347415 A1 | 11/2019 | Yavo | |
| 2020/0004954 A1 | 1/2020 | Zawadowskiy | |
| 2020/0012786 A1 | 1/2020 | Lamothe-Brassard | |
| 2020/0057856 A1 | 2/2020 | Daymont | |
| 2020/0143061 A1 | 5/2020 | Kim | |
| 2020/0162483 A1 | 5/2020 | Farhady et al. | |
| 2020/0242239 A1 | 7/2020 | Loman et al. | |
| 2020/0314124 A1 | 10/2020 | Reybok, Jr. et al. | |
| 2020/0382560 A1 | 12/2020 | Woolward | |
| 2020/0394313 A1 | 12/2020 | Ionescu | |
| 2021/0089400 A1 | 3/2021 | Kashani et al. | |
| 2021/0097168 A1* | 4/2021 | Patel | G06F 21/554 |
| 2021/0133324 A1 | 5/2021 | Chari et al. | |
| 2021/0152588 A1 | 5/2021 | Cruz | |
| 2021/0157583 A1 | 5/2021 | Yuile et al. | |
| 2021/0182393 A1 | 6/2021 | Chevalier et al. | |
| 2021/0216634 A1 | 7/2021 | Kenyon | |
| 2021/0232680 A1* | 7/2021 | Hecht | G06F 21/577 |
| 2021/0264031 A1 | 8/2021 | Dhillon et al. | |
| 2021/0279338 A1 | 9/2021 | Bowman et al. | |
| 2021/0286600 A1 | 9/2021 | Calvano et al. | |
| 2021/0312082 A1 | 10/2021 | Conikee | |
| 2021/0390182 A1 | 12/2021 | Boutnaru | |
| 2022/0019657 A1 | 1/2022 | Sethumadhavan et al. | |
| 2022/0092179 A1 | 3/2022 | Zhang et al. | |
| 2022/0108007 A1* | 4/2022 | Zatutschne-Marom | |
| | | | G06F 21/52 |
| 2022/0156365 A1 | 5/2022 | Garba et al. | |
| 2022/0391532 A1 | 12/2022 | Le et al. | |
| 2023/0012722 A1 | 1/2023 | Del Rosario | |
| 2023/0017384 A1* | 1/2023 | Woodward | G06F 16/908 |
| 2023/0020547 A1 | 1/2023 | Katkoori et al. | |
| 2023/0049789 A1 | 2/2023 | Seletskiy et al. | |
| 2023/0195860 A1 | 6/2023 | Porter et al. | |
| 2023/0289451 A1 | 9/2023 | Mackenbach | |
| 2023/0315439 A1 | 10/2023 | Castrejon, III et al. | |
| 2023/0367882 A1 | 11/2023 | Bussell et al. | |
| 2023/0379342 A1 | 11/2023 | Gilad et al. | |
| 2024/0028701 A1 | 1/2024 | Zawadowskiy | |
| 2024/0028708 A1 | 1/2024 | Zawadowskiy | |
| 2024/0028709 A1 | 1/2024 | Zawadowskiy | |
| 2024/0028712 A1 | 1/2024 | Parla | |
| 2024/0028724 A1 | 1/2024 | Parla | |
| 2024/0028741 A1 | 1/2024 | Parla | |
| 2024/0028743 A1 | 1/2024 | Parla | |

(56)     References Cited

U.S. PATENT DOCUMENTS

| | | | |
|---|---|---|---|
| 2024/0031394 A1 | 1/2024 | Parla |
| 2024/0089272 A1 | 3/2024 | Gilad et al. |
| 2025/0272402 A1 | 8/2025 | Zawakowskiy |

FOREIGN PATENT DOCUMENTS

| | | |
|---|---|---|
| CN | 112818356 A | 5/2021 |
| CN | 113569244 | 12/2021 |
| CN | 113434870 B | 7/2022 |
| KR | 102392642 | 4/2022 |

OTHER PUBLICATIONS

Bardin, et al; "Backward-Bounded DSE: Targeting Infeasibility Questions on Obfuscated Codes", 2017 IEEE Symposium on Security and Privacy (SP), IEEE, May 22, 2017, pp. 633-651.

DeLozier et al., "Hurdle, Securing Jump Instructions Against Code Reuse Atttacks", Proceeduings of the 25th International Conference on Architechtural Support for Programming Languages and Operating Systems, ACM, New Yori, NY, Mar. 9, 2020, pp. 653-666.

Kumar, S., Moolchandani, D., & Sarangi, S. R. (2022). Hardware-assisted mechanisms to enforce control flow integrity: A comprehensive survey. Journal of Systems Architecture, 102644.

Liu, et al; "Transparent and Efficient CFI Enforcement with Intel Processor Trace," 2017 IEEE International Symposium on High Performance Computer Architecture (HPCA), IEEE, US, Feb. 4, 2017, pp. 529-540.

The PCT Search Report and Written Opinion mailed Apr. 15, 2024 for PCT application No. PCT/US2023/028282, 15 pages.

The PCT Search Report and Written Opinion mailed Apr. 15, 2024 for PCT application No. PCT/US2023/084664, 14 pages.

The PCT Search Report and Written Opinion mailed Apr. 24, 2024 for PCT application No. PCT/US2023/084670, 14 pages.

The PCT Search Report and Written Opinion mailed Apr. 29, 2024 for PCT application No. PCT/US2023/084901, 13 pages.

The PCT Search Report and Written Opinion mailed May 3, 2024 for PCT application No. PCT/US2023/084659, 14 pages.

The PCT Search Report and Written Opinion Dated Apr. 25, 2024 for PCT Application No. PCT/US2023/084668, 15 pges.

Qiang, "CloudFI: Context-Sensitive and Incremental CFI in the Cloud Environment", IEEE Transactions on Cloud Computing, IEEE Computer Society, USA vo1. 9, No. 3, Mar. 1, 2019 pp. 938-957.

Xinyang, et al; Griffin: Guarding Control Flows Using Intel Processor Trace, Architectural support for programming languages and Operating systems, Apr. 4, 2017, pp. 585-598.

Yuan, et al., "Hardware-Assisted 1-23 Fine-Grained Code-Reuse Attack Detection", Dec. 12, 2015, SAT 2015 18th International Conference , Austin, TX, USA, Sep. 24-27, 2015 ; [Lecture Notes in Computer Science; Lect . Notes Computer], Springer, Berlin, Heidelberg, pp. 66-85.

Zhang et al: "DeepCheck: A Non-intrusive Control-flow Integrity Checking based on Deep Learning", arxiv.org, Cornell University Library, 201 Olin Library Cornell University Ithaca, NY1, May 6, 2019, 10 pages.

Office Action for U.S. Appl. No. 18/084,007, Dated Oct. 22, 2024, Parla, "Control Flow Integrity Monitoring Based Insights", 37 pages.

Office Action for U.S. Appl. No. 18/084,093, dated Aug. 29, 2024, 16 pages.

Office Action for U.S. Appl. No. 18/084,121, dated Sep. 11, 2024, 24 pages.

Office Action for U.S. Appl. No. 18/084,147, dated Sep. 6, 2024, 17 pages.

Office Action for U.S. Appl. No. 18/084,093, Dated Feb. 27, 2025, Parla, "Control Flow Prevention Using Software Bill of Materials Analysis ," 33 pages.

Office Action for U.S. Appl. No. 18/084,147, Dated Mar. 20, 2025, Parla,"Control Flow Integrity Enforcement for Applications Running on Platforms," 24 pages.

Office Action for U.S. Appl. No. 18/084,177, dated Jan. 13, 2025, 31 pages.

Office Action for U.S. Appl. No. 18/084,007, dated Jan. 29, 2025, 26 pages.

Da Silva, A. C. F., et al. (2022). Using a cyber digital twin for continuous automotive security requirements verification. IEEE Software. 10 pages.

Hiremagalore, Sharath "Zero-Day Web Attack Detection Using Collaborative and Transduction-Based Anomaly Detectors" George Mason University; published Nov. 9, 2021, 99 pages.

Maunero, et al. "A FPGA-Based Control-Flow Integrity Solution for Securing Bare-Metal Embedded Systems" Institute of Electrical and Electronics Engineers Inc. 2020, 11 pages.

Office Action for U.S. Appl. No. 18/083,838, Dated Oct. 31, 2024, Zawadowsky, "Control Flow Directed Graph for Use With Program Disassembler," 9 pages.

* cited by examiner

ORCHESTRATION SYSTEM CONTROL PLANE 1002

CONTROLLER MANAGER 1014

CLOUD CONTROLLED MANAGER 1016

SCHEDULER 1018

KEY STORE 1020

API SERVER 1022

MONITORING CONTROL PLANE 1012

DEVICE 1004
PROXY 1008
AGENT 1010
MONITOR AGENT 1006

DEVICE 1004
PROXY 1008
AGENT 1010
MONITOR AGENT 1006

DEVICE 1004
PROXY 1008
AGENT 1010
MONITOR AGENT 1006

DEVICE 1004
PROXY 1008
AGENT 1010
MONITOR AGENT 1006

DEVICE 1004
PROXY 1008
AGENT 1010
MONITOR AGENT 1006

DEVICE 1004
PROXY 1008
AGENT 1010
MONITOR AGENT 1006

1000

1600

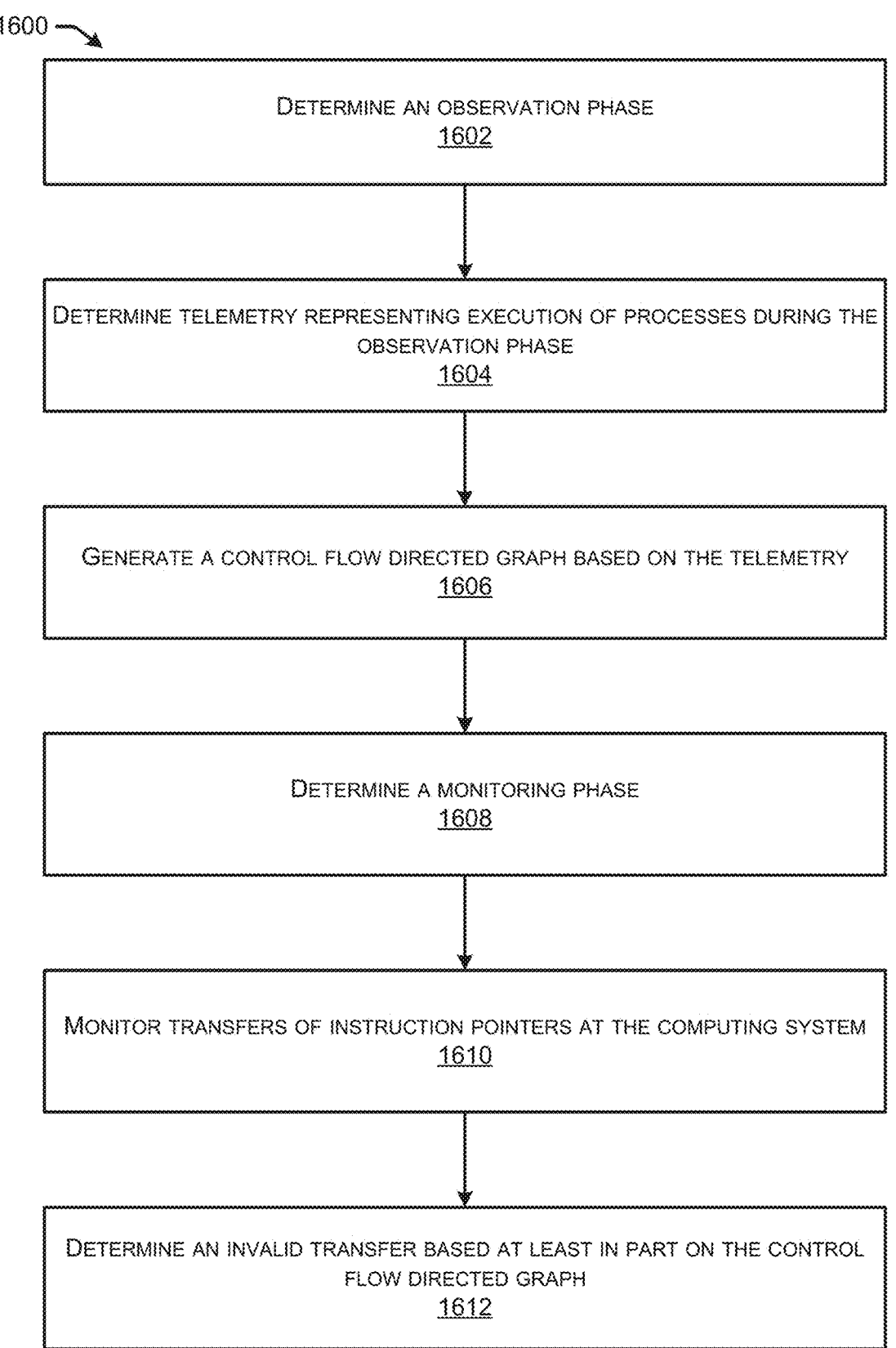

DETERMINE AN OBSERVATION PHASE
1602

DETERMINE TELEMETRY REPRESENTING EXECUTION OF PROCESSES DURING THE OBSERVATION PHASE
1604

GENERATE A CONTROL FLOW DIRECTED GRAPH BASED ON THE TELEMETRY
1606

DETERMINE A MONITORING PHASE
1608

MONITOR TRANSFERS OF INSTRUCTION POINTERS AT THE COMPUTING SYSTEM
1610

DETERMINE AN INVALID TRANSFER BASED AT LEAST IN PART ON THE CONTROL FLOW DIRECTED GRAPH
1612

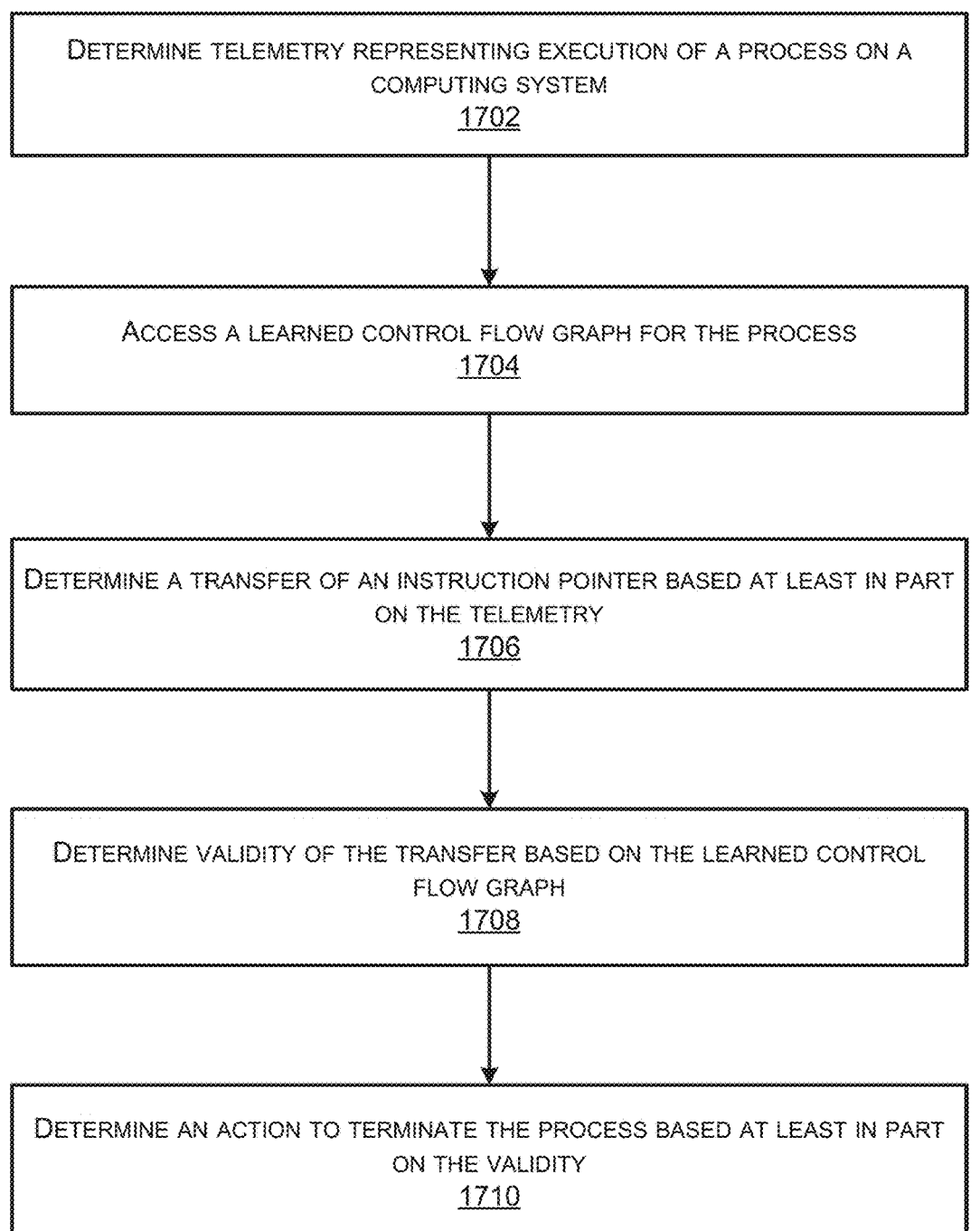

DETERMINE TELEMETRY REPRESENTING EXECUTION OF A PROCESS ON A
COMPUTING SYSTEM
1702

ACCESS A LEARNED CONTROL FLOW GRAPH FOR THE PROCESS
1704

DETERMINE A TRANSFER OF AN INSTRUCTION POINTER BASED AT LEAST IN PART
ON THE TELEMETRY
1706

DETERMINE VALIDITY OF THE TRANSFER BASED ON THE LEARNED CONTROL
FLOW GRAPH
1708

DETERMINE AN ACTION TO TERMINATE THE PROCESS BASED AT LEAST IN PART
ON THE VALIDITY
1710

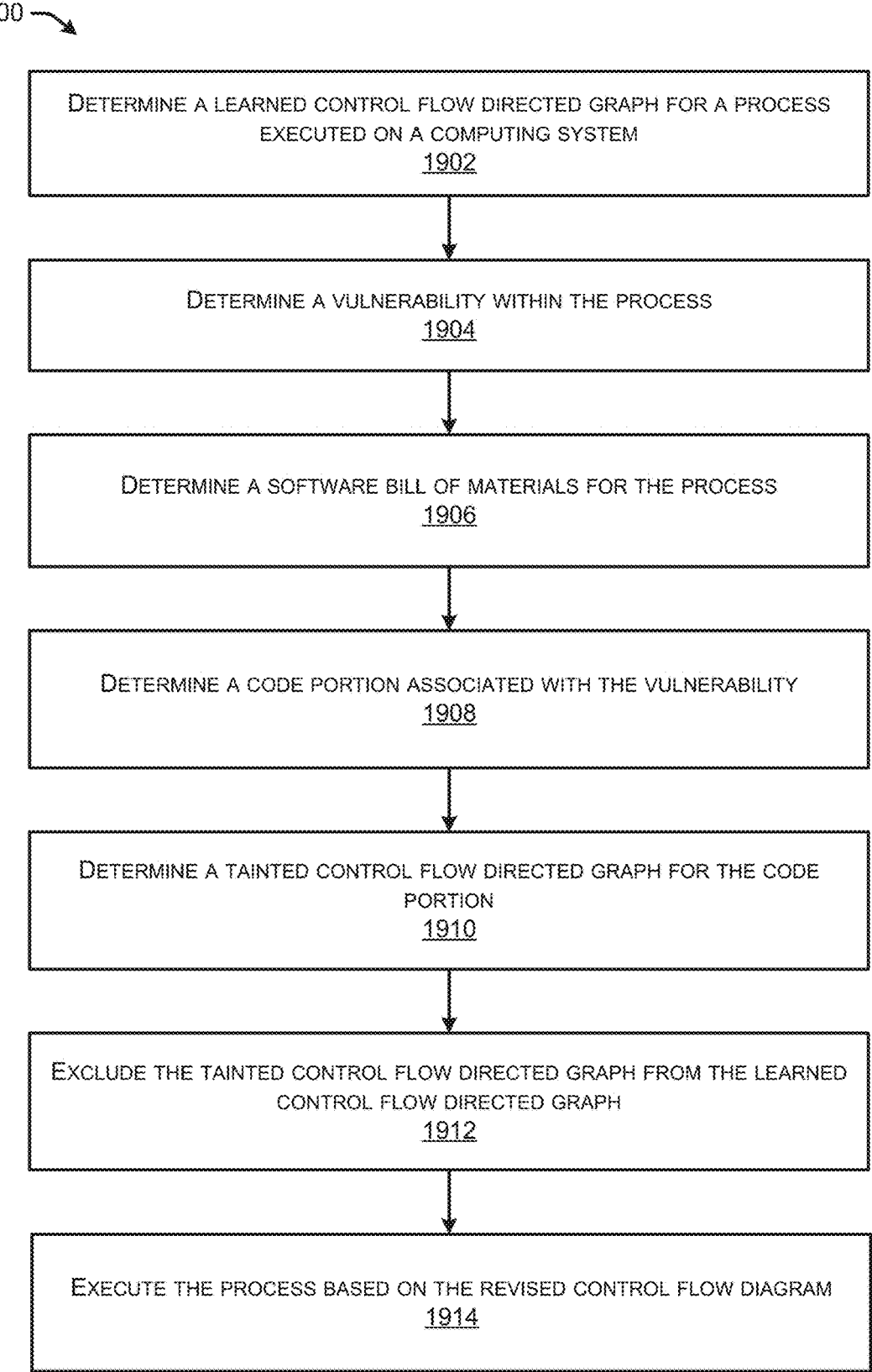

DETERMINE A LEARNED CONTROL FLOW DIRECTED GRAPH FOR A PROCESS EXECUTED ON A COMPUTING SYSTEM
1902

DETERMINE A VULNERABILITY WITHIN THE PROCESS
1904

DETERMINE A SOFTWARE BILL OF MATERIALS FOR THE PROCESS
1906

DETERMINE A CODE PORTION ASSOCIATED WITH THE VULNERABILITY
1908

DETERMINE A TAINTED CONTROL FLOW DIRECTED GRAPH FOR THE CODE PORTION
1910

EXCLUDE THE TAINTED CONTROL FLOW DIRECTED GRAPH FROM THE LEARNED CONTROL FLOW DIRECTED GRAPH
1912

EXECUTE THE PROCESS BASED ON THE REVISED CONTROL FLOW DIAGRAM
1914

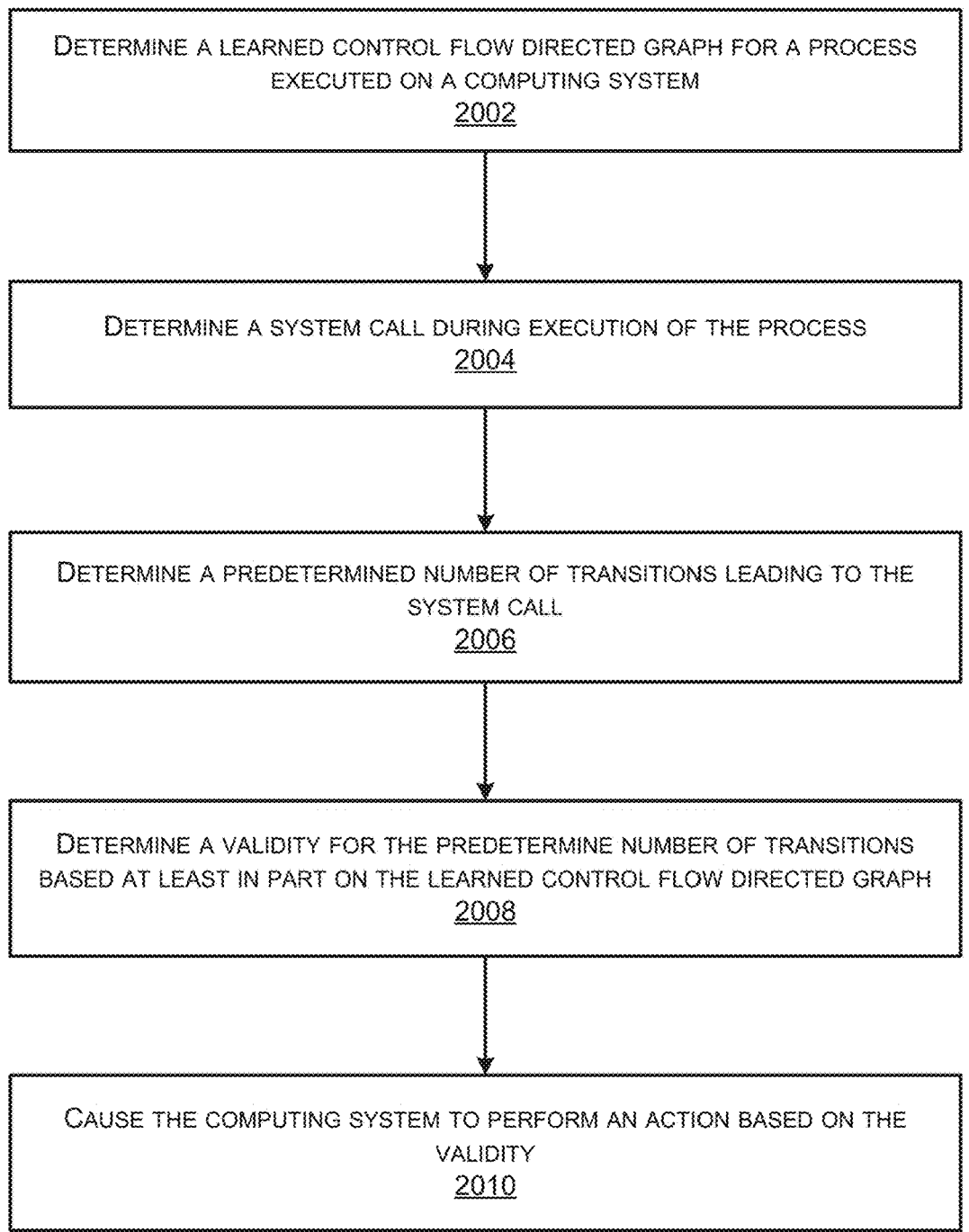

DETERMINE A LEARNED CONTROL FLOW DIRECTED GRAPH FOR A PROCESS EXECUTED ON A COMPUTING SYSTEM
2002

DETERMINE A SYSTEM CALL DURING EXECUTION OF THE PROCESS
2004

DETERMINE A PREDETERMINED NUMBER OF TRANSITIONS LEADING TO THE SYSTEM CALL
2006

DETERMINE A VALIDITY FOR THE PREDETERMINE NUMBER OF TRANSITIONS BASED AT LEAST IN PART ON THE LEARNED CONTROL FLOW DIRECTED GRAPH
2008

CAUSE THE COMPUTING SYSTEM TO PERFORM AN ACTION BASED ON THE VALIDITY
2010

DETERMINE A LEARNED CONTROL FLOW DIAGRAM FOR A PROCESS EXECUTED ON A COMPUTING SYSTEM
2102

MONITOR EXECUTION OF THE PROCESS USING THE LEARNED CONTROL FLOW DIAGRAM
2104

DETERMINE AN UNOBSERVED TRANSITION
2106

DETERMINE A CLASSIFICATION FOR THE UNOBSERVED TRANSITION
2108

PERFORM AN ACTION BASED AT LEAST IN PART ON THE CLASSIFICATION
2110

2200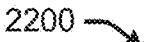

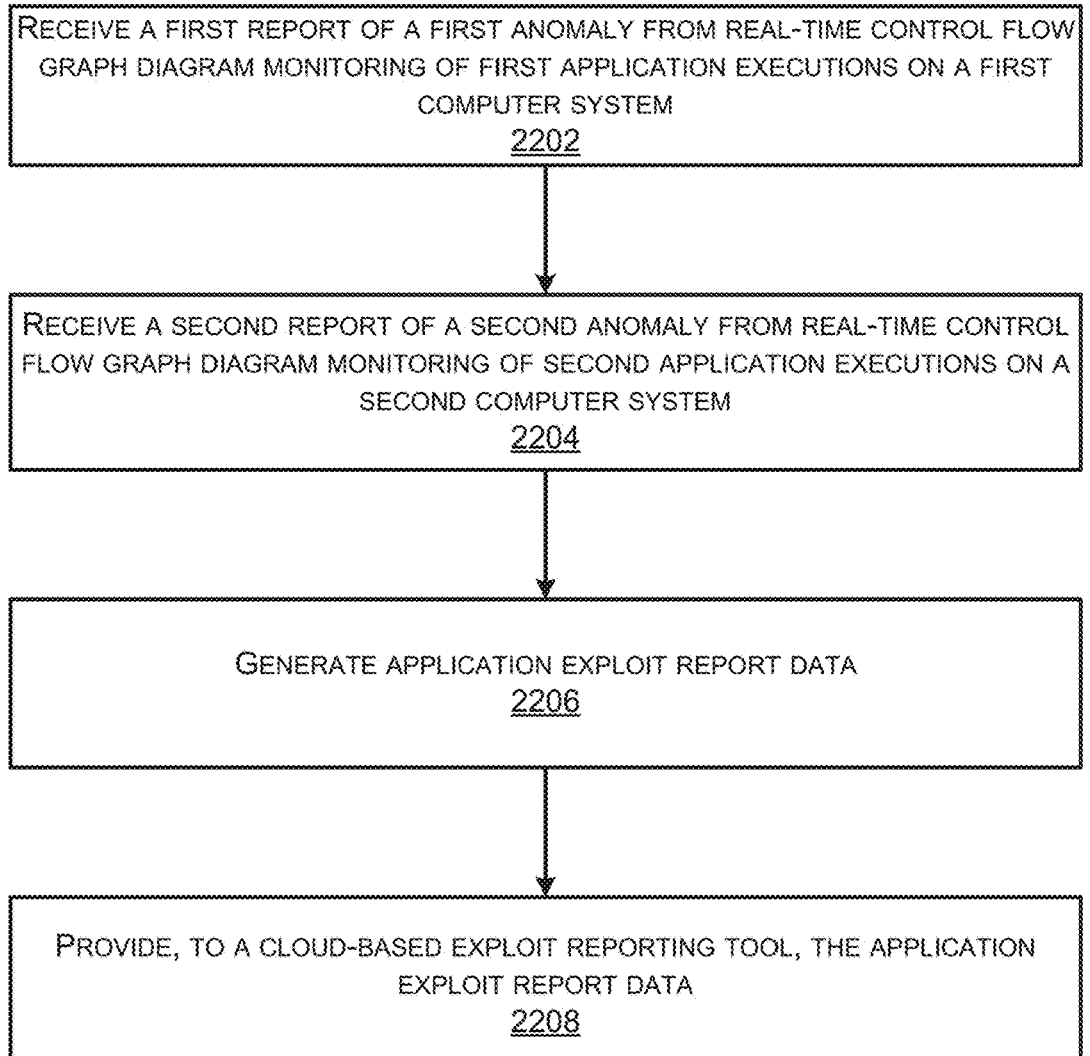

RECEIVE A FIRST REPORT OF A FIRST ANOMALY FROM REAL-TIME CONTROL FLOW GRAPH DIAGRAM MONITORING OF FIRST APPLICATION EXECUTIONS ON A FIRST COMPUTER SYSTEM
2202

RECEIVE A SECOND REPORT OF A SECOND ANOMALY FROM REAL-TIME CONTROL FLOW GRAPH DIAGRAM MONITORING OF SECOND APPLICATION EXECUTIONS ON A SECOND COMPUTER SYSTEM
2204

GENERATE APPLICATION EXPLOIT REPORT DATA
2206

PROVIDE, TO A CLOUD-BASED EXPLOIT REPORTING TOOL, THE APPLICATION EXPLOIT REPORT DATA
2208

FIG. 22

2300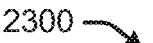
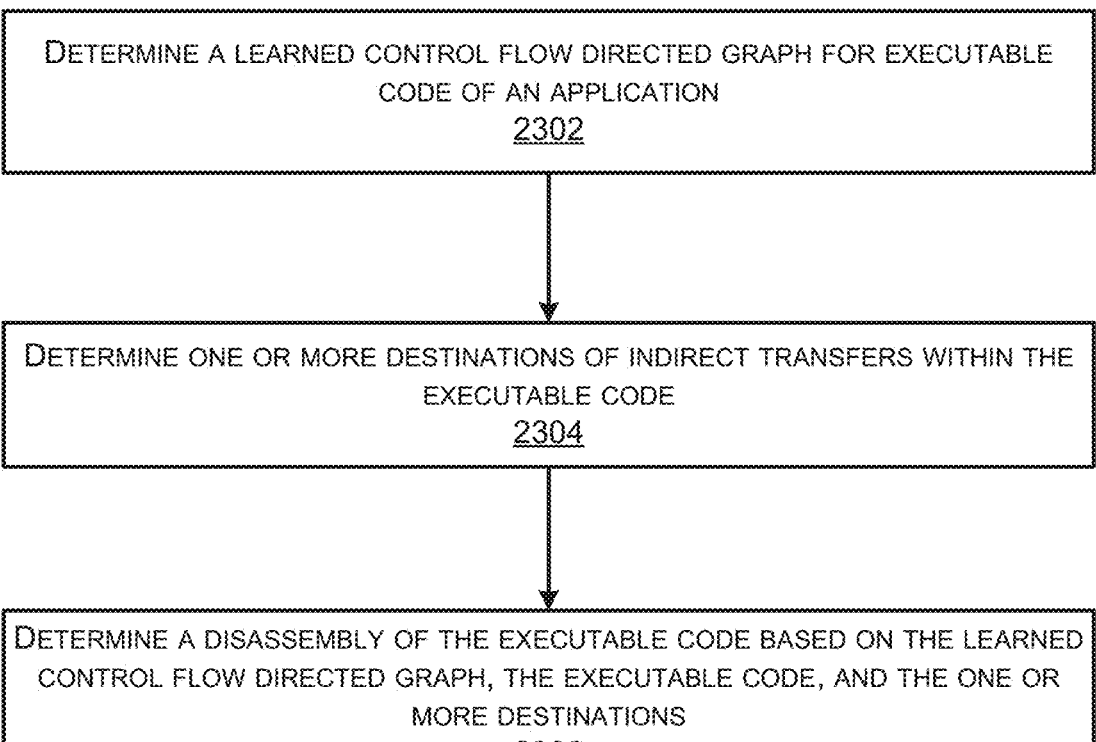
DETERMINE A LEARNED CONTROL FLOW DIRECTED GRAPH FOR EXECUTABLE
CODE OF AN APPLICATION
2302
DETERMINE ONE OR MORE DESTINATIONS OF INDIRECT TRANSFERS WITHIN THE
EXECUTABLE CODE
2304
DETERMINE A DISASSEMBLY OF THE EXECUTABLE CODE BASED ON THE LEARNED
CONTROL FLOW DIRECTED GRAPH, THE EXECUTABLE CODE, AND THE ONE OR
MORE DESTINATIONS
2306
FIG. 23

LEARNED CONTROL FLOW MONITORING AND ENFORCEMENT OF UNOBSERVED TRANSITIONS

RELATED APPLICATIONS

This application claims priority to U.S. Provisional Application No. 63/391,518, filed on Jul. 22, 2022, and also to U.S. Provisional Application No. 63/391,560 filed Jul. 22, 2022, the entire contents of each of which are incorporated herein by reference.

TECHNICAL FIELD

The present disclosure relates generally to detection and protection against computer system attacks.

BACKGROUND

Malicious software, also known as malware, affects a great number of computer systems worldwide. In its many forms such as computer viruses, worms, rootkits, unsolicited adware, ransomware, and spyware, malware presents a serious risk to millions of computer users, making them vulnerable to loss of data and sensitive information, identity theft, and loss of productivity, among others. Malware may further display material that is considered by some users to be obscene, excessively violent, harassing, or otherwise objectionable.

A particular kind of malware consists of a code reuse attack. Some examples of such malware and attack include return-oriented programming (ROP), jump-oriented programming (JOP), call-oriented programming (COP), and other variations of code reuse exploits. A typical ROP exploit, also known in the art as a return-into-library attack, includes an illegitimate manipulation of a call stack used by a thread of a process, the illegitimate manipulation intended to alter the original functionality of the respective thread/process. For instance, an exemplary ROP exploit may manipulate the call stack so as to force the host system to execute a sequence of code snippets, known as gadgets, each such gadget representing a piece of legitimate code of the target process. Careful stack manipulation may result in the respective code snippets being executed in a sequence, which differs from the original, intended sequence of instructions of the original process or thread.

By re-using pieces of code from legitimate processes to carry out malicious activities instead of explicitly writing malicious code, ROP/JOP/COP exploits may evade detection by conventional anti-malware techniques. Several anti-malware methods have been proposed to address code-reuse attacks, but such methods typically place a heavy computational burden on the respective host system, negatively impacting user experience. Therefore, there is a strong interest in developing systems and methods capable of effectively targeting code reuse malware, with minimal computational costs.

Control flow integrity (CFI) validation techniques may provide a defense against control flow hijacking attacks. CFI validation techniques are configured to guarantee legitimate control flow transfers in an application. Existing CFI validation techniques may require source code modification and/or binary re-instrumentation to insert run time CFI checks in an application binary. Further, existing CFI validation techniques may incur a performance penalty and/or may provide only a limited history, thus, limiting accuracy.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 16 illustrates an example process for observing application executions and monitoring, using a control flow directed graph, applications executed on a computing system, according to at least one execution example.

FIG. 17 illustrates an example process for enforcing execution according to a learned control flow directed graph, according to at least one execution example.

FIG. 19 illustrates an example process for excluding tainted code portions from execution within an application in real-time based on a learned control flow directed graph, according to at least one execution example.

FIG. 20 illustrates an example process for inline control flow monitoring with enforcement, according to at least one execution example.

FIG. 22 illustrates an example process for determining cloud-based vulnerability and exploit insights based on control flow monitoring in real-time across devices and systems, according to at least one execution example.

FIG. 23 illustrates an example process for program disassembly using a learned control flow directed graph to inform indirect transfers within the program, according to at least one execution example.

DESCRIPTION OF EXAMPLE EMBODIMENTS

Overview

Figure 1:
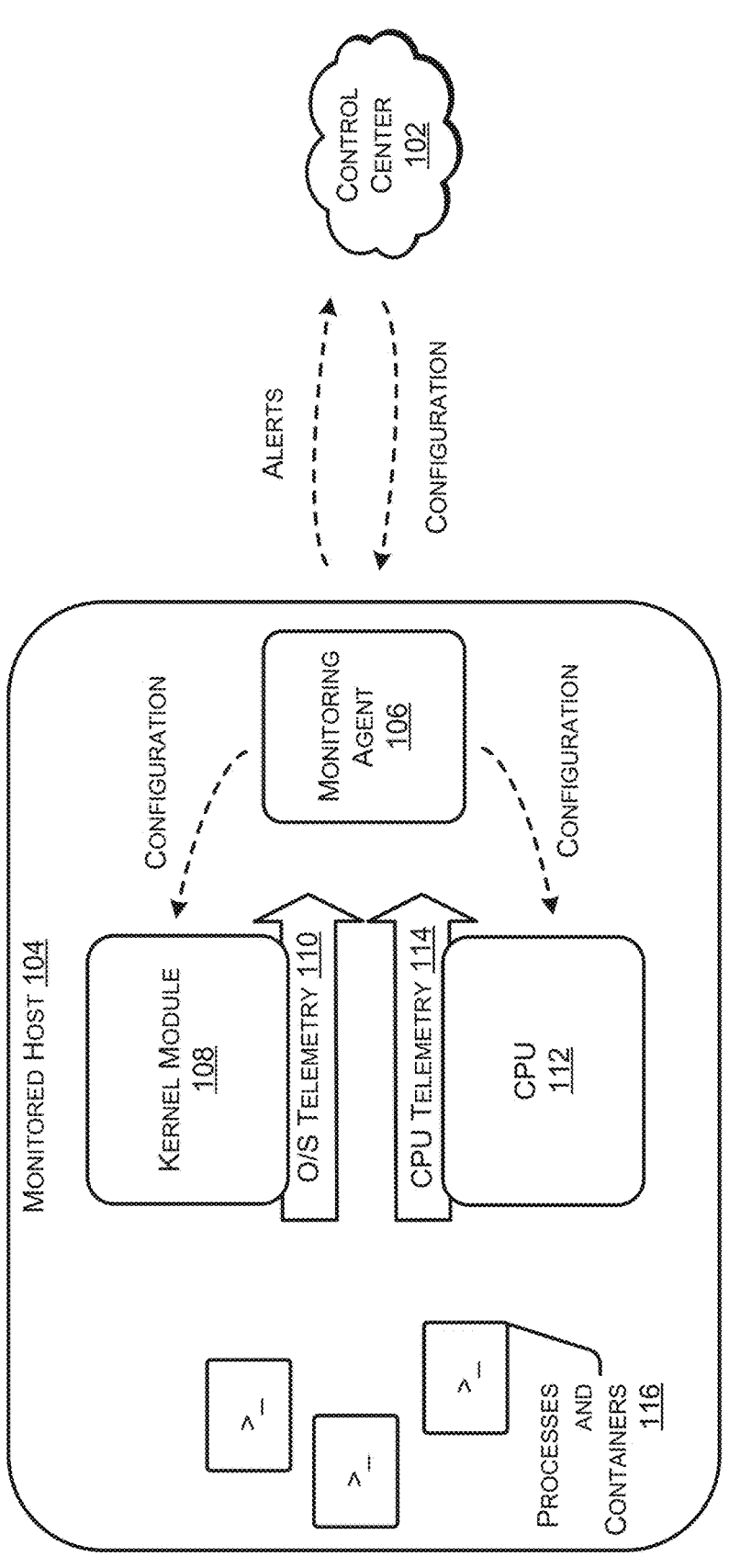
FIG. 1 illustrates an example system architecture for control flow monitoring using a learned control flow graph, according to at least one execution example.

The present disclosure relates generally to detection and protection against computer system attacks.

A first method described herein includes determining an observation phase for observing execution of processes on the computing system and determining telemetry, during the observation phase, representing execution of the processes. The method also includes generating a control flow directed graph based on the telemetry and determining a monitoring phase based at least in part on the control flow directed graph. The method also includes monitoring transfers of instruction pointers at the computing system. The method further includes determining an invalid transfer based at least in part on the control flow directed graph, Other embodiments of this aspect include corresponding computer systems, apparatus, and computer programs recorded on one or more computer storage devices, each configured to perform the actions of the methods.

A second method described herein includes determining telemetry representing execution of a process on the computing system. The method further includes accessing a learned control flow graph for the process and determining a transfer of an instruction pointer based at least in part on the telemetry. The method also includes determining validity of the transfer based on the learned control flow graph and subsequently determining an action to terminate the process based at least in part on the validity. Other embodiments of this aspect include corresponding computer systems, apparatus, and computer programs recorded on one or more computer storage devices, each configured to perform the actions of the methods.

A third method described herein includes determining a learned control flow directed graph for a program executed by a computing device and determining valid target destinations for one or more transitions within the program, the one or more transitions directed to a different portion of the program or to a separate program. The method also includes executing instructions of the program, and executing a transition of the one or more transitions within the program to further determine a destination for the transition. The transition may be performed in response to the destination being included within the valid target destinations from a given transition location. A secondary action may be performed in response to the destination not being included within the valid target destinations. Other embodiments of this aspect include corresponding computer systems, apparatus, and computer programs recorded on one or more computer storage devices, each configured to perform the actions of the methods.

A fourth method described herein includes determining a learned control flow directed graph for a process executed on the computing system. The method also includes determining a vulnerability within the process. The method also includes determining a software bill of materials (SBOM) for the process and determining a code portion of the process associated with the vulnerability based at least in part on the SBOM. The method further includes determining a tainted control flow directed graph for the code portion and excluding the tainted control flow directed graph from the learned control flow directed graph to generate a revised control flow diagram. The method further includes executing the process based on the revised control flow diagram to prevent execution of the vulnerability. Other embodiments of this aspect include corresponding computer systems, apparatus, and computer programs recorded on one or more computer storage devices, each configured to perform the actions of the methods.

A fifth method described herein includes determining a learned control flow directed graph for a process executed on a computing system. The method also includes determining a system call during execution of the process and determining a predetermined number of transitions leading to the system call. The method also includes determining a validity for the predetermined number of transitions based at least in part on the learned control flow directed graph. The method also includes causing the computing system to perform an action based at least in part on the validity. Other embodiments of this aspect include corresponding computer systems, apparatus, and computer programs recorded on one or more computer storage devices, each configured to perform the actions of the methods.

A sixth method described herein includes determining a learned control flow diagram for a process executed on a computing system by observing executions of transitions during an observation period and monitoring execution of the process on the computing system using the learned control flow diagram. The method also includes determining an unobserved transition of the process based at least in part on the learned control flow diagram. The method also includes determining a classification of safe or unsafe for the unobserved transition by analyzing, using a monitoring component, the unobserved transition. The method also includes performing an action based at least in part on the safety classification and the learned control flow diagram. Other embodiments of this aspect include corresponding computer systems, apparatus, and computer programs recorded on one or more computer storage devices, each configured to perform the actions of the methods.

A seventh method described herein includes receiving a first report of a first anomaly from real-time control flow graph diagram monitoring of first application executions at a first computer system and receiving a second report of a second anomaly from real-time control flow graph diagram monitoring of second application executions at a second computer system. The method also includes generating, using a machine learned model receiving inputs of the first report and the second report, application exploit report data. The method also includes providing, to a cloud-based exploit reporting tool available to the first computer system and the second computer system, the application exploit report data. Other embodiments of this aspect include corresponding computer systems, apparatus, and computer programs recorded on one or more computer storage devices, each configured to perform the actions of the methods.

An eighth method described herein includes determining a learned control flow directed graph for executable code of an application by observing executions of transitions within the executable code during an observation period. The method also includes determining one or more destinations of indirect transfers within the executable code based on the learned control flow directed graph, the indirect transfers to be computed at run time of the executable code. The method further includes determining a disassembly of the executable code based at least in part on the learned control flow directed graph, the one or more destinations of indirect transfers, destinations of transfers, and the executable code. Other embodiments of this aspect include corresponding computer systems, apparatus, and computer programs recorded on one or more computer storage devices, each configured to perform the actions of the methods.

Example Embodiments

The present disclosure relates generally to generally to using telemetry from a computing device to do control flow directed graph security monitoring of workloads on bare metal, virtual machines, or containers. The control flow directed graph is generated by observing executions over an observation period and subsequently entering an enforcement mode wherein the learned control flow directed graph is used to monitor and prevent execution of unobserved or otherwise restricted actions.

A control flow directed graph (CFDG), sometimes referred to herein as a control flow diagram, is a representation, using graph notation, of control flow, i.e., execution, paths that may be traversed through an application during execution of the application. In a control flow graph, each node in the graph corresponds to a basic block. A basic block is a sequence of instructions where control enters at the beginning of the sequence. For example, a destination address, may correspond to a start of a basic block and an indirect branch instruction may correspond to an end of the block. A target address of the indirect branch instruction may correspond to a next possible address of a next basic block in the CFDG, i.e., may correspond to a beginning address of a next/reachable basic block in the CFDG. Edges between two basic blocks (e.g., a first block and a second block) represent control flow transfer from the end of the first block to the beginning of the second block. A node may thus include a start address of the basic block, and a next possible start address of a next basic block i.e., a beginning address of a next/reachable basic block that may be stored as part of the graph edge connecting a first node to a second node. A control flow graph may be generated by, for example, source code analysis, binary analysis, static binary analysis, execution profiling, etc. The control flow graph may then include a plurality of legitimate transitions. Each legitimate execution path may include a plurality of nodes connected by one or more edges from a start node.

Control flow integrity (CFI) validation techniques are configured to enforce a CFI security policy that execution of an application follow a legitimate path of a CFDG. CFI validation techniques may thus be used to mitigate control flow hijack attacks. Generally, CFI validation is configured to validate a control flow transfer and/or an execution path at indirect or conditional branches, determined at runtime, against a legitimate CFDG, determined prior to runtime. As used herein, indirect branch instructions include, but are not limited to, jump instructions, function calls, function returns, interrupts, etc., that involve updating the instruction pointer from a register or a memory location. Some CFI validation techniques rely on source code modification or binary re-instrumentation to insert run time CFI checks into the application binary.

Zero-day attacks are a prolific problem throughout the software industry and generally relate to recently discovered security vulnerabilities that malicious actors can use to attack systems. Zero-day refers to the fact that the developer has only just learned of the flaw and has zero days to fix the vulnerability. Zero-day attacks take place when the malicious actors exploit the vulnerability before the developer has a chance to address it. Very few products address Zero-day threats before the exploit vector is widely known. A vulnerability remains unknown for an average 200 days. Even after the vulnerability is widely known, patching every system within an enterprise may take months or even years to complete. Older systems may even remain vulnerable in perpetuity because a patch is not available, or the patch negatively affects the system in some way.

Finding threats after they have been exploited is unlikely to be adequate as attackers often pivot from the initial attack to other systems. Therefore, even if a known vulnerability is patched, the attacker may have already exploited the issue to move laterally to another machine or workload. Once an attacker has successfully exploited a systems, they may be within the enterprise, and therefore it is critical to identify such vulnerabilities before they are exploited and prevent attackers from exploiting the vulnerabilities.

The system and technologies described herein use CFDG to monitor the actual execution and instruction stream of the application process. This system provides true Control Flow Integrity (CFI) of the application. The systems and methods described herein leverage hardware telemetry so that the actual executions can be effectively and accurately monitored. The techniques described herein will work on a variety of hardware-based solutions, where we are able to reliably detect even the most sophisticated code reuse attacks using (ROP, COP, JOP, COOP etc.) gadgets.

This disclosure describes techniques for using hardware telemetry to perform CFDG monitoring of cloud-native workloads miming on bare metal, virtual machines (VMs), or containers. The techniques described herein include a capability to allow the use of this hardware assisted approach to be applied to virtual machines and to containerized workloads as well as local bare metal implementations.

In an example, the systems and methods described herein use a hardware-assisted technology to apply the CFDG to monitor critical systems, virtual machines, and containerized workloads. The systems and techniques described herein provide for secure (detecting most advance code reuse attacks that trigger at least one invalid transition)

workload execution monitoring in real-time allowing for the enforcement of the intended operations of the workloads to be done in a secure manner. The systems and techniques described herein leverage hardware telemetry available in both Intel® and ARM® processors as well as other such technologies. Using CPU telemetry, the system may be able to transparently monitor execution of any process of interest, whether these processes are running on bare metal, within virtual machines, or inside of containers. Given a learned Control Flow graph for the process being monitored, the techniques and systems described herein are able to detect the most advance code-reuse attacks by observing invalid transfers of the instruction pointer to attacker-selected code gadgets. These attacks can be difficult to detect, for example through system-call monitoring because modern applications have a large number of system calls, so attacker code or vulnerabilities can do a lot of damage and still easy maintain a completely valid system-call profile. The systems and methods described herein leverage CPU control flow telemetry, which could be represented as a CFDG, bloom filter lookup table, a machine learning model, or any number of other potential embodiments.

During deployment of the systems and methods described herein, two main phases can be employed, observation and enforcement. In some scenarios these two phases can be done together. In the observation phase, the application or workload may be executed as normal, such as during a trial phase or initial setup phase. The observation phase may include observing executions based on the CPU telemetry and building the CFDG based on observed executions. In this manner, the CFDG is a learned CFDG built based on observed executions by the application or within the workload. After some predetermined period of time (e.g., seconds, minutes, days, weeks, etc.) and/or based on coverage on an amount of the code of the application or workload (e.g., when the observed code used to build the learned. CFDG reaches a threshold such as 50%, 60%, 70%, 80%, 90%, etc.), then the observation phase may automatically be completed. In some examples, the observation phase may be monitored by a security team who may determine when to exit the observation phase and enter a monitoring phase.

In the monitoring phase, the executions based on the CPU telemetry may be compared against the learned CFDG to identify deviations from the learned CFDG and thereby identify potential code reuse attacks or other potential exploits before they can be executed. In some examples, only observed transitions during the observation period will be allowed to execute, and others may be treated as invalid transfers and either cause a default action (e.g., cancel the execution), remedial action, or identify further information (e.g., the sequence that led to the invalid request to determine if the request should be valid based on a valid sequence leading to the request). The monitoring may be locally performed, performed using a cloud-based system using a monitoring agent at the local device, monitored on a network, or otherwise implemented.

The techniques and systems described herein may be embodied in software, hardware, or hybrid environments that use both software and hardware for observing and monitoring application processes. In the software embodiment, CPU technologies produce CPU telemetry that represents executions of a process in terms of CPU instructions. Telemetry feeds from different CPUs may be represented in a CFDG representation that allows any CPU technology, regardless of format, language, or specific embodiment, to provide instruction level monitoring at the CPU telemetry level across devices. This normalization to the CFDG enables analysis to be run on the CFDG independent of the CPU system generating the telemetry, meaning that the techniques and processes described herein may be rolled out and implemented with a wide variety of CPU technologies. Furthermore, in some examples, workloads may run on different levels of abstraction from hardware, such as on bare metal, virtual machines (VMs) or container ecosystems. The CFDG enables consistent analysis and monitoring of such varied operating environments.

For example, in the case of applications running on bare-metal systems, the correlation between a given application and the CPU(s) that it is executing on is directed by the operating system. This presents the simplest application-to-CPU telemetry mapping scenario. A more complex scenario is presented with virtual machines. In some examples, VM technologies have already included abstraction of the CPU monitoring capabilities natively into their hypervisor ecosystem. Whenever already supported, such CPU monitoring capabilities can be leveraged to provide application-to-CPU correlations in a normalized and consistent manner. In some examples, the CFDG representation at the abstraction layer for a particular CPU may be added for monitoring and enforcement. In some examples, CPU telemetry may not be readily available or exist. In such examples, the systems and methods herein may provide a virtualization layer that provides an equivalent of CPU telemetry or an abstraction of the application or workload.

In a hybrid environment, a combination of both software and hardware can be combined to provide the observability and monitoring functionality. In such examples, the CPU telemetry can be substantial, on the order of gigabits per second that may cause problems for scaling the monitoring capability. In some examples, the CPU telemetry may be directed to a sidecar hardware component to perform analysis. In this embodiment a hardware pipeline would be used to process the CPU telemetry and the analysis of the control flow is done on either an FPGA, GPU, ASIC, or other hardware device on the same system. In such examples, the telemetry is pipelined to these other hardware devices without interfering with the operation of the workload on the CPU. In this mode, only the violations (e.g., results of monitoring and enforcement that require action) are sent back to the CPU from the FPGA, GPU, or other hardware processing in the pipeline. In such examples, analysis and detection may be performed on hardware and only violations, or executions that trigger enforcement, would be sent back to the CPU for further action.

In a hardware environment, the CFDG is downloaded to the CPU. When the hardware determines that a violation has occurred, then the instruction sequence can be captured as telemetry (e.g., the sequence of instructions that led to the violation and the violating instruction itself). Some predetermined number of preceding instructions can be configured to be captured. Such an implementation may reduce the set of CPU telemetry around the specific violations.

A system of one or more computers can be configured to perform particular operations or actions by virtue of having software, firmware, hardware, or a combination of them installed on the system, that in operation cause the system to perform the actions. One or more computer programs can be configured to perform particular operations or actions by virtue of including instructions that, when executed by data processing apparatus, cause the apparatus to perform the actions. One general aspect includes a method for monitoring a computing system. The method includes determining an observation phase for observing execution of processes on the computing system and determining telemetry, during the observation phase, representing execution of the processes. The method also includes generating a control flow directed graph based on the telemetry and determining a monitoring phase based at least in part on the control flow directed graph or other representation of valid control flow transitions (bloom filter, hash table and others). The method also includes monitoring transfers of instruction pointers at the computing system. The method further includes determining an invalid transfer based at least in part on the control flow directed graph. Other embodiments of this aspect include corresponding computer systems, apparatus, and computer programs recorded on one or more computer storage devices, each configured to perform the actions of the methods.

In some examples, implementations may include one or more of the following features. Determining the monitoring phase may include determining completion of the observation phase based at least in part on the control flow directed graph representing at least a threshold of application processes. Generating the control flow directed graph may be based on observed transfers during the observation phase, where the observed transfers during the observation phase are considered valid transfers. Determining the observation phase may include determining a predetermined observation time window to observe transitions by an application or a predetermined code percentage to observe. The method may further include reporting the invalid transfer to a security operations center. The telemetry may include central processing unit (CPU) telemetry, and where generating the control flow directed graph may include normalizing the CPU telemetry into a control flow directed graph representation. The monitoring phase may be performed using a hardware device of the computing system and where determining the invalid transfer is based at least in part on identifying an instruction sequence in the CPU telemetry that is not present in the control flow directed graph. Implementations of the described techniques may include hardware, a method or process, or computer software on a computer-accessible medium.

In some examples, implementations may include one or more of the following features. Determining the invalid transfer may include determining a transfer of an instruction pointer; comparing the transfer against the control flow directed graph; determining the transfer is not present in the control flow directed graph; and determining the transfer is the invalid transfer. Determining the monitoring phase may include determining completion of the observation phase based at least in part on the control flow directed graph representing at least a threshold of application processes. Generating the control flow directed graph (or any other data structure to record valid transitions such as bloom filters, hash tables, etc.) may be based on observed transfers during the observation phase, where the observed transfers during the observation phase are considered valid transfers. Determining the telemetry may include determining whether the processes are running on a computing device or within a virtual machine. Determining the invalid transfer may include inputting the transfers of instruction pointers into a machine learning model trained to identify invalid transfers based at least in part on transfers included in the control flow directed graph. The system may include reporting the invalid transfer to cloud-based system for monitoring one or more computing systems, Implementations of the described techniques may include hardware, a method or process, or computer software on a computer-accessible medium.

Given a learned CFDG for the process being monitored, the systems and methods described herein are able to detect the most advanced code-reuse attacks by observing new invalid transfers of the instruction pointer to attacker-selected code gadgets. Very often these attacks are very hard to detect by just doing, for example, system-calls monitoring because any modern application has very large profile of calls that it normally does, so attacker code can do a lot of damage and still easy maintain a completely valid system-call profile.

An aspect of this disclosure is about leveraging a sequence of CPU control flow transitions, which could be represented as the CFDG, a machine learning model or any number of other potential embodiments. After the CFDG is learned as described above, then the systems and techniques may monitor and enforce executions at the CPU according to the learned CFDG.

In some examples, since the CPU telemetry is collected in batches, a number of CPU instructions might have already executed at the time enforcement is taken. Effectively, enforcement might be delayed a few milliseconds relative to when the actual violating instruction took place. This still enables the systems and techniques to prevent the attacker exploit, which typically is many CPU instructions after the initial vulnerability (e.g., a buffer overflow) and first invalid transition has been made use of.

A number of software-based enforcements can be taken, and these will depend on the application environment. For example, if the application is running on a bare-metal system, and thus separated from the hardware it is running on by a single layer of abstraction only (i.e., the operating system), then a first option would be to simply kill the process.

If, on the other hand, the application is running within a virtual machine, then the virtual machine could be terminated via VM infrastructure management APIs (supported by VMWare, KVM, and other similar vendors). Similarly, if the application was running within a container, a termination command could be issued to via the container management API.

In addition to these all-or-nothing policy-enforcement options, there are also a number of other possibilities to prevent continuing execution of the binary.

One such example policy-enforcement option would be the use of function hooking mechanisms to block specific function calls from executing. Additionally, system calls can be intercepted by using eBPF hook methods. Using this approach, a subset of functions may be allowed to continue to operate, while others are blocked because they could impact the integrity of the system. For example, a thread-priority system-call might be allowed to continue to execute after a violation is observed, whereas a write operation might be blocked to prevent a critical file from being overwritten.

Another example might be to block certain function calls based on the execution context or the permissions the binary is operating with. For example, a system process might have a greater number of potential function calls blocked when a violation is observed, whilst a low privileged process might be allowed to make a broader set of function calls when a violation is detected because it presents a lower risk.

A third example may include letting an application continue to execute but to block all communications from the application from executing. This could include both remote and local communications, which may include sockets, files, RPC protocols, memory mapped I/O, etc. In such a scenario, an application that has violated the guardrails might be allowed to continue to run, but not be able to interact with any other application or system. Such guarded execution may be helpful to forensically analyze the intent of the attack, without actually enabling it to cause harm.

System calls could be classified based on their behaviors and given a risk score associated with that system call, Some system calls will be impacted by the data that is passed to the call and therefore the risk score of that system call may be weighted by the data passed to the call as a factor in the overall score. Using this technique, the decision as to what system calls can be made after a violation can be based on the risk scoring. Since OS APIs are well documented it would be relatively straightforward to build a catalog of system calls across various OSes and then build a risk scoring mechanism that accounts for the API, OS and data passed.

Another example may include intercepting key system calls and at the start of the call solution would decode CPU telemetry, say 100 or some other predetermine number of transitions before the intercepted system call and validate them according to the learned CFDG for the process. If all transitions leading to system call are valid according to the learned CFDG then the given call would be allowed, otherwise the call would be denied.

In a hybrid environment, a combination of both Software and Hardware can be combined to provide the enforcement. In an example, a hardware pipeline may be used to process the CPU telemetry and the analysis of the control flow is done on either an FPGA, GPU, ASIC, or other hardware device on the same system. The telemetry is pipelined to these other hardware devices without interfering with the operation of the workload on the CPU. In this mode, only the violations are sent to the CPU from the FPGA, GPU, or other hardware processing in the pipeline. Using this approach, the analysis and detection is done in hardware, while the enforcement (e.g., killing a process that violates the learned CFDG) is done in software similar to what is described in the software examples above. In some examples, a CPU halting mechanism may be used by the side-car hardware system (e.g., GPU or FPGA) using a bus or a UM system function such as C1/C1E or HALT-State. Other techniques could be invoked from hardware directly such as a Break-3 to target a specific process via the debugging function previously described.

Because the CPU telemetry is collected in batches, a number of CPU instructions might have already executed at the time enforcement is taken. Effectively, enforcement might be delayed a few milliseconds relative to when the actual violating instruction took place. As previously noted, this is deemed acceptable since the goal of the solution is to prevent the attacker exploit, which typically is many CPU instructions after the initial vulnerability (e.g., a buffer overflow) has been made use of. In some examples, as part of the process, the processor trace may be stopped in response to the system call and the transitions leading to the system call will be in the buffer but will be flushed upon stopping. After stopping, every transition leading to the system call can be examined, including those that were previously in the buffer.

In some examples, the systems and methods could also allow the sidecar hardware to send the violation event to some other hardware component outside of the CPU to perform the CPU-freeze operation if desired. This might be accomplished via UEFI interface, for example. In such a model, the security aspect of the solution is stronger, because the freezing is done from entirely outside of the OS/CPU ecosystem if desired.

In a hardware implementation, the learned CFDG computed for the workload is downloaded to the CPU hardware.

The CPU is then capable of enforcing the code execution directly in hardware at the time of instruction execution. In this embodiment, the generation of telemetry is entirely optional, or during learning phase only. When the hardware determines that a violation has occurred, the faulting instruction can be halted, and a new interrupt type can be used to indicate the instruction-halting. This new interrupt can be serviced by the OS to kill execution of the process. The CPU can optionally freeze all operations until the interrupt is serviced by OS. This new halting instruction is slightly different than the existing halt instruction, in that it is intended to halt operation of the offending process while allowing the CPU to service other processes scheduled by the kernel. The OS is expected to eject the offending process from continuing execution on the CPU. This could be by suspending all threads of execution, the offending thread of execution or termination of the process entirely, based on some policy.

Additionally, a telemetry event can be generated as to the halt, with or without a corresponding halt interrupt. There are three telemetry settings that may be used in some examples. (1) Full Telemetry, that is equivalent to existing telemetry feature offered on modern CPUs today. (2) Halting Telemetry wherein only telemetry associated with the halting event is generated. This can include a subset of CFDG sequences leading up to the violation that resulted in the halt (e.g., a small amount of historical control flow sequences leading up to and including the halting event). (3) No telemetry wherein there is no telemetry provided as to the halting event during enforcement mode. Regular telemetry is provided when learning the CFDG. The halting is performed on the process or workload, however no meta data is exchanged over the telemetry bus.

The transitions of CFDG can be stored in a Bloom Filter or a Bloom Filter Trie (BFT) or other fast search data structure for efficiency. While the whole CFDG could be stored in the CPU cache (or in generic memory accessible by the CPU), an enhancement is to store only a subgraph of the entire graph using a sliding window algorithm. This subgraph of the CFDG includes all the directly reachable nodes from the current instruction, plus N-depth child nodes set by configuration. As the CPU instructions traverse the nodes of the embedded subgraph, a refresh of the CPU-cached subgraph, from the full memory mapped graph, is done to include newly reachable nodes (and child nodes) from the original CFDG. This represents the sliding window approach described above. Restated, as the CPU executes instructions, it looks to see if enough node-depth remains in the subgraph and if it reaches some threshold (e.g., must-be-two-nodes deep), it automatically updates its cache with a new subgraph from the original CFDG to meet those constraints.

In some examples, enforcement of the learned CFDG may be accomplished by analyzing when for every given source address (address of call/jump) CPU is provided with quick CAM table which will provide entry for every valid destination. If no entry is found in such table, CPU knows that attempted transfer is not valid and generate halt instruction informing software with all the contextual information.

A system of one or more computers can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a method for monitoring a computing system that includes determining telemetry representing execution of a process on the computing system. The method further includes accessing a learned control flow graph for the process and determining a transfer of an instruction pointer based at least in part on the telemetry. The method also includes determining validity of the transfer based on the learned control flow graph and subsequently determining an action to terminate the process based at least in part on the validity. Other embodiments of this aspect include corresponding computer systems, apparatus, and computer programs recorded on one or more computer storage devices, each configured to perform the actions of the methods.

Implementations may include one or more of the following features. The action may include terminating the process on a bare metal computing system. The action may also include terminating a virtual machine running the process. The action may include blocking a set of system calls from execution by the computing system. Blocking the set of system calls may include determining a first set of system calls by determining system calls associated with security integrity of the computing device, determining a second set of system calls by determining system calls unrelated with security integrity of the computing device, and wherein the set of system calls may include the first set of system calls and not the second set of system calls. The set of system calls may include write operations. Determining the action may also be based on the risk score. Implementations of the described techniques may include hardware, a method or process, or computer software on a computer-accessible medium.

Implementations may include one or more of the following features. Determining the validity may include determining whether the transfer is included within the learned control flow graph. The action may also include enabling the process to continue while excluding communications from the process from executing. The communications may include communications to a remote computing system or a local computing system. The operations further may include determining a risk score for the transfer based at least in part on a security rating associated with the transfer, and wherein determining the action is further based on the risk score. The transfer may include a system call, and wherein determining the risk score for the system call may include accessing a cataloged risk score for the system call. The action may include determining CPU telemetry for a predetermined number of transitions before the transfer; validating the CPU telemetry for the predetermined number of transitions based at least in part on the learned control flow graph; and allowing the transfer in response to the CPU telemetry being validated based at least in part on the learned control flow graph. Implementations of the described techniques may include hardware, a method or process, or computer software on a computer-accessible medium.

In some examples, the learned CFDG can be embedded into a CPU instruction stream that it would constrain and/or restrict a set of valid targets at each call, jump, return transition to only a known set of targets determined based on the learned CFDG and/or based on observations. The learned CFDG may be embedded into generated binary after the learning or observation phase such that it is available to the CPU at run time to evaluate if a target of a call, jump, return, or other such transition is a valid destination, as learned. For example, an indirect call to a target address at run time may be evaluated to determine if the target address is within a valid set of destinations.

In some examples, the call instruction or other such instructions may include a pointer to a valid target destinations table that provides all or a subset of valid destinations from a given call site. So, when the CPU reaches the call instruction at run time, it fetches an address of the valid target destination table. If the target address of the call function is in the table, then the CPU performs the transition. In some examples, if the CPU finds that the destination address is not in the table, then it may call a default entry specified in the table such as a global default entry.

Similar to the call function, a jump instruction or return function can be analyzed at run time by the CPU based on the learned CFDG. The call function, jump function, and return functions operate in a similar manner from a control flow perspective as they transitions an intersection pointer address to a new location, accordingly the valid targets destination table may be generated as described herein and used by the CPU at run time when the functions are executed. In such examples, the valid target destinations table may include valid jump locations and return locations as well as calls. And the CPU may perform the jump or return if the address is included in the table, or may prevent or default to a global entry of the table if the address is not included in the table.

The examples above illustrate examples of ways the learned CFDG could be embedded into the program code with extension of key indirect transfer instructions. For example, a program or application could be compiled and linked and addresses of the valid target destinations table would point to a global table that would allow any transition for every transition which is computed at run time. Some of indirect transitions could be generated at this time as result of compiler producing jump tables as realization of a switch statements but other indirect targets would need be learned. Then compiled application would be run and monitored as described herein in order to produce the CFDG or set of valid transitions at the end of the learning phase. After the learning phase is completed, the learned CFDG or set of valid pair or other form would be provided to linker to update the valid target destination tables with actual information of valid transitions. The CFDG is then embedded for the CPU to use at run time.

In some examples, the learned CFDG may be used to allow a sequence of CFDG transitions to be determined from a current node that would lead to an exit node along an approved transition path. In such examples, the transition path would be enforced and only allow the software to follow the prescribed path to the exit of the workload.

A system of one or more computers can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a method for monitoring a computing system that includes determining a learned control flow directed graph for a program executed by a computing device and determining valid target destinations for one or more transitions within the program, the one or more transitions directing to a different portion of the program or to a separate program. The method also includes executing instructions of the program, and when executing a transition of the one or more transitions within the program to further determine a destination for the transition. The transition may be performed in response to the destination being included within the valid target destinations. A secondary action may be performed in response to the destination not being included within the valid target destinations. Other embodiments of this aspect include corresponding computer systems, apparatus, and computer programs recorded on one or more computer storage devices, each configured to perform the actions of the methods.

Implementations may include one or more of the following features. The one or more transitions may include at least one of a call, a jump, or a return within the program. Determining the learned control flow directed graph may include observing execution of the program during an observation phase and building the learned control flow diagram based on observed executions of the program. During the observation phase, determining the valid target destinations may include enabling any transitions at run time. Determining the valid target destinations may include identifying a set of destinations based on the learned control flow directed graph. During the observation phase the program is executed using a first set of valid target destinations, and where determining the valid target destinations may include determining a second set of valid target destinations for the transitions based on the learned control flow directed graph. The secondary action may include at least one of executing a transition to a default target destination or terminating the transition. Implementations of the described techniques may include hardware, a method or process, or computer software on a computer-accessible medium.

In some examples, some code that should be allowed to execute may not have been observed during the observation phase, and therefore is not included in the learned CFDG. The observed code that is part of the learned CFDG and safe neighbors of the observed code may be allowed to execute. In some examples, a software bill of materials analysis may be used to identify the safe neighbors. When a vulnerability is found in the code analysis of the software bill of materials, then it can be excluded from the learned CFDG (e.g., subtracting the portion of the CFDG related to the vulnerability). The software bill of materials can be updated via a cloud service in some examples such that the software bill of materials is up to date with the code of the application or workload. Mapping from the software bill of materials to the binary image may be used to identify suspect chunks of code in a way that can be correlated to the CFDG. A tainted. CFDG can be dynamically generated from the binary code using the running binary image of the vulnerable fragments of the code. The tainted CFDG can be subtracted from the learned CFDG to prevent execution of the vulnerable elements until the code is patched and the software bill of materials is updated. In some examples the nodes may be marked such that the learned CFDG remains the same but the nodes may be marked or annotated as tainted without subtracting from the CFDG.

In some examples, any new zero-day attacks or code reuse attacks observed in the wild can be fed into the software bill of materials analysis to indicate newly found but otherwise unknown vulnerabilities.

In an example, a software bill of materials analyzer compares known vulnerabilities (e.g., by looking at the last valid transition after which some invalid sequence begins) and con veils the tainted elements into a CFDG representation of the vulnerability. The monitoring system can then subtract and/or mark the CFDG representation of the vulnerability from the learned CFDG to prevent execution of the vulnerable code. The system can also identify and provide feedback on new unknown vulnerabilities observed in a system monitored as described herein.

A system of one or more computers can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a method for monitoring a computing system. The method includes determining a learned control flow directed graph for a process executed on the computing system. The method also includes determining a vulnerability within the process. The method also includes determining a software bill of materials (SBOM) for the process and determining a code portion of the process associated with the vulnerability based at least in part on the SBOM. The method further includes determining a tainted control flow directed graph for the code portion and excluding the tainted control flow directed graph from the learned control flow directed graph to generate a revised control flow diagram. The method further includes executing the process based on the revised control flow diagram to prevent execution of the vulnerability. Other embodiments of this aspect include corresponding computer systems, apparatus, and computer programs recorded on one or more computer storage devices, each configured to perform the actions of the methods.

Implementations may include one or more of the following features. Determining the vulnerability may include receiving notification of a vulnerability via a cloud-based system. Determining the SBOM may include receiving the SBOM from a cloud-based resource of a provider of the process. Determining the code portion of the process may include running a vulnerability scanner on an image of the process. Determining the code portion of the process may include mapping SBOM metadata associated with the code portion to a binary image of the process. Excluding the tainted control flow directed graph may include generating a revised SBOM excluding the code portion. Determining the learned control flow directed graph is based on observed transitions of the process during an observation phase and SBOM interpolation. Implementations of the described techniques may include hardware, a method or process, or computer software on a computer-accessible medium.

In some examples, the systems and methods described herein may be configured to add real-time enforcement capability to the CFDG by providing detailed information at the time of decision (e.g., enforcement). The monitor may take system call interceptions and for each intercepted system call it may analyze (by consulting with the learned CFDG) the sequence of transitions (of configured length N where N can be all transitions from last control point to a predetermined number of transitions such as 100 transitions) that led to this particular system call. This enables the enforcement to be inline and the process won't advance until the return from the system call happens. The monitor may analyze CPU telemetry and determine whether there was an anomaly in the sequence of transitions preceding the system call. It also helps substantially reduce amount of data being processed because the monitor would process only up to N transitions before the system call from CPU telemetry.

In some examples, the vertices in CFDG are addresses of code instructions to which transition observed to be taken during execution and edges represent indirect transitions between instructions. These transitions happen as result of execution by the CPU of control flow instructions like—return, jump, call, interrupt, and exception. If there are transitions not present in the learned CFDG they are considered violations and the enforcement could kill the process or stop the container which runs the compromised process. In some examples, the monitor may confirm that the code that was executed is exactly the same as was expected (e.g., it has same CFDG as when it was learned). It is a very precise behavioral fingerprint of the execution and allows to detect the attacks that are impossible to detect by other means.

In some examples, the CPU telemetry is decoded from a batch of packets. The number of code transitions during an execution can be a very large number, reaching millions of transitions per seconds. This generates a lot of telemetry that has to be parsed and matched against CFDG. It may take up a lot of CPU time to simply process the telemetry before detection can be made and action (kill the process, stop container can be made etc.). After the batch of telemetry is accumulated it takes some time to actually parse packets present in the batch and match against CFDG.

As described herein, during learning the full control flow graph of the selected executable is learned. During monitoring and enforcement, the CPU accumulates the telemetry but only the latest several batches are kept in memory, and may operate as a ring buffer. In this way, processing of the telemetry doesn't happen until one of the critical system calls is called by the monitored executable. The critical system call is identified as a system call that may potentially be exploited by the attacker. The moment one of them is called, the solution's kernel module collects the telemetry accumulated by CPU prior to this call. Then it decodes the telemetry and matches the transitions present there with the control flow graph learned during learning phase. If some of the transitions are not present in the graph then system call exists with error code (for example permission denied or similar). If all of the transitions found during the decoding are present in control flow graph then system call is allowed to be executed.

In some examples, it is possible to configure how much telemetry CPU can keep before it discards it to replace with newer telemetry. The more telemetry is kept the more processing needs to happen at the moment of the system call. But also, more telemetry means larger part of execution of the process is observed. For code reuse attacks, the common pattern among exploits is the usage of ROP/JOP/COP/COOP (Return/Jump/Call Oriented Programming) gadgets. Using the systems and methods described herein, it becomes easy to detect such attacks, because the preparation of arguments for system call and invocation of system call is done using gadgets and happen immediately before the system call invocation by the attacker. This doesn't require a lot of telemetry to be accumulated to be detected.

A system of one or more computers can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a method for monitoring a computing system. The method includes determining a learned control flow directed graph for a process executed on a computing system. The method also includes determining a system call during execution of the process and determining a predetermined number of transitions leading to the system call. The method also includes determining a validity for the predetermined number of transitions based at least in part on the learned control flow directed graph. The method also includes causing the computing system to perform an action based at least in part on the validity. Other embodiments of this aspect include corresponding computer systems, apparatus, and computer programs recorded on one or more computer storage devices, each configured to perform the actions of the methods.

Implementations may include one or more of the following features. Determining the system call may include capturing, via a CPU of the computing system, telemetry associated with the process and maintaining, in memory of the computing system, a predetermined number of batches of the telemetry. Determining the predetermined number of transitions may include determining transitions included in the predetermined number of batches of the telemetry. Determining the validity of the predetermined number of transitions may include decoding the telemetry to determine transitions and comparing the transitions against the learned control flow directed graph. The action may include determining an error in response to determining that at least one of the predetermined number of transitions is invalid based on the at least one of the predetermined number of transitions not being included in the learned control flow directed graph. The action may include performing the system call in response to determining that the predetermined number of transitions are included in the learned control flow directed graph. Determining the learned control flow directed graph may include observing execution of the process until at least a threshold percentage of code associated with the process is observed. Implementations of the described techniques may include hardware, a method or process, or computer software on a computer-accessible medium.

In some examples, there may be a set of instructions and/or addresses that were not observed during learning of the CFDG. Such unobserved transitions and instructions may be incorrectly labeled as invalid. Modern applications usually use a lot of function calls and branching, all of those generate code transitions. There may be of millions code transitions per seconds, and if there was not enough data given to the model for training there is a high chance of seeing big number of False Positives.

In some examples, the systems and methods described herein may identify code as safe by identifying that the code is likely to be executed and/or that code can't be potentially exploited. Then in case when there is violation of a learned CFDG (e.g., due to an unobserved transition), the transition is inspected to identify if it's safe or unsafe. If it is safe then no alert is issued. If it is unsafe then it is considered invalid.

In some examples, the evaluation of safe or unsafe may be performed with a fast or a slow mode. In the fast mode, the monitor may precompute sale code transitions by statically analyzing the executable and transferring the analyzed transition to the CFDG if the static analysis identifies that the code portion is safe. In the slow mode, the transition may be analyzed based on the context of the transition and the static analysis of the transition to find an explanation for the transition. If an explanation is determined, the transition then is declared valid (e.g., safe) and no alert is issued, if no explanation is found then the transition remains invalid (e.g., unsafe) and the alert is issued.

In some examples, various techniques can be used to classify code transitions as safe or unsafe. In a prediction-based technique, if the transition is a call instruction it is possible to check whether it landed on a known function start. If the transition didn't land on a function start it is unsafe. If the call site called a function from a certain module, expect only functions from same module to be called from same call site. In some examples, the analysis may Identify the function's signature (number of arguments, types of arguments) using decompilation techniques. Only functions with same signatures are expected to be called from same call site. If the call site was not encountered before during learning, the analysis of the call site can be performed to identify the preparation of arguments. The function with same arguments is expected to be called, from the same call location. In case of unknown jump transition, it may be limited to land on an instruction within the same function, it rarely happens in a normal compiled code that jump happens on the instruction outside its function. Return instructions typically land on the instruction following the call instruction.

In some examples, a fully automated decision system using Machine Learning may be implemented, the system will learn to predict call destination using encoded call site information. In some examples, the system can take both call site and call destination to predict whether the transition is safe or not.

In a risk-based technique, if the function contains system call within itself, the function will be considered high risk. Unknown transitions are safe only when they land on the non-high-risk functions. Some system calls may be considered low risk because they can't be exploited. System calls like set/get thread priority will have low risk, when system calls like write will have high risk. In some examples, risk is possible to propagate, functions that call high risk functions may also be considered high risk. Other considerations of risk might include the permissions that a workload has. For example, a workload running with elevated. (root) permissions would have higher risk than one running as with restricted permissions. As such, a system call running under a different permission may have a different risk profile. System calls are well documented across all operating systems and a system can be built to normalize these across all operating systems and apply a uniform risk if the system calls across operating systems have the same risk profile. This normalization can have special exceptions when a system call on one OS is riskier than on another OS. An additional distinguishing element might be the parameters passed to a given function (the data). The system could evaluate the data passed to the system calls to have an additional risk discriminator. For example, a file path passed to a write system call might be a different risk level based on the path itself (e.g., a system directory vs a user directory).

A system of one or more computers can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a method for monitoring a computing system. The method includes determining a learned control flow diagram for a process executed on a computing system by observing executions of transitions during an observation period and monitoring execution of the process on the computing system using the learned control flow diagram. The method also includes determining an unobserved transition of the process based at least in part on the learned control flow diagram. The method also includes determining a classification of safe or unsafe for the unobserved transition by analyzing, using a monitoring component, the unobserved transition. The method also includes performing an action based at least in part on the safety classification and the learned control flow diagram. Other embodiments of this aspect include corresponding computer systems, apparatus, and computer programs recorded on one or more computer storage devices, each configured to perform the actions of the methods.

Implementations may include one or more of the following features. Analyzing the unobserved transition may include statically analyzing the transition. The action may include adding the unobserved transition to the learned control flow directed graph in response to the classification being safe. Determining the classification for the unobserved transition may include determining a context for the transition, performing a static analysis of the unobserved transition, determining the unobserved transition is safe in response to determining a reason for the transition based at least in part on the context and the static analysis, and determining the unobserved transition is unsafe in response to being unable to determine a reason for the transition based at least in part on the context and the static analysis. Determining the classification for the unobserved transition may include determining a type of transition for the unobserved transition, determining a destination for the unobserved transition, determining a characteristic of the destination, and determining the classification using a machine learned model using inputs of the type of transition, the destination, the characteristic of the destination, and the learned control flow directed graph. Determining the classification for the unobserved transition may include, determining a destination linked by the unobserved transition, and determining a risk score associated with the destination, and where the classification is based at least in part on the risk score of the destination. The risk score may further be based on at least one of a presence of a system call at the destination, permissions associated with the destination, a presence of propagating transitions to additional destinations, or a presence of the destination within the learned control flow directed graph. Implementations of the described techniques may include hardware, a method or process, or computer software on a computer-accessible medium.

In some examples, by combining this CFDG context with other Indicators of Compromise (IOCs), valuable insights can be delivered to one or more customers across industries. In some examples, distributed monitoring agents may be running the techniques and systems described herein to monitor and enforce application control flow integrity. In some examples, a centralized control plane may be used to manage monitor agents monitoring CPU telemetry in a distributed environment. The control plane may have a birds-eye overview of expected and observed behavior within a given organizational environment. Accordingly, the control plan can provide real-time view of any zero-day attacks happening within an organization. Additionally, the insights may be provided to security operators in real time. In some examples, the control plane may be used to share such real-time zero-day attack information with industry peers, as an early warning system for newly observed attacks in-progress. To this end, the control plane may anonymously send a report of a given observed attack to a cloud-based machine-learning system for sharing this information with industry peers.

In some examples, the customer reports would include general details about the given customer, to facilitate industry peer comparisons. For example, such reports may include (but are not limited to customer industry, customer size, geographic location of incident(s), application affected, affected system types (e.g., bare-metal systems, VMs, containers, operating systems, versions, etc.), and other such information. Security operators could use the report data to perform industry peer comparisons to identify similar issues within their own environments, to help zero in on the root cause of the exploit. Such peer comparisons could be aligned vertically (according to industry type) or horizontally (by systems) and could answer critical questions such as (i) are other companies in my own industry vertical (e.g., financials, manufacturers, retailers, etc.) running this application/ workload seeing the same anomalous behavior that I am? Additionally, the reports may help to identify if (ii) other companies running this version of this application/workload seeing the same anomalous behavior that I am? In some examples, a specific application and/or version that may be targeted can be identified and the system could immediately report these findings to the application software vendor. In some examples, the analysis could be reported as an Indicator of Compromise (IOC) for publishing via the standard IOC pub-protocol.

In some examples, as the geographic location of affected systems could also being reported to the system, and the location information could likewise be shared with industry peers to show how the attack is progressing—in real time—by geographic regions. Such analysis and information may aid in identifying an origin of the attack, spread of the attack, how fast the attack is spreading, and other such information.

Additionally, the system could also feed information back to control planes in given customer locations so that policies could be dynamically enabled to automatically adapt to the attack in progress. For example, the policies may include (but are not limited to) pre-emptively enforcing a more stringent CFDG, accelerating the observation; learning process by looking for outliers only and applying the CFDG, pre-emptively changing the enforcement policies to advance from a more lenient policy (such as alerting-only) to a more strict policy (such as automatic application termination when a violation is detected), pre-emptively changing the confidence score threshold to a lower value so as to more quickly transition from the observation phase to the enforcement phase, or to immediately advance to the enforcement phase from the observation phase.

A system of one or more computers can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a method for monitoring a computing system. The method includes receiving a first report of a first anomaly from real-time control flow graph diagram monitoring of first application executions at a first computer system and receiving a second report of a second anomaly from real-time control flow graph diagram monitoring of second application executions at a second computer system. The method also includes generating, using a machine learned model receiving inputs of the first report and the second report, application exploit report data. The method also includes providing, to a cloud-based exploit reporting tool available to the first computer system and the second computer system, the application exploit report data. Other embodiments of this aspect include corresponding computer systems, apparatus, and computer programs recorded on one or more computer storage devices, each configured to perform the actions of the methods.

Implementations may include one or more of the following features. The first report and the second report are anonymized to remove identifying information associated with the first computer system and the second computer system. the first report may include information describing the first anomaly, the first application, the first computer system, and a first client associated with the first computer system and the second report may include information describing the second anomaly, the second application, the second computer system, and a second client associated with the second computer system. The application exploit report data may include information describing one or more characteristics shared between the first client and the second client including at least one of an application version or an industry sector. The first application is different from the second application. The application exploit report data identifies a portion of code within the first application related to the first anomaly, the portion of code determined based at least in part on the control flow directed graph for the first application. The first report may include geographic information related to the first anomaly, the second report may include second geographic information related to the second anomaly, and the application exploit report data may include geographic scope and location tracking of the anomaly. Implementations of the described techniques may include hardware, a method or process, or computer software on a computer-accessible medium.

In some examples, disassemblers may be used to reverse engineer code of malware binary as well as identify potential vulnerabilities in applications. In order to understand the binary one of the steps is performing disassembly of the code and providing the associated assembly code instructions as a result. A linear sweep disassembler performs disassembly in a linear fashion. It assumes that first byte of code section indicates first valid instruction. After the current instruction is disassembled and converted into assembly from binary code, the next instruction would be found after advancing N bytes (depending on the size of decoded instruction and its operands) and decoding this next instruction. Disassembly would continue until end of code section would be reached. Recursive Descent Disassembly uses control flow instructions when deciding what next instruction to decode after such control flow instructions (jump/ call/conditional jump and other versions of such transfers). When decoding reaches control flow instructions, the disassembler would follow the transition to choose next instruction.

The systems and techniques described herein may be used to provide the learned CFDG to decode with a disassembler such that the CFDG is used to identify proper destinations to decode. The destinations guided by the CFDG may indicate where code belongs and provide an understanding of internals of a monitored application. Due to more and more abstractions in modern applications indirect calls are very large part of modern code—software abstractions like vtables, function pointers, shared libraries, jump tables and more. Accordingly, disassemblers may be unable to correctly decode. The target code that is reachable by indirect jump/call/transition can be decoded because the systems and methods herein use the learned target addresses as valid destinations for indirect transfers. As a result, the CFDG can be used to point the disassembler at a correct offset and disassemble code correctly from the address. The CDFG can be imported, along with any other implementations such as unique targets, that record observed transitions for a disassembled application. The imported targets are provided into disassembler as valid offsets from which execution was observed to begin and as result disassembly process can begin.

A system of one or more computers can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a method for disassembling code. The method includes determining a learned control flow directed graph for executable code of an application by observing executions of transitions within the executable code during an observation period. The method also includes determining one or more destinations of indirect transfers within the executable code based on the learned control flow directed graph, the indirect transfers to be computed at run time of the executable code. The method further includes determining a disassembly of the executable code based at least in part on the learned control flow directed graph, the one or more destinations of direct transfers, and the executable code. Other embodiments of this aspect include corresponding computer systems, apparatus, and computer programs recorded on one or more computer storage devices, each configured to perform the actions of the methods.

Implementations may include one or more of the following features. Determining the disassembly may include using a linear disassembler or a recursive disassembler. Determining the disassembly may also include providing the destinations as valid targets to a disassembler for the indirect transfers. Determining the disassembly may include importing the control flow directed graph and the executable code into a machine learned disassembler configured to determine valid destinations for indirect transfers within the executable code based at least in part on the control flow directed graph. Determining the disassembly may include performing disassembly of the executable code, determining indirect transfers within the executable code, and providing the associated assembly code instructions as valid targets of the indirect transfers for the disassembly. Determining the disassembly may include determining full coverage of the executable code based at least in part on the control flow directed graph. Determining the learned control flow directed graph may include observing at least a threshold percentage of the executable code. Implementations of the described techniques may include hardware, a method or process, or computer software on a computer-accessible medium.

Turning now to the figures, FIG. 1 illustrates an example system architecture for control flow monitoring using a learned control flow graph, according to at least one example. The monitoring system 100 provides for extremely secure (detecting most advance code reuse attacks) workload execution monitoring in real-time allowing for the enforcement of the intended operations of the workloads to be done in a highly secure manner.

The monitored host 104 may include a computing device and may include a local device as well as various virtual workloads such as bare metal machines, virtual machines, and containers. The monitored host 104 includes a CPU 112 that produces CPU telemetry 114 as the CPU executes the processes and containers 116. Additionally, the monitored host 104 includes a kernel module 108 that may provide operating system (O/S) level telemetry (0/S telemetry 110)

as the processes and containers 116 are executed, A monitoring agent 106 of the monitored host 104 receives the O/S telemetry 110 and the CPU telemetry 114 for monitoring the executions of the processes and containers 116.

Using the CPU telemetry 114, the monitoring agent 106, which is in communication with a control center 102, monitors execution of any process of interest, whether these processes are running on bare metal, within virtual machines, or inside of containers.

In an example, the monitoring agent 106 uses a hardware-assisted technology to apply a learned CFDG to monitor the monitored host 104. The monitoring agent 106 initially learns the CFDG in an observation phase and then monitors or enforces, during an enforcement phase, executions according to the learned CFDG. In some examples these two phases can be done together. In the observation phase, the processes, and containers 116 are executed as normal, such as during a trial phase or initial setup phase. The observation phase may include observing executions based on the CPU telemetry 114 and/or the O/S telemetry 110 and building the CFDG based on observed executions. In this manner, the CFDG is a learned CFDG built based on observed executions by the application occurring at the CPU 112 and/or the kernel.

After some predetermined period of time (e.g., seconds, minutes, days, weeks, etc.) and/or based on coverage on an amount of the code of the processes and containers 116 (e.g., when the observed code used to build the learned CFDG reaches a threshold such as 50%, 60%, 70%, 80%, 90%, etc.), then the observation phase may automatically be completed. In some examples, the observation phase may be monitored by a security team who may determine when to exit the observation phase and enter a monitoring phase.

Using the CPU telemetry 114 and/or the O/S telemetry 110, the monitoring agent 106 monitors execution of the processes and containers 116, whether these processes are running on bare metal, within virtual machines, or inside of containers. Given a learned CFDG for the process being monitored, the monitoring agent 106 is able to detect the most advanced code-reuse attacks by observing invalid transfers of the instruction pointer to attacker-selected code gadgets. The monitoring agent 106 can leverage the CPU telemetry 114 and/or the O/S telemetry 110 to monitor executions using the learned CFDG, a machine learning model, or any number of other potential embodiments.

In the monitoring phase, the CPU telemetry 114 and/or the O/S telemetry 110 may be compared, by the monitoring agent 106 against the learned CFDG to identify deviations from the learned CFDG and thereby identify potential code reuse attacks or other potential exploits before they can be executed. In some examples, only observed transitions during the observation period will be allowed to execute, and others may be treated as invalid transfers and either cause a default action (e.g., cancel the execution), remedial action, or identify further information (e.g., the sequence that led to the invalid request to determine if the request should be valid based on a valid sequence leading to the request). The monitoring may be locally performed, performed using a cloud-based system using a monitoring agent at the local device, monitored on a network, or otherwise implemented.

In some examples, the control center 102 may receive alerts from the monitoring agent 106 indicative of deviations from the learned CFDG. The control center 102 may provide additional functionality, such as to enable a security operations center (SOC) to appropriately respond, including reporting of the exploit and; or directing the monitored host

104 how to respond, whether to kill the process, redirect, shut down the monitored host 104, or other such actions.

Given a learned CFDG for the process being monitored, the monitoring agent 106 may be embodied in software, hardware, or hybrid environments that use both software and hardware for observing and monitoring application processes. In the software embodiment, the CPU 112 produces the CPU telemetry 114 that represents executions of a process in terms of CPU instructions. The CPU telemetry 114 and/or the O/S telemetry 110 from the kernel module 108 as well as other telemetry feeds from different CPUs may be directed to the monitoring agent 106. The telemetry may be represented in a CFDG representation that allows any CPU 112, regardless of format, language, or specific embodiment, to provide instruction level monitoring at the CPU telemetry 114 level across devices. This normalization to the CFDG enables analysis to be run on the CFDG independent of the CPU 112 generating the CPU telemetry 114, meaning that the techniques and processes described herein may be rolled out and implemented with a wide variety of CPU technologies. Furthermore, in some examples, workloads may run on different levels of abstraction from hardware, such as on bare metal, virtual machines (VMs) or container ecosystems. The CFDG enables consistent analysis and monitoring of such varied operating environments.

For example, in the case of applications running on bare-metal systems, the correlation between a given application and the CPU 112 that it is executing on is directed by the O/S. This presents the simplest application-to-CPU telemetry mapping scenario. A more complex scenario is presented with virtual machines. In some examples, VM technologies have already included abstraction of the CPU telemetry capabilities natively into their hypervisor ecosystem. Whenever already supported, such CPU monitoring capabilities can be leveraged to provide application-to-CPU correlations in a normalized and consistent manner. In some examples, the CFDG representation at the abstraction layer for a particular CPU 112 may be added for monitoring and enforcement. In some examples, CPU telemetry 114 may not be readily available or exist. In such examples, the systems and methods herein may provide a virtualization layer that provides an equivalent of CPU telemetry 114 or an abstraction of the application or workload.

In a hybrid environment, a combination of both software and hardware can be combined to provide the observability and monitoring functionality. In such examples, the CPU telemetry 114 can be substantial, on the order of gigabits per second that may cause problems for scaling the monitoring capability. In some examples, the CPU telemetry 114 may be directed to a sidecar hardware component (such as a hardware component that may be part of the monitoring agent 106) to perform analysis. In this embodiment a hardware pipeline would be used to process the CPU telemetry 114 and the analysis of the control flow is done on either an FPGA, GPU, ASIC, or other hardware device on the same system. In such examples, the CPU telemetry 114 is pipelined to these other hardware devices without interfering with the operation of the workload on the CPU 112. In this mode, only the violations (e.g., results of monitoring and enforcement that require action) are sent back to the monitoring agent 106 from the FPGA, GPU, or other hardware processing in the pipeline. In such examples, analysis and detection may be performed on hardware and only violations, or executions that trigger enforcement, would be sent back to the CPU 112 for further action.

In a hardware environment, the CFDG is downloaded to the CPU 112. When the hardware determines that a violation has occurred, then the instruction sequence can be captured as CPU telemetry 114 (e.g., the sequence of instructions that led to the violation and the violating instruction itself). Some predetermined number of preceding instructions can be configured to be captured by the monitoring agent 106 and reported to the control center 102. Such an implementation may reduce the set of CPU telemetry 114 around the specific violations.

Given a learned CFDG for the process 116, the monitoring agent 106 may capture the CPU telemetry 114 in batches, such that a number of CPU instructions might have already executed at the time enforcement is taken. Effectively, enforcement might be delayed a few milliseconds relative to when the actual violating instruction took place. This still enables the monitoring agent 106 to prevent the attacker exploit, which typically is many CPU instructions after the initial vulnerability (e.g., a buffer overflow) and first invalid transition has been made use of.

A number of software-based enforcements can be taken by the monitoring agent 106, and these will depend on the application environment. For example, if the application is running on a bare-metal system, and thus separated from the hardware it is running on by a single layer of abstraction only (i.e., the operating system), then a first option would be to simply kill the process.

If, on the other hand, the application is running within a virtual machine, then the virtual machine could be terminated via VM infrastructure management APIs (supported by VMWare, KVM, and other similar vendors). Similarly, if the application was running within a container, a termination command could be issued to via the container management API.

In addition to these all-or-nothing policy-enforcement options, there are also a number of other possibilities to prevent continuing execution of the binary. One such example policy-enforcement option would be the use of function hooking mechanisms to block specific function calls from executing. Additionally, system calls can be intercepted by using eBPF hook methods. Using this approach, a subset of functions may be allowed to continue to operate, while others are blocked because they could impact the integrity of the system. For example, a set/get thread-priority system-call might be allowed to continue to execute after a violation is observed, whereas a write operation might be blocked to prevent a critical file from being overwritten.

Another example might be to block certain function calls based on the execution context or the permissions the binary is operating with. For example, a system process might have a greater number of potential function calls blocked when a violation is observed, whilst a low privileged process might be allowed to make a broader set of function calls when a violation is detected because it presents a lower risk.

A third example may include letting an application continue to execute but to block all communications from the application from executing. This could include both remote and local communications, which may include sockets, files, RPC protocols, memory mapped I/O, etc. In such a scenario, an application that has violated the guardrails might be allowed to continue to run, but not be able to interact with any other application or system. Such guarded execution may be helpful to forensically analyze the intent of the attack, without actually enabling it to cause harm.

In some examples, system calls could be classified based on their behaviors and given a risk score associated with that system call. Some system calls will be impacted by the data that is passed to the call and therefore the risk score of that system call may be weighted by the data passed to the call as a factor in the overall score. Using this technique, the decision as to what system calls can be made after a violation can be based on the risk scoring. Since OS APIs are well documented it would be relatively straightforward to build a catalog of system calls across various OSes and then build a risk scoring mechanism that accounts for the API, OS and data passed.

Another example may include intercepting key system calls and at the start of the call solution would decode CPU telemetry 114, a predetermined number of transitions before the intercepted system and validate them according to the learned CFDG for the process. If all transitions leading to system call are valid according to the learned CFDG then the given call would be allowed, otherwise the call would be denied.

In a hybrid environment, a combination of both software and hardware can be combined to provide the enforcement through the monitoring agent 106. In an example, a hardware pipeline may be used to process the CPU telemetry 114 and the analysis of the control flow is done on either an FPGA, GPU, ASIC, or other hardware device on the same system. The telemetry is pipelined to these other hardware devices without interfering with the operation of the workload on the CPU 112. In this mode, only the violations are sent to the monitoring agent 106 from the FPGA, GPU, or other hardware processing in the pipeline. Using this approach, the analysis and detection is done in hardware for performance and added security, while the enforcement (e.g., killing a process that violates the learned CFDG) is done in software similar to what is described in the software examples above. In some examples, a CPU halting mechanism may be used by the side-car hardware system (e.g., GPU or FPGA) using a bus or a UEFI system function such as C1/C1E or HALT-State. Other techniques could be invoked from hardware directly such as a Break-3 to target a specific process via the debugging function previously described.

In some examples, the monitoring agent 106 could also allow the sidecar hardware to send the violation event to some other hardware component outside of the CPU 112 to perform the CPU-freeze operation if desired. This might be accomplished via UM interface, for example. In such a model, the security aspect of the solution is stronger, because the freezing is done from entirely outside of the OS/CPU ecosystem if desired.

In a hardware implementation, the learned CFDG computed for the workload is downloaded to the CPU 112. The CPU 112 is then capable of enforcing the code execution directly in hardware at the time of instruction execution. In this embodiment, the generation of telemetry is entirely optional. When the hardware determines that a violation has occurred, the faulting instruction can be halted, and a new interrupt type can be used to indicate the instruction-halting. This new interrupt can be serviced by the OS to kill execution of the process. The CPU 112 can optionally freeze all operations until the interrupt is serviced by OS. This new halting instruction is slightly different than the existing halt instruction, in that it is intended to halt operation of the offending process while allowing the CPU 112 to service other processes scheduled by the kernel module 108. The OS is expected to eject the offending process from continuing execution on the CPU 112. This could be by suspending all threads of execution, the offending thread of execution or termination of the process entirely, based on some policy.

Additionally, a telemetry event can be generated as to the halt, with or without a corresponding halt interrupt. There are three telemetry settings that may be used in some examples. (1) Full Telemetry, that is equivalent to existing telemetry feature offered on modern CPUs today. (2) Halting Telemetry wherein only telemetry associated with the halting event is generated. This can include a subset of CFDG sequences leading up to the violation that resulted in the halt (e.g., a small amount of historical control flow sequences leading up to and including the halting event). (3) No telemetry wherein there is no telemetry provided as to the halting event during enforcement mode. Regular telemetry is provided when learning the CFDG. The halting is performed on the process or workload, however no meta data is exchanged over the telemetry bus.

The CFDG can be stored in a Bloom Filter or a Bloom Filter Trie (BFT) for efficiency. While the whole CFDG could be stored in the CPU cache (or in generic memory accessible by the CPU), an enhancement is to store only a subgraph of the entire graph using a sliding window algorithm. This subgraph of the CFDG includes all the directly reachable nodes from the current instruction, plus N-depth child nodes set by configuration. As the CPU instructions traverse the nodes of the embedded subgraph, a refresh of the CPU-cached subgraph, from the full memory mapped graph, is done to include newly reachable nodes (and child nodes) from the original CFDG. This represents the sliding window approach described above. Restated, as the CPU 112 executes instructions, it looks to see if enough node-depth remains in the subgraph and if it reaches some threshold (e.g., must-be-two-nodes deep), it automatically updates its cache with a new subgraph from the original CFDG to meet those constraints.

In some examples, enforcement of the learned CFDG may be accomplished by analyzing when for every given source address (address of call/jump) the CPU 112 is provided with quick CAM table which will provide entry for every valid destination. If no entry is found in such table, the CPU 112 knows that attempted transfer is not valid and generate halt instruction informing software with all the contextual information.

Figure 2:
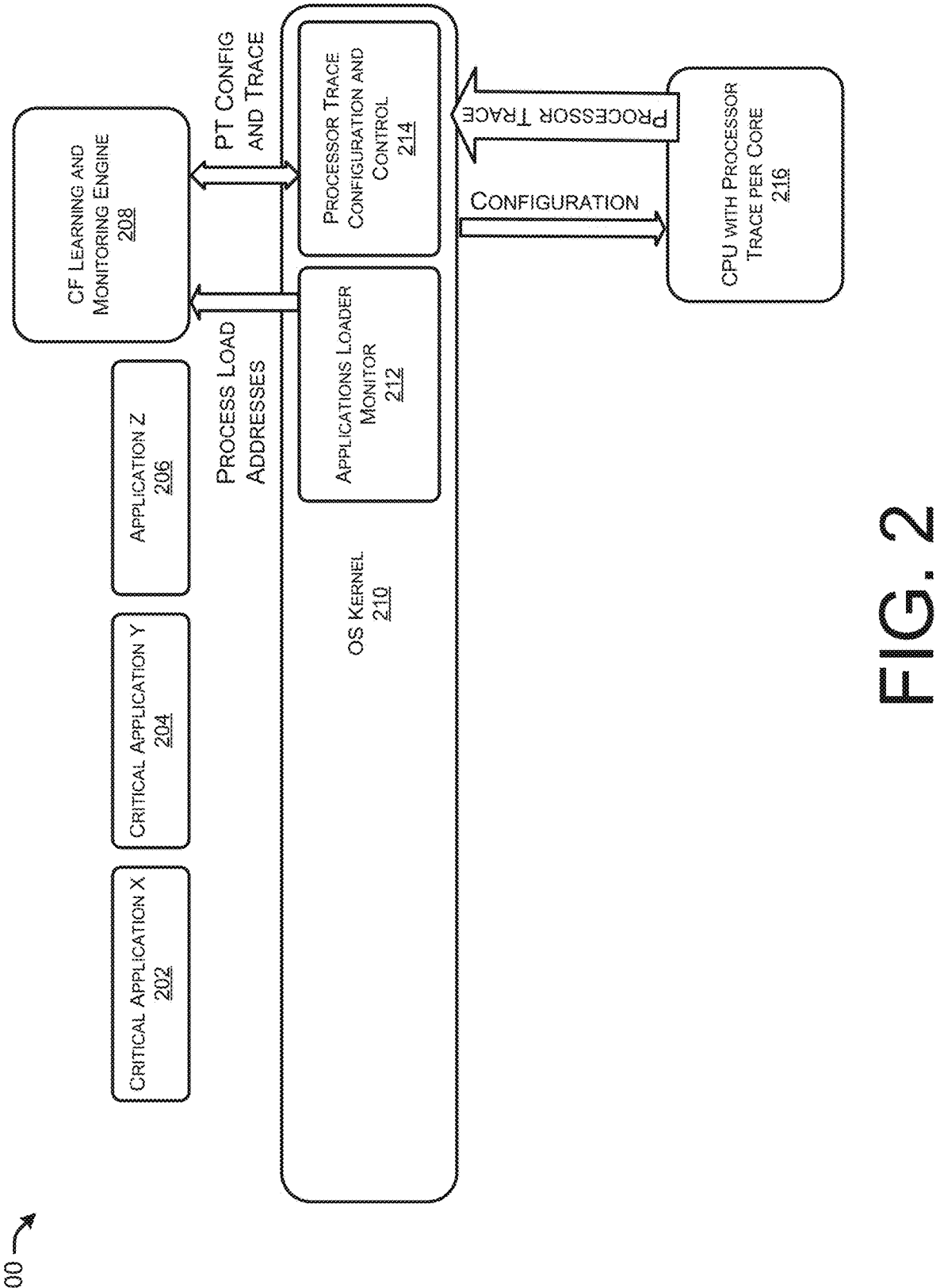
FIG. 2 illustrates an example control flow monitor architecture, according to at least one execution example.

FIG. 2 illustrates an example control flow monitor architecture 200, according to at least one example. The architecture 200 includes a critical application X 202, a critical application Y 204, an application Z 206, and a control flow learning and monitoring engine 208. The control flow learning and monitoring engine 208 ("monitoring engine 208") may be used to monitor the applications and the executions by the CPU 216 and/or the OS kernel 210. The monitoring engine 208 may receive processor trace configuration and trace information from a module 214 of the OS kernel 210 based on processor trace of the CPU 216. The monitoring engine 208 additionally receives process load addresses from an application loader monitor 212 of the OS kernel 210.

In operation, the monitoring engine 208 provides real time learning and monitoring of the control flow diagram graph for running processes, including those associated with the applications 202, 204 and 206. The monitoring engine 208 may detect one or more invalid transitions based on the learned CFDG as described herein. With the architecture 200, no pre-processing is required or binary modifications before the monitoring can take place, thereby enabling the real time monitoring.

Figure 3:
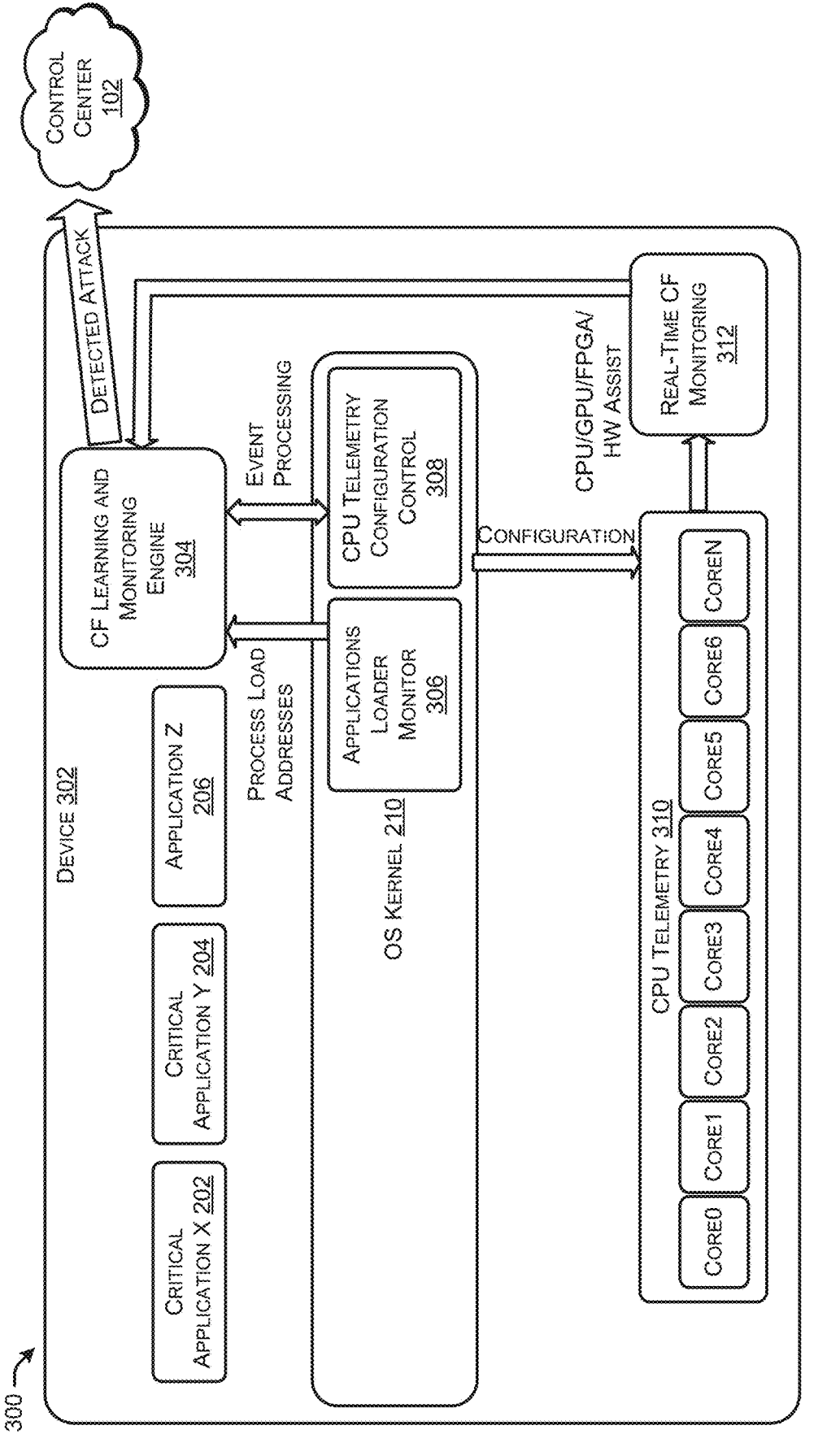
FIG. 3 illustrates an example system architecture for a software and hardware accelerated system to observe and monitor application executions, according to at least one execution example.

FIG. 3 illustrates an example system architecture 300 for a hardware software and hardware system to observe and monitor application executions, according to at least one example. In the example system architecture 300, the CFDG computed for a workload is downloaded to the device 302 that is being monitored. When the monitoring engine 304 determines that a violation has occurred based on CPU telemetry 310 and the CPU telemetry configuration control 308, the faulting instruction sequence can be captured as telemetry (e.g., what instruction sequence led to the violation and the violating instruction itself). This could be driven by policy where the number of preceding instructions can be configurable. Since this is only monitoring for violations, some number of subsequent calls, post violation, can also be sent (based on policy). This results in a greatly reduced set of CPU telemetry focused only around the violations. In this system, the reduced telemetry set can be sent to an on-prem or cloud analytics platform for further evaluation and action.

The CFDG can be optimized using a sliding window approach to load the intended instruction sequences in a smaller set to improve optimization of the use of the CPU cache.

In some examples, the CPU telemetry 310 may be provided to a GPU/FPGA/ASIC 312 for real-time monitoring of the control flow graph. The GPU 312 may communicate the real-time monitoring with the monitoring engine 304. Because the instruction-pointer level data of the CPU telemetry 310 can be substantial, the GPU may be used as a hardware pipeline to process the CPU telemetry 310 and provide analysis of the CFDG, In this manner, the CPU telemetry 310 is pipelined to these other hardware devices without interfering with the operation of the workload on the CPU. In this mode, only the violations are sent back to the monitoring engine 304 from the GPU 312. The pipeline might use a private bus if that is available. Using this approach, the analysis and detection is done in hardware and only the violations are sent back to the CPU for further treatment. Alternatively, the sidecar hardware could send the violation events to the cloud-based control center 102 directly.

In some examples, CFDG may be leveraged to identify and prevent execution of vulnerable code sections and/or malicious code sections. There are two phases to the process, observation, and policy enforcement. In some scenarios these two phases can be done together. There are several monitoring embodiments possible by the monitoring engine 304, including (1) a software embodiment: (2) a hybrid embodiment; and (3) a hardware embodiment.

In the software embodiment example, the CPU can produce CPU telemetry 310 that represents the execution of a process in terms of CPU instructions. The telemetry from disparate types of CPUs may be represented in a common format that represents the execution flow of an application or workload, the CFDG. In this example, we normalize the CPU instructions into a common Control Flow Directed Graph representation that allows any CPU technology, that offers instruction-level monitoring capabilities, to be represented in a common format. This normalization allows for analysis to be run on the control flow independent of the CPU system that is generating the telemetry.

Additionally, there are scenarios where workloads run on different levels of abstraction from the hardware—Bare metal, VMs or container ecosystems. In order to provide for a consistent outcome, the correlations between CPU instruction telemetry and the application needs to be normalized, despite additional layers abstraction that may be present, such as hypervisors or container orchestrators.

In the case of applications running on hare-metal systems, the correlation between a given application and the CPU(s) that it is executing on is directed by the operating system.

This presents the simplest application-to-CPU telemetry mapping scenario. A more complex scenario is presented with virtual machines.

In some cases, VM technologies have already included the abstraction of the CPU monitoring capabilities natively into their hypervisor ecosystem, while in other cases they have not done so. As such, wherever already supported, these CPU monitoring capabilities can be leveraged and expanded to provide the application-to-CPU correlations in a normalized manner, so that these may be consumed in a single format. For example, the techniques may include selecting one of the vendor formats and provide a conversion mechanism to make other CPU telemetry ecosystems match that raw format. Alternatively, the techniques may include simply adding the final CFDG representation at the abstraction layer for a CPU ecosystem that is not already supported for hypervisors or other virtualized ecosystems.

Finally, in some cases, where direct access to the CPU telemetry is not possible, another means of correlation of the application to the CPU telemetry is required. In such a scenario, we will either provide a thin virtualization layer that provides the equivalent CPU instruction-level telemetry or an abstraction directly underneath the application or workload. When this added abstraction layer is needed, the system will additionally normalize the data representation independent of the physical CPU used to execute the application or workload via the CFDG method.

In a hybrid environment, a combination of both Software and Hardware can be combined to provide the observability and monitoring functionality. The CPU telemetry 310, particularly at the instruction-pointer level, can be substantial. Often the amount of data produced by the CPU telemetry engine is gigabits per second. This makes it hard to build a practical solution that is highly scalable. One improvement that can be made is to feed the CPU telemetry to a sidecar hardware component to perform the analysis. In this embodiment a hardware pipeline would be used to process the CPU telemetry and the analysis of the control flow is done on either an FPGA, GPU, ASIC, or other hardware device on the same system. The CPU telemetry 310 is pipelined to these other hardware devices without interfering with the operation of the workload on the CPU. In this mode, only the violations are sent back to the CPU from the FPGA, GPU, or other hardware processing in the pipeline. The pipeline might use a private bus if that is available or use an existing bus if there is no means to do this via, a dedicated private mechanism. Using this approach, the analysis and detection is done in hardware and only the violations are sent back to the CPU for further treatment (such as sending to an on-premises or cloud analytics system). Alternatively, the sidecar hardware could send the violation events to the cloud analytics directly, providing for better performance and improved security.

In a hardware embodiment, the CFDG computed for the workload is downloaded to the CPU hardware. When the hardware determines that a violation has occurred, the faulting instruction sequence can be captured as telemetry (e.g., what instruction sequence led to the violation and the violating instruction itself). This could be driven by policy where the number of preceding instructions can be configurable. Since this is only monitoring for violations, some number of subsequent calls, post violation, can also be sent (based on policy). This results in a greatly reduced set of CPU telemetry focused only around the violations. In this system, the reduced telemetry set can be sent to an on-premises or cloud analytics platform for further evaluation and action.

Figure 4:
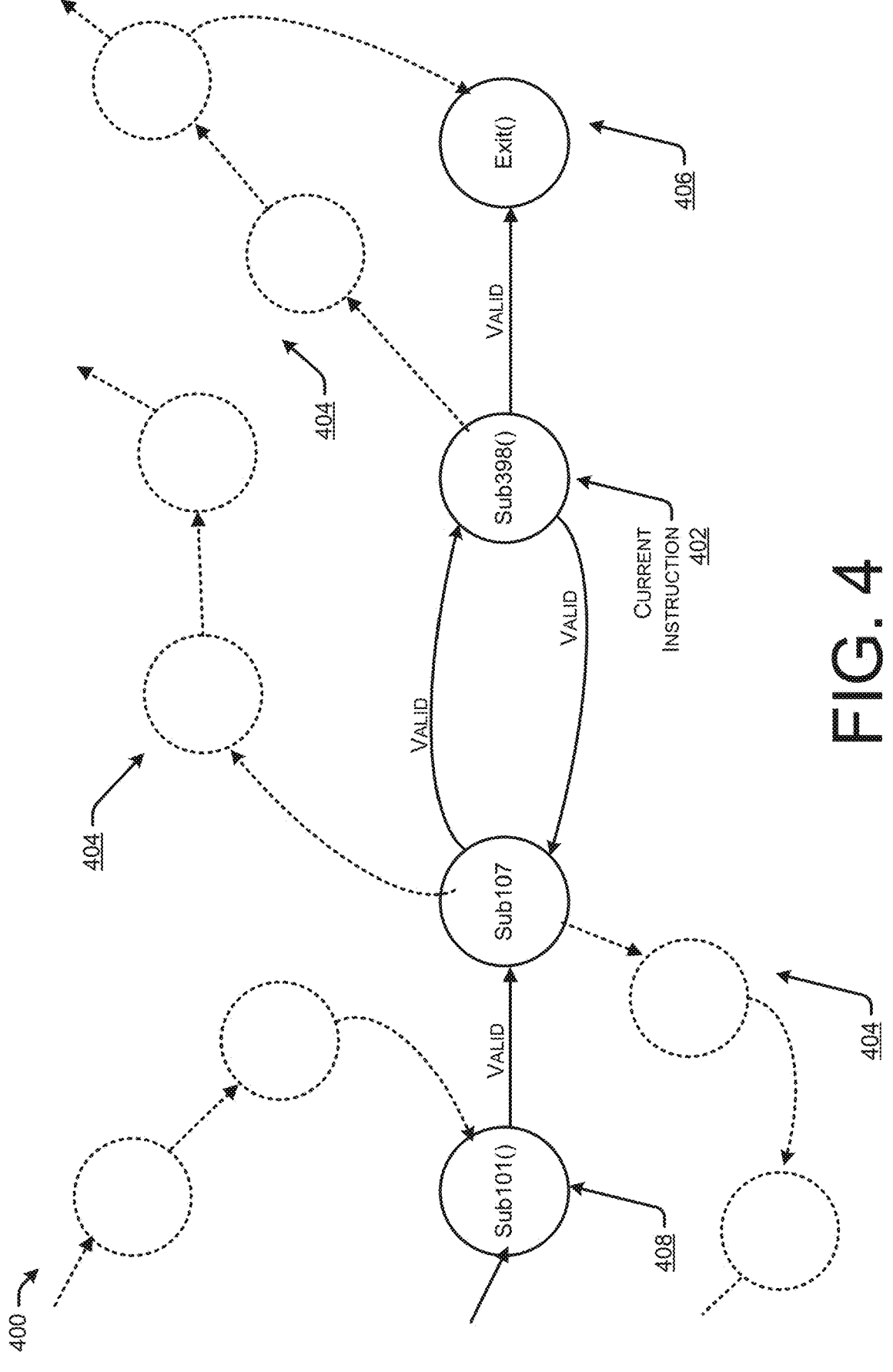
FIG. 4 illustrates an example of a control flow graph used for monitoring application executions, according to at least one execution example.

FIG. 4 illustrates an example of a control flow graph 400 used for monitoring application executions, according to at least one example. The control flow graph 400 is a representation, using graph notation, of control flow, i.e., execution, paths that may be traversed through an application during execution of the application. In the control flow graph 400, each node in the graph corresponds to a basic block. A basic block is a sequence of instructions where control enters only at the beginning of the sequence and control may leave only at the end of the sequence. In some examples, multiple transfers may begin from the same starting point. There is no branching in or out in the middle of a basic block. For example, a destination address, may correspond to a start of a basic block and an indirect branch instruction may correspond to an end of the block. An address of the indirect branch instruction may correspond to a source address. In some examples, binary analysis may be used to identify the address, therefore a previous address from an observed transition may be stored and become the source for the transition. A target address of the indirect branch instruction may correspond to a next possible address of a next basic block in the control flow graph 400, i.e., may correspond to a beginning address of a next/reachable basic block in the control flow graph 400. Edges between two basic blocks (e.g., a first block and a second block) represent control flow transfer to the beginning of the second block. A node may thus include a start address of the basic block, and a next possible start address of a next basic block i.e., a beginning address of a next/reachable basic block. The node may have a list of valid transitions, edges of the graph defining addresses where the flow may proceed, therefore each node has its own address and a list of destinations to which a valid transfer may be completed. The control flow graph 400 may be generated by, for example, source code analysis, binary analysis, static binary analysis, execution profiling, etc. The control flow graph may then include a plurality of legitimate execution paths. Each legitimate execution path may include a plurality of nodes connected by one or more edges.

The control flow graph 400 may be an example of the CFDG that is learned and use for enforcement as described herein. In some examples, the control flow graph 400 may be stored in a Bloom Filter, hash table, binary tree, or other fast access data structure. In some examples, non-graph structures may store address pairs of origins and destinations such that the data structure may be queried to determine validity of any transition. In some examples, the whole control flow graph 400 may be stored in the CPU cache or in memory accessible by the CPU. In some examples, only a subset of the control flow graph 400 may be stored using a sliding window algorithm. Accordingly, the subset of the control flow graph 400 includes all the directly reachable nodes from the current instruction 402, plus a predetermine number of child nodes that may be configured according to preferences. As the CPU instructions move through the control flow graph 400, for example from node 408 to node 402, a refresh of the subset may be determined based on the full control flow graph 400 to include newly reachable nodes and child nodes. The control flow graph 400 may include indications of nodes that the CPU instructions processed, as well as accessible branches 404 that were not processed but are available (child nodes). As the CPU executes instructions, for example from node 402 to 406, the CPU looks to see if enough node-depth remains in the subset of the control flow graph 400 and if it reaches some threshold (e.g., must-be-two-nodes deep), it automatically updates its cache with a new subgraph from the original control flow graph 400 to meet those constraints.

Figure 5:
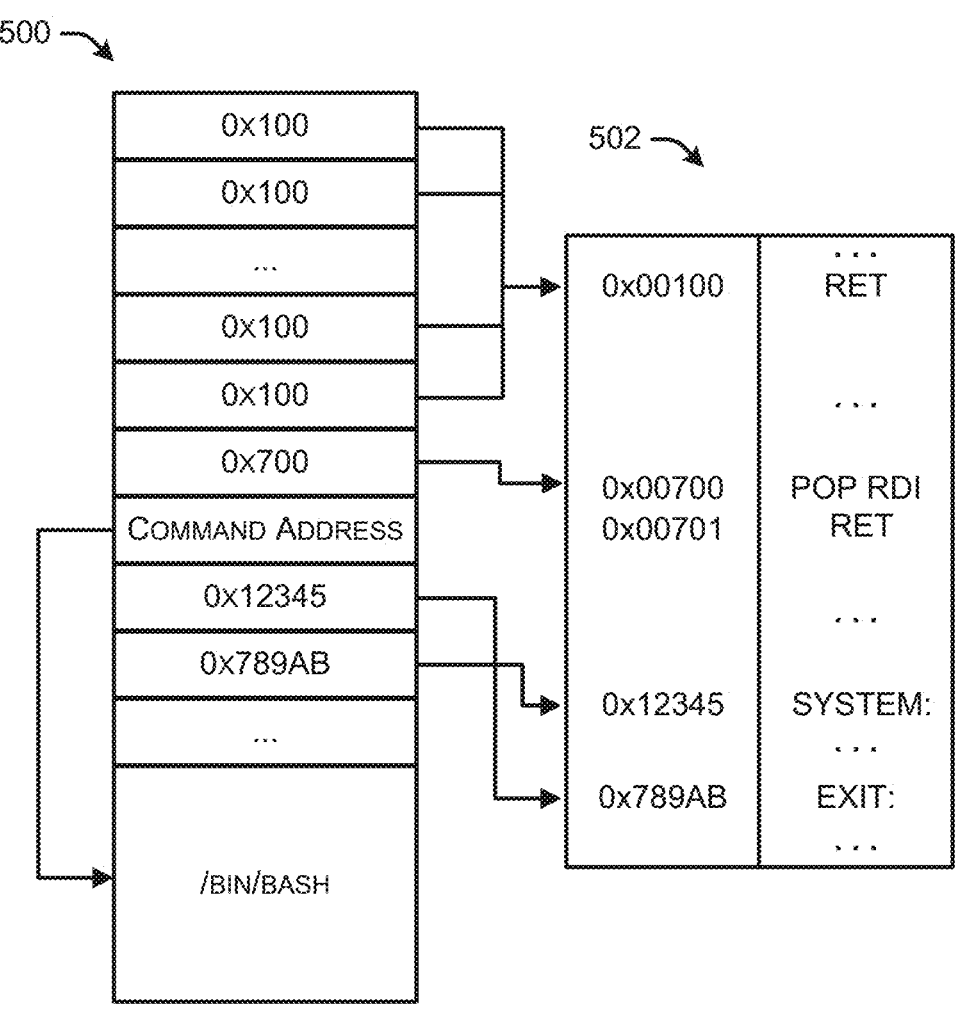
FIG. 5 illustrates an example of a stack showing system calls and transitions that may be monitored and identified as part of an exploit using the monitoring described herein, according to at least one execution example.

FIG. 5 illustrates an example of a stack showing system calls and transitions that may be monitored and identified as part of an exploit using the monitoring described herein, according to at least one example. the stack 500 may include sections after an exploit is in place, and/or a vulnerability exists within the stack. The existing code sections 502 may also illustrate targets of instructions such as return, jump, exit, move, push, pop, or other such instructions and/or gadgets.

In an exploit, the stack 500 is modified with an exploit payload that causes the stack, when executing, to perform tasks such as system calls. In the example of FIG. 5, the command address is shown as executing two system calls with arguments:" "/bin/bash" and "exit" The monitor engine, or other monitoring component described herein will detect transition to gadgets such as return, jump, call, mov, system calls or any instruction sequence which has property of the gadget. Since the exploited code includes transitions to gadgets that aren't part of the learned graph, and also may not be valid destinations for given context, then the monitoring agent can readily identify the exploit before execution can take place that would enable the exploit to cause any harm.

Figure 6:
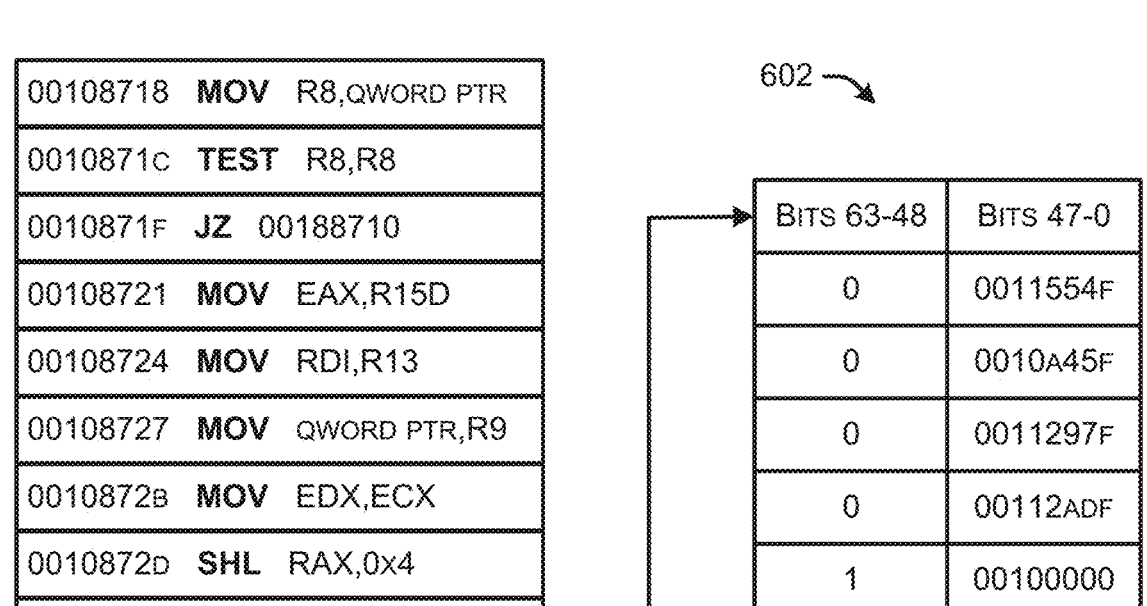
FIG. 6 illustrates an example of a system call that may be compared against a table of valid targets for the system call as part of the monitoring process, according to at least one execution example.

FIG. 6 illustrates an example of a call that may be compared against a table of valid targets for the call as part of the monitoring process, according to at least one example. In the example, a sequence of code 600 is depicted that includes an indirect call to an address at the last line. The learned CFDG may be used to determine if the address of the indirect call is a valid destination. The learned CFDG may be used to evaluate if the target of a transition such as a call, jump, return, or other instruction sequence is a valid destination, as learned through the observation phase.

In some examples, the CFDG may be embedded at the CPU such that the CALL instruction includes a pointer to a valid targets destination table that provides all the valid destinations from the particular call site. With such an implementation, when the CPU reaches the CALL instruction, it will retrieve the address of the valid target destination table for a given call location. If the address called in the instruction is included in the table, then it is a valid destination and the CPU will perform the transition as provided. In the event that the destination is not in the table, then a default entry may be specified that may cause the process to terminate or to perform some other action.

For instructions, such as the jump, return, and call instructions, the program would be compiled and liked with the addresses of the valid target destinations table pointing to a global table that would allow for any transition computed at run time. Then this compiled application would be run and monitored with solution like the monitoring engine 304 described herein in order to produce the learned CFDG and/or a set of valid transition pairs (FROM, TO) at the end of the learning phase.

After the learning phase is complete, the learned CFDG or transition pairs would be provided to update the valid target destinations table with actual information related to the observed transitions within the CFDG. At this point, the CFDG is embedded for CPU to use at run time.

Figure 7:
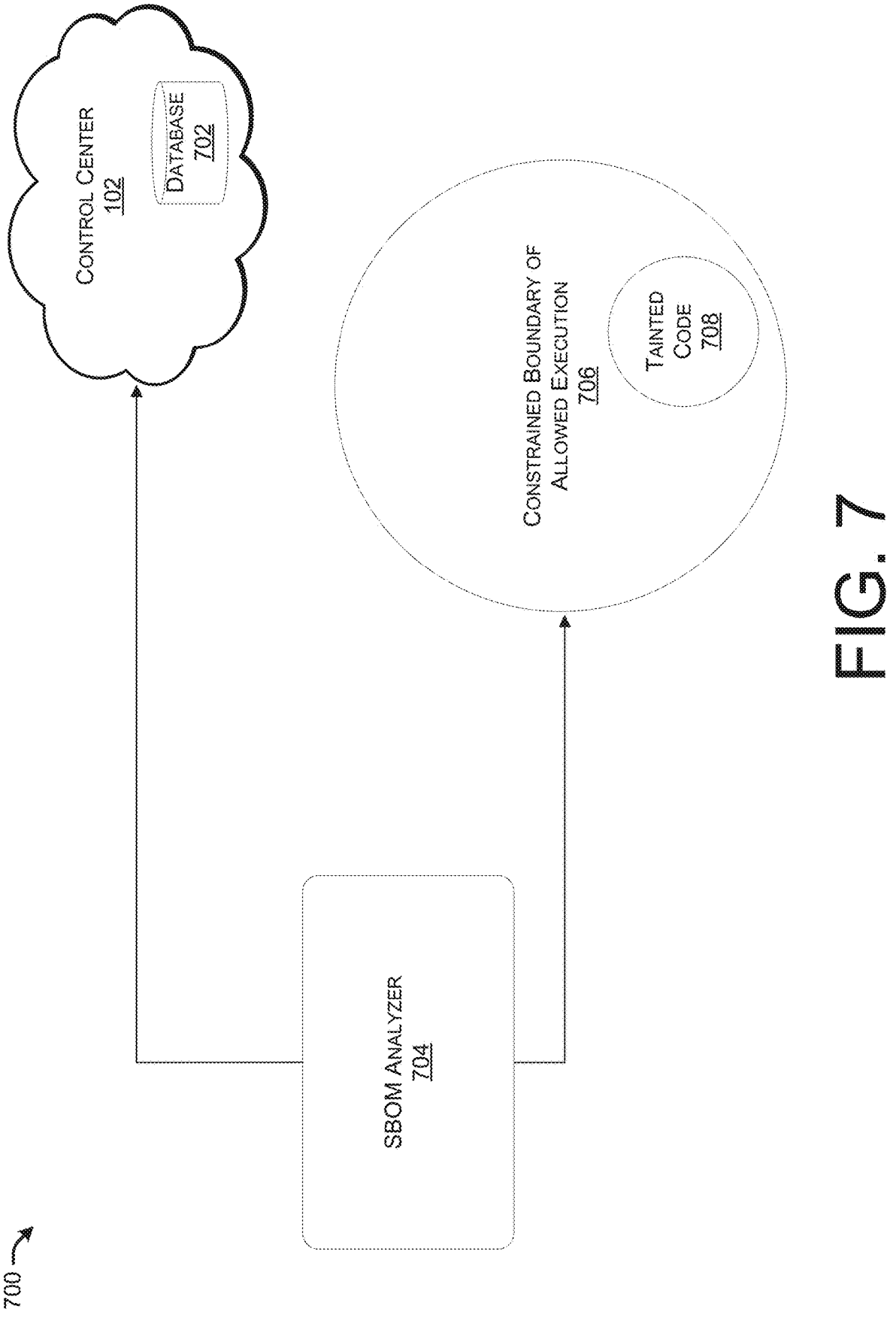
FIG. 7 illustrates a representation of a software bill of material analyzer used to compare known vulnerabilities and convert tainted elements into a control flow directed graph representation of the vulnerability to subtract from allowed executions, according to at least one execution example.

FIG. 7 illustrates a representation of a software bill of material (SBOM) analyzer used to compare known vulnerabilities and convert tainted elements into a control flow directed graph representation of the vulnerability to subtract from allowed executions, according to at least one example. The SBOM analyzer 704 may be used as part of a system 700 to prevent execution of tainted code. The constrained boundary of allowed execution 706 may illustrate the observed code from building the learned CFDG and/or some or all of the code of the application or workload. The learned CFDG as described herein relies on observation to build the learned portion, therefore, some code that should be allowed to execute may not have been observed during the observation phase. Therefore, a way to interpolate and identify safe code that was not previously observed may provide for complete coverage without having to extend the observation phase nearly indefinitely.

In the system 700, the SBOM for a particular application is updated at database 702 within the cloud via a cloud service. When a vulnerability is found in code analysis of the SBOM, such as by the SBOM analyzer 704, the monitoring system can automatically exclude the vulnerability from execution until the code is patched and the SBOM is updated indicating that the SBOM has changed. The SBOM analyzer 704 may continuously scan the image of the code and determine code fragment(s) that include the vulnerability. After the vulnerability and/or the code section is identified, the SBOM meta-data may be mapped back to the binary image to identify the suspect blocks of code and correlate the blocks of code to the CFDG.

After the suspect code is identified within the CFDG, a tainted CFDG may be generated by the SBOM analyzer. After the tainted CFDG is generated, which may be represented by the tainted code 708 as a subset of the constrained boundary of allowed execution 706, the tainted CFDG may be subtracted and/or marked within the learned CFDG such that the tainted CFDG is not executed by the CPU, thereby preventing exploits of the vulnerability until the code is patched and the SBOM is updated accordingly. In this manner, the trusted portions of the code may be allowed to execute normally while only excluding the tainted portion.

Figure 8:
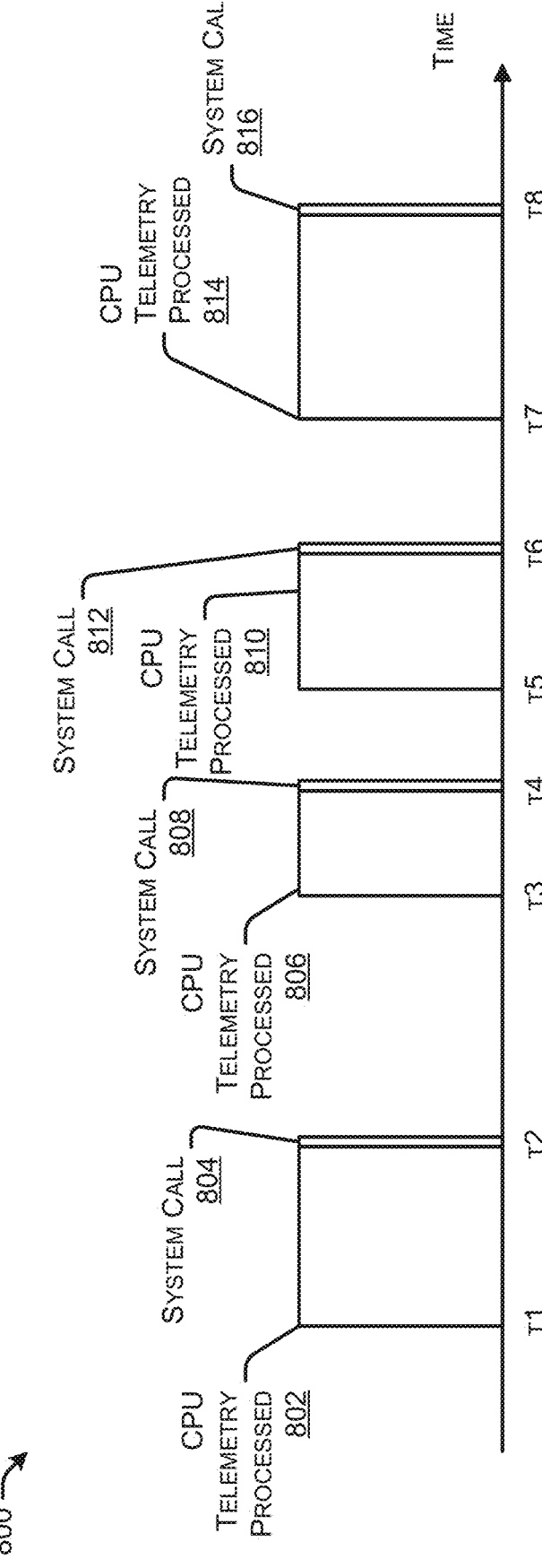
FIG. 8 illustrates an example of intercepted system calls and CPU telemetry processed to make an enforcement decision, according to at least one execution example.

FIG. 8 illustrates an example of intercepted system calls and CPU telemetry processed to make an enforcement decision, according to at least one example. In this example 800, the learned CFDG and system call security enforcement may be combined to add real time enforcement capability to the CFDG by providing the most detailed information at the time of decision. The system call interceptions, and for each system call interception, such as system call 804, system call 808, system call 812, and system call 816, analyzes a predetermined number of transitions that led to the system call for validity. The analysis is performed by comparing against the learned CFDG. In an example, at the time of a system call the CPU trace may be stopped, sending all the transitions leading up to the system call out of the buffer, the transitions, or a predetermined number of transitions, can be compared against the CFDG for validity before allowing the system call to execute. Therefore, the enforcement may be performed inline and the process may not advance until the return from the system call happens, and during that time the CPU telemetry may be analyzed to determine whether there was an anomaly in the sequence of transitions preceding the system call. This also reduces the amount of data being processed to only the predetermined number of transitions rather than the complete sequence.

In some examples, the system call 804 at T2 may be intercepted with CPU telemetry back to T1 selected for processing. In some examples, the time between T1 and T2 for system call 804 may be different from a time between T3 and T4 for system call 808, T5 and T6 for system call 812, and T7 and T8 for system call 816. The CPU telemetry 802, CPU telemetry 806, CPU telemetry 810, and the CPU telemetry 814 may all differ from one another and/or some or all may be of the same predetermine length. The difference may be based on differences in the types of system calls, the destinations, and/or risk scored determined with each of the system calls.

In operation, the learned CFDG may be used and stored for interpretation of transitions at run time. During monitoring and enforcement, after the observation phase, the CPU may accumulate telemetry but only a subset of recent batches may be kept in memory. The processing of telemetry may not happen until one of the set of system calls is called by the monitored application or container. The system call is identified as a system call that may potentially be exploited by the attacker. When one of the set of system calls is called, the kernel module collects the telemetry accumulated by CPU prior to this call (e.g., CPU telemetry 802 prior to system call 804). Then the monitor decodes the telemetry and matches the transitions present therein with the learned CFDG. If some of the transitions are not present in the CFDG then system call may be invalid and may be prevented from executing. If all of the transitions found during the decoding are present in the learned CFDG, then the system call may be allowed to execute.

In some examples, the amount of CPU telemetry accumulated and processed may be based on risks, such as described above. Additionally, the CPU telemetry may be based on available processing capability. The system may maintain a predetermined amount of telemetry before replacing with newer telemetry. The more telemetry is kept the more processing needs to happen at the moment of the system call. But also, more telemetry means larger part of execution of the process is observed, resulting in greater confidence in the security of the system call.

Figure 9:
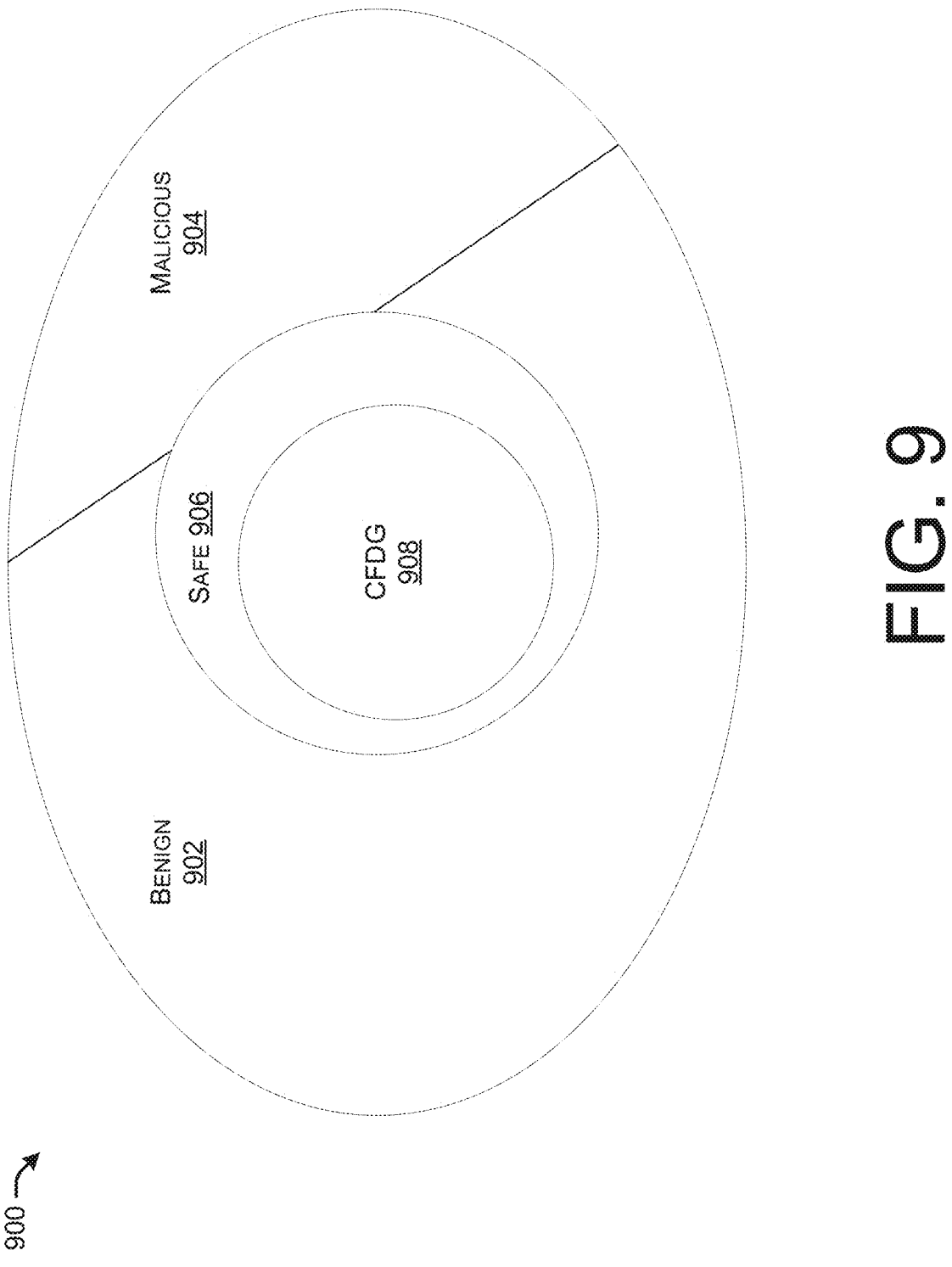
FIG. 9 illustrates an example of valid transitions extending from observed transitions and extrapolating to likely safe transitions, according to at least one execution example.

FIG. 9 illustrates an example of valid transitions extending from observed transitions and extrapolating to likely safe transitions, according to at least one example. In some examples, there may be a set of instructions and/or addresses that were not observed during learning of the CFDG. For example, the CFDG 908 may only cover a small portion of the code 900 while other portions remain unobserved, including both benign 902 and malicious 904 code. Such unobserved transitions and instructions may be incorrectly labeled as invalid. Modern applications usually use a lot of function calls and branching, all of those generate code transitions. There may be of millions code transitions per seconds, and if there was not enough data given to the model for training there is a high chance of seeing big number of False Positives.

In some examples, the systems and methods described herein may identify code as safe 906 by identifying that the code is likely to be executed and/or that code can't be potentially exploited. Then in case when there is violation of a learned CFDG 908 (e.g., due to an unobserved transition), the transition is inspected to identify if it's safe or unsafe. If it is safe then no alert is issued. If it is unsafe then it is considered invalid.

In some examples, the evaluation of safe or unsafe may be performed with a fast or a slow mode. In the fast mode, the monitor may precompute safe 906 transitions by statically analyzing the executable and transferring the analyzed transition to the CFDG if the static analysis identifies that the code portion is safe. In the slow mode, the transition may be analyzed based on the context of the transition and the static analysis of the transition to find an explanation for the transition. If an explanation is determined, the transition then is declared valid (e.g., safe) and no alert is issued, if no explanation is found then the transition remains invalid (e.g., unsafe) and the alert is issued.

In some examples, various techniques can be used to classify code transitions as safe or unsafe. In a prediction-based technique, if the transition is a call instruction it is possible to check whether it landed on a known function start. If the transition didn't land on a function start it is unsafe. If the call site called a function from a certain module, in some examples the system may expect that functions from same module to be called from same call site. In some examples, the analysis may Identify the function's signature (number of arguments, types of arguments) using decompilation techniques. Only functions with same signatures are expected to be called from same call site. If the call site was not encountered before during learning, the analysis of the call site can be performed to identify the preparation of arguments. The function with same arguments is expected to be called from the same call location. In case of unknown jump transition, it is only allowed to land on an instruction within the same function, it rarely happens in a normal compiled code that jump happens on the instruction outside its function. Return instructions may sometimes land on the instruction following the call instruction. It is possible to further limit where the return instruction may land using a shadow stack.

In some examples, a fully automated decision system using Machine Learning may be implemented, the system will learn to predict call destination using encoded call site information. In some examples, the system can take both call site and call destination to predict whether the transition is safe or not.

In a risk-based technique, if the function contains system call within itself, the function will be considered high risk. Unknown transitions may be considered safe in some examples when they land on the non-high-risk functions. Some system calls may be considered low risk because they can't be exploited. System calls like set/get thread priority will have low risk, when system calls like write will have high risk. In some examples, risk is possible to propagate, functions that call high risk functions may also be considered high risk. Other considerations of risk might include the permissions that a workload has. For example, a workload running with elevated (root) permissions would have higher risk than one running as with restricted permissions. As such, a system call running under a different permission may have a different risk profile, System calls are well documented across all operating systems and a system can be built to normalize these across all operating systems and apply a uniform risk if the system calls across operating systems have the same risk profile. This normalization can have special exceptions when a system call on one OS is riskier than on another OS. An additional distinguishing element might be the parameters passed to a given function (the data). The system could evaluate the data passed to the system calls to have an additional risk discriminator. For example, a file path passed to a write system call might be a different risk level based on the path itself (e.g., a system directory vs a user directory).

Figure 10:
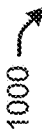
FIG. 10 illustrates an example system architecture for distributed monitoring agents on devices of a network or system with a centralized monitoring control plane, according to at least one execution example.

FIG. 10 illustrates an example system architecture 1000 for distributed monitoring agents on devices of a network or system with a centralized monitoring control plane, according to at least one example. In the system architecture 1000, an orchestration system control plane 1002 may provide monitoring for multiple devices and/or systems across a local, distributed, or cloud-based network. In the system architecture 1000, devices 1004 are connected to an API server 1022 through proxy 1008 and agent 1010 components to orchestrate the functions of the devices 1004 and/or to manage interactions between the devices 1004. A controller manager 1014 may include a control plan component that runs controller processes. Each controller may be a separate process, but a single binary may include a compilation of processes run in a single process. The cloud-controlled manager 1016 includes a component that embeds cloud-specific control logic that enables links between the cluster into the API. The scheduler 1018 may watch for newly created pods or devices with no assigned node and selects a node for them to run on. The key store 1020 may be a distributed database that manages the configuration of the cluster and stores the state of the system.

A monitoring control plane 1012 may be similar to the control center 102 and/or the monitoring engine 304. The monitoring control plane 1012 may communicate with monitor agents 1006 at each of the devices 1006 that provide monitoring and enforcement as described herein. In this manner, individual monitor agents 1006 may be deployed in a network that communicate alerts with the monitoring control plane 1012 for coordinating the learned CFDG across the network of devices 1004.

Figure 11:
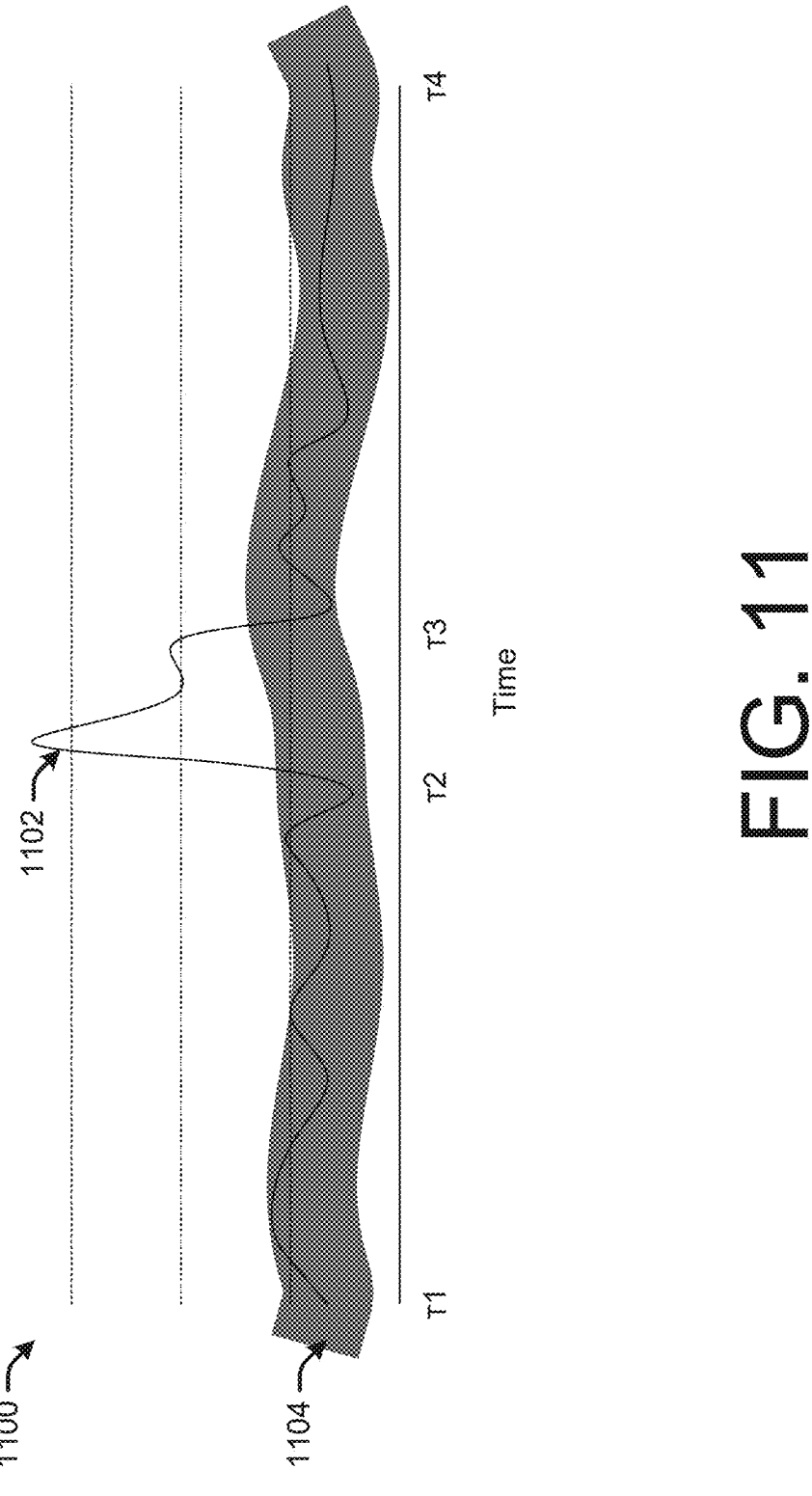
FIG. 11 illustrates an example visualization of expected versus observed behavior by an application or device to identify abnormalities or deviations from observed and expected behavior, according to at least one execution example.

FIG. 11 illustrates an example visualization 1100 of expected versus observed behavior by an application or device to identify abnormalities or deviations from observed and expected behavior, according to at least one example. The monitoring control plane 1012 and/or the control center 102 may receive an overview and/or a birds-eye view of expected versus observed behavior within a particular organizational environment that is graphically depicted in FIG. 11.

The visualization 1100 shows observed executions 1102 within an organizational environment as well as expected executions 1104 which may include a predetermined number of transitions and/or a representations of executions valid based on the CFDG. As shown, at T1 and T4, the observed executions 1102 falls within the expected bounds, while between T2 and T3, the observed executions 1102 deviate from the expected bounds with invalid transitions. In some examples, the expected bounds may be representative of the expected actions based on the learned CFDG and the deviation between T2 and T3 is indicative of a deviation from the learned CFDG.

Figure 12:
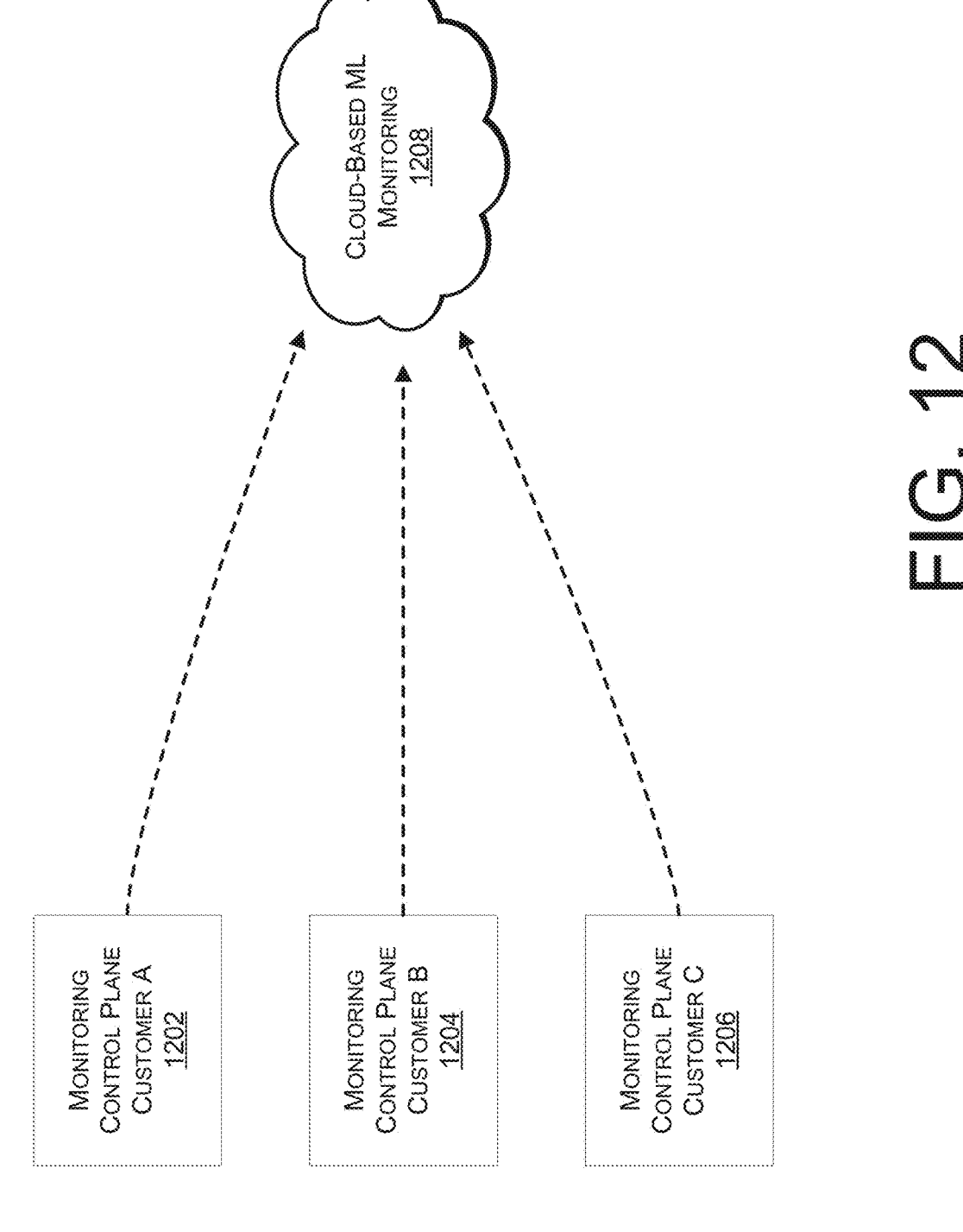
FIG. 12 illustrates an example of multiple different monitoring control planes reporting to a centralized cloud-based system for identifying large-scale patterns and exploits, according to at least one execution example.

FIG. 12 illustrates an example of multiple different monitoring control planes reporting to a centralized cloud-based system for identifying large-scale patterns and exploits, according to at least one example. The control planes from multiple different customers 1202, 1204, and 1206 are shown reporting to a centralized system for cloud-based machine learning monitoring 1208. The control planes for individual customers 1202, 1204, and 1206 may include the control plane described with respect to FIG. 10 that has insights within a particular organizational structure. However, the use of the cloud-based ML monitoring 1208 may enable identification of vulnerabilities and exploits that extend outside of an organization and is targeted at a particular industry or region. In some examples, this would also aid in identifying variations of a particular exploit that may be used to run different code gadgets to bypass detection by typical signature-based approaches as the exact sequence may not match.

In some examples, the CFDG represents the application execution flow in real time. By combining this context with other Indicators of Compromise (IOCs), valuable insights can be delivered to one or more customers across industries. In some examples, distributed monitoring agents may be running the techniques and systems described herein to monitor and enforce application control flow integrity. In some examples, a centralized control plane may be used to manage monitor agents monitoring CPU telemetry in a distributed environment. The control plane may have a birds-eye overview of expected and observed behavior within a given organizational environment. Accordingly, the control plan can provide real-time view of any zero-day attacks happening within an organization. Additionally, the insights may be provided to security operators in real time. In some examples, the control plane may be used to share such real-time zero-day attack information with industry peers, as an early warning system for newly observed attacks in-progress. To this end, the control plane may anonymously send a report of a given observed attack to a cloud-based machine-learning system for sharing this information with industry peers.

In some examples, the customer reports would include general details about the given customer, to facilitate industry peer comparisons. For example, such reports may include (but are not limited to) customer industry, customer size, geographic location of incident(s), application affected, affected system types (e.g., bare-metal systems, VMs, containers, operating systems, versions, etc.), and other such information. Security operators could use the report data to perform industry peer comparisons to identify similar issues within their own environments, to help zero in on the root cause of the exploit. Such peer comparisons could be aligned vertically (according to industry type) or horizontally (by systems) and could answer critical questions such as (i) are other companies in my own industry vertical (e.g., financials, manufacturers, retailers, etc.) running this application/ workload seeing the same anomalous behavior that I am? Additionally, the reports may help to identify if (ii) other companies running this version of this application/workload seeing the same anomalous behavior that I am? In some examples, a specific application and/or version that may be targeted can be identified and the system could immediately report these findings to the application software vendor. In some examples, the analysis could be reported as an Indicator of Compromise (IOC) for publishing via the standard IOC pub-protocol.

In some examples, as the geographic location of affected systems could also being reported to the system, and the location information could likewise be shared with industry peers to show how the attack is progressing—in real time— by geographic regions. Such analysis and information may aid in identifying an origin of the attack, spread of the attack, how fast the attack is spreading, and other such information.

Additionally, the system could also feed information back to control planes in given customer locations so that policies could be dynamically enabled to automatically adapt to the attack in progress. For example, the policies may include (but are not limited to) pre-emptively enforcing a more stringent policy for evaluating unknown transitions, accelerating the observation/learning process by looking for outliers only and applying the CFDG, pre-emptively changing the enforcement policies to advance from a more lenient policy (such as alerting-only) to a more strict policy (such as automatic application termination when a violation is detected), pre-emptively changing the confidence score threshold to a lower value so as to more quickly transition from the observation phase to the enforcement phase, or to immediately advance to the enforcement phase from the observation phase.

Figure 13:
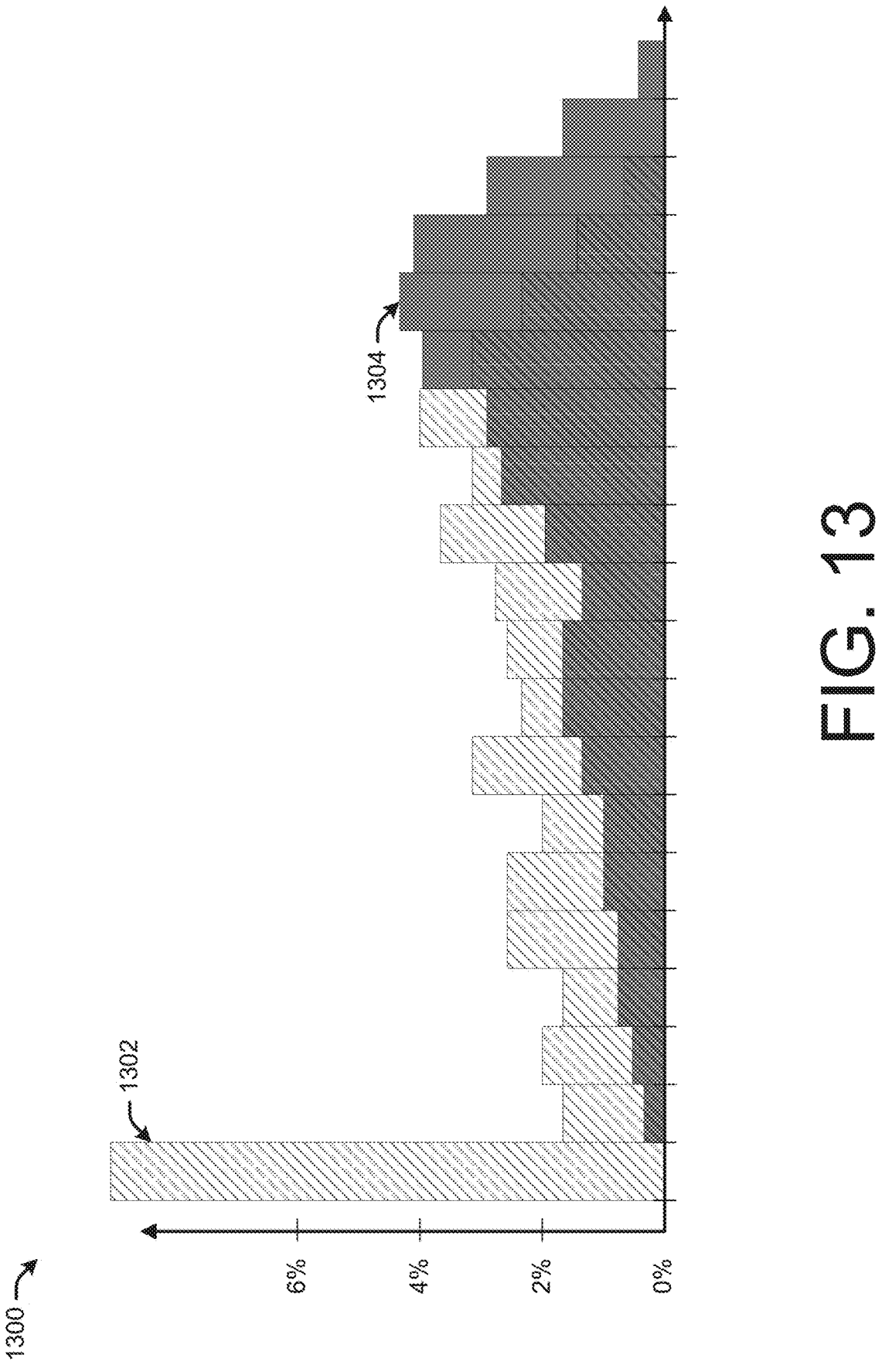
FIG. 13 illustrates an example visualization of peer comparison of potential security exploits occurring in real-time, according to at least one execution example.

FIG. 13 illustrates an example visualization 1300 of peer comparison of potential security exploits occurring in real-time, according to at least one example. As described with respect to FIG. 12, the comparison of peers may provide valuable insights that may help identify and get ahead of exploits and vulnerabilities before they are widespread by enabling comparison across peers and industries. For example, a customer may view a visualization of industry peer anomalies 1302 as compared with anomalies detected within their own organization 1304. In some examples, the industry peers may be changed to include organizations of similar size, within similar geographic regions, or other such groupings.

In some examples, the customer reports from a distributed set of control planes would include general details about the given customer, to facilitate industry peer comparisons. For example, such reports may include (but are not limited to) customer industry, customer size, geographic location of incident(s), application affected, affected system types (e.g., bare-metal systems, VMs, containers, operating systems, versions, etc.), and other such information. Security operators could use the report data to perform industry peer comparisons to identify similar issues within their own environments, to help zero in on the root cause of the exploit. Such peer comparisons could be aligned vertically (according to industry type) or horizontally (by systems) and could answer critical questions such as (i) are other companies in my own industry vertical (e.g., financials, manufacturers, retailers, etc.) running this application/workload seeing the same anomalous behavior that I am? Additionally, the reports may help to identify if (ii) other companies running this version of this application/workload seeing the same anomalous behavior that I am? In some examples, a specific application and/or version that may be targeted can be identified and the system could immediately report these findings to the application software vendor. In some examples, the analysis could be reported as an Indicator of Compromise (IOC) for publishing via the standard IOC pub-protocol.

Figure 14:
FIG. 14 illustrates an example depiction of real-time geographic progression of an attack or exploit, according to at least one execution example.

FIG. 14 illustrates an example depiction of real-time geographic progression of an attack or exploit, according to at least one example. The reports described with respect to FIGS. 12 and 13 may also include geographic information that may enable additional insights with respect to locations of targeted exploits and the spread of a particular attack.

In some examples, as the geographic location of affected systems could also being reported to the system as part of the report from the control planes, and the location information could likewise be shared with industry peers to show how the attack is progressing—in real time—by geographic regions. As shown in FIG. 14, the map 1400 illustrates a progression of an attack from T1 to T2 to T3 and T4 such that the system enables a security operations team to monitor the progress of such an attack and prepare for the attack by disabling an application or vulnerable system in advance of the attack reaching their region. Additionally, such analysis and information may aid in identifying an origin of the attack, spread of the attack, how fast the attack is spreading, and other such information.

Figure 15:
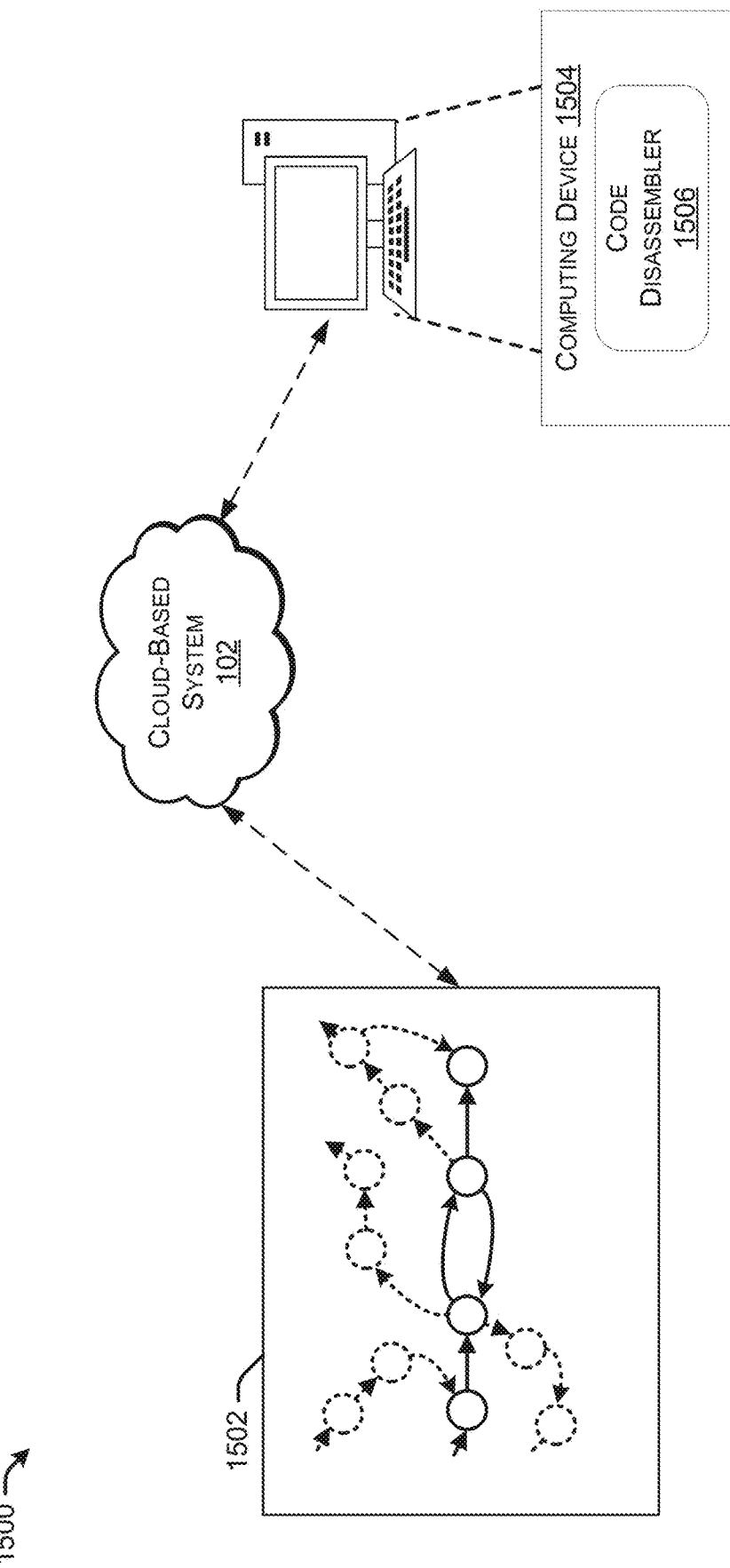
FIG. 15 illustrates an example system for disassembling code using learned target addresses as valid destinations for indirect transfers, according to at least one execution example.

FIG. 15 illustrates an example system 1500 for disassembling code using learned target addresses as valid destinations for indirect transfers, according to at least one example.

In some examples, disassemblers may be used to reverse engineer code of malware binary as well as identify potential vulnerabilities in applications. In order to understand the binary one of the steps is performing disassembly of the code and providing the associated assembly code instructions as a result. A linear sweep disassembler performs disassembly in a linear fashion. It assumes that first byte of code section indicates first valid instruction. After the current instruction is disassembled and converted into assembly from binary code, the next instruction would be found after advancing N bytes (depending on the size of decoded instruction and its operands) and decoding this next instruction. Disassembly would continue until end of code section would be reached. Recursive Descent Disassembly uses control flow instructions when deciding what next instruction to decode after such control flow instructions (jump/call/conditional jump and indirect versions of such transfers). When decoding reaches control flow instructions, the disassembler would follow the transition to choose next instruction.

In the system 1500, a learned CFDG 1502 may be used to aid in disassembling code. For example, a cloud-based system 102 may include a learned CFDG for a particular application. A computing device 1504 using a code disassembler 1506 may decode the instructions while using the learned CFDG 1502 to inform destinations, for example for indirect destination calls.

The destinations guided by the CDFG may indicate where code belongs and provide an understanding of internals of a monitored application. Due to more and more abstractions in modern applications indirect calls are very large part of modern code—software abstractions like vtables, function pointers, shared libraries, jump tables and more. Accordingly, disassemblers may be unable to correctly decode. The target code that is reachable by indirect jump can be decoded because the systems and methods herein use the learned target addresses as valid destinations for indirect transfers. As a result, the CDFG can be used to point the disassembler at a correct offset and disassemble code correctly at the address. The CDFG can be imported, along with any other implementations such as unique targets, that record observed transitions for a disassembled application. The imported targets are provided into disassembler as valid offsets from which execution was observed to begin and as a result disassembly process can begin.

FIGS. 16-23 illustrate various processes for observing, monitoring, providing enforcement, and reporting on execution of applications and workloads on computing device. The processes described herein are illustrated as collections of blocks in logical flow diagrams, which represent a sequence of operations, some, or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 16 illustrates an example process 1600 for observing application executions and monitoring, using a control flow directed graph, applications executed on a computing system, according to at least one example. At 1602, the process 1600 may include determining an observation phase for observing execution of processes on the computing system. Determining the observation phase may include determining a predetermined observation time window to observe transitions by an application or a predetermined code percentage to observe. In some examples, the observation time window may be a set number of minutes, days, second, etc. In some examples, the observation phase may include a period of time until a threshold amount of the code is observed executing. The threshold amount may include a percentage of the code and may be configurable by a security operations center.

At 1604, the process 1600 may include collecting and/or determining telemetry, during the observation phase, representing execution of the processes. The telemetry may include central processing unit (CPU) telemetry. The telemetry may indicate instructions executed by the CPU and may include O/S telemetry and/or telemetry from other sources such as VMs, containers, bare-metal, and other such sources. Determining the telemetry may include determining whether the processes are running on a computing device or within a virtual machine.

At 1606, the process 1600 may include generating a control flow directed graph based on the telemetry. In some examples, the control flow directed graph may be generated by normalizing the CPU telemetry into a control flow directed graph representation that may be understood by a variety of different devices and systems. Generating the control flow directed graph may be based on observed transfers during the observation phase, where the observed transfers during the observation phase are considered valid transfers.

At 1608, the process 1600 may include determining a monitoring phase based at least in part on the control flow directed graph. Determining the monitoring phase may include determining completion of the observation phase based at least in pan on the control flow directed graph representing at least a threshold of application processes. In some examples, the monitoring phase may begin based on expiration of a time period for the observation phase and/or an instruction from a security center to begin the monitoring phase.

At 1610, the process 1600 may include monitoring transfers of instruction pointers at the computing system. The monitoring phase may be performed using a hardware device of the computing system and where determining the invalid transfer is based at least in part on identifying an instruction sequence in the CPU telemetry that is not present in the control flow directed graph.

At 1612, the process 1600 may include determining an invalid transfer based at least in part on the control flow directed graph. The invalid transfer may be identified based on not being included within the CFDG. In some examples, the invalid transfer may be communicated in an alert to a security operations center of a facility operating the computing device and/or to a source of the application or process including the transfer. The invalid transfer may be determined based on determining a transfer of an instruction pointer, comparing the transfer against the control flow directed graph, determining the transfer is not present in the control flow directed graph, and determining the transfer is the invalid transfer. Determining the invalid transfer may include inputting the transfers of instruction pointers into a machine learning model trained to identify invalid transfers based at least in part on transfers included in the control flow directed graph. The system may include reporting the invalid transfer to cloud-based system for monitoring one or more computing systems.

FIG. 17 illustrates an example process 1700 for enforcing execution according to a learned control flow directed graph, according to at least one example. At 1702, the process 1700 may include determining telemetry representing execution of a process on the computing system. The telemetry may include CPU telemetry and/or telemetry representing executions of a process or workload on a variety of different device.

At 1704, the process 1700 may include accessing a learned control flow graph for the process. The learned CFDG may be generated as described with respect to FIG. 16 herein.

At 1706, the process 1700 may include determining a transfer of an instruction pointer based at least in part on the telemetry.

At 1708, the process 1700 may include determining validity of the transfer based on the learned control flow graph. Determining the validity may include determining whether the transfer is included within the learned control flow graph.

At 1710, the process 1700 may include determining an action to terminate the process based at least in part on the validity. The action may include terminating the process on a bare metal computing system. The action may also include terminating a virtual machine running the process. The action may include blocking a set of system calls from execution by the computing system. Blocking the set of system calls may include determining a first set of system calls by determining system calls associated with security integrity of the computing device, determining a second set of system calls by determining system calls unrelated with security integrity of the computing device, and wherein the set of system calls may include the first set of system calls and not the second set of system calls. The set of system calls may include write operations. The operations may include determining a risk score for the transfer based at least in part on a security rating associated with the transfer, and wherein determining the action is further based on the risk score.

The action may also include enabling the process to continue while excluding communications from the process from executing. The communications may include communications to a remote computing system or a local computing system. The transfer may include a system call, and wherein determining the risk score for the system call may include accessing a cataloged risk score for the system call. The action may include determining CPU telemetry for a predetermined number of transitions before the transfer; validating the CPU telemetry for the predetermined number of transitions based at least in part on the learned control flow graph; and allowing the transfer in response to the CPU telemetry being validated based at least in part on the learned control flow graph.

Figure 18:
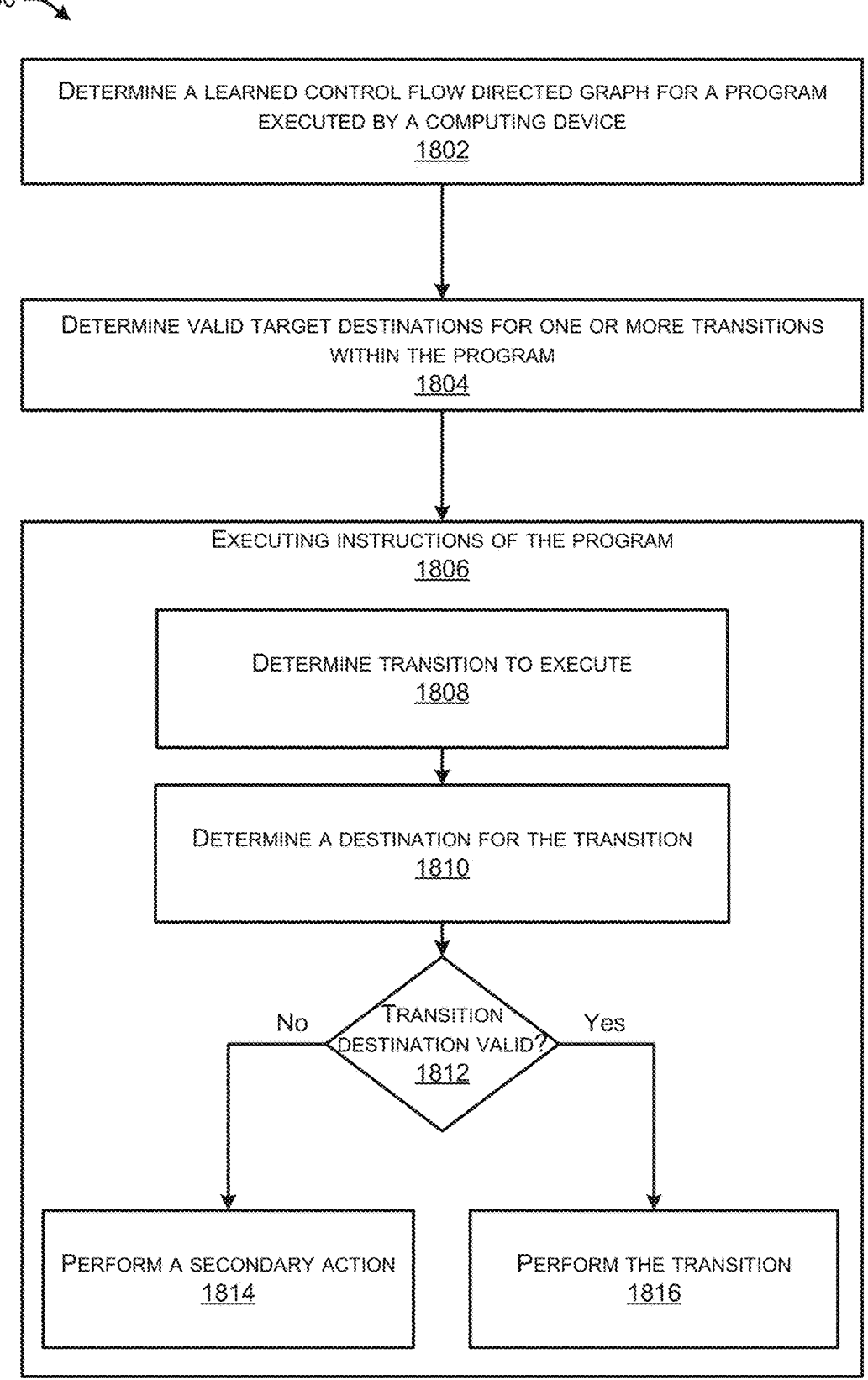
FIG. 18 illustrates an example process for hot patching transitions within application executions according to a learned control flow directed graph, according to at least one execution example.

FIG. 18 illustrates an example process 1800 for hot patching transitions within application executions according to a learned control flow directed graph, according to at least one example. At 1802, the process 1800 includes determining a learned control flow directed graph for a program executed by a computing device. The learned CFDG may be generated as described with respect to FIG. 16 herein. Determining the learned control flow directed graph may include observing execution of the program during an observation phase and building the learned control flow diagram based on observed executions of the program. During the observation phase, determining the valid target destinations may include enabling any transitions at run time. During the observation phase the program is executed using a first set of valid target destinations, and where determining the valid target destinations may include determining a second set of valid target destinations for the transitions based on the learned control flow directed graph.

At 1804, the process 1800 includes determining valid target destinations for one or more transitions within the program, the one or more transitions directing to a different portion of the program or to a separate program. The one or more transitions may include at least one of a call, a jump, or a return within the program. Determining the valid target destinations may include identifying a set of destinations based on the learned control flow directed graph.

At 1806, the process 1800 includes executing instructions of the program. As part of executing the instructions, the process includes sub-components that may cause execution of the instructions. At 1808, the process 1800 includes determining a transition to execute.

At 1810, the process 1800 includes determining a destination for the transition. At 1812, the process 1800 includes determining if the transition destination is valid. Determining if the transition destination is valid may include comparing the valid target destinations against the destination for the transition and only finding validity if the destination is included in the valid target destinations.

At 1816, the process 1800 includes performing the transition in response to the destination being included within the valid target destinations. At 1814, a secondary action may be performed in response to the destination not being included within the valid target destinations. The secondary action may include at least one of executing a transition to a default target destination or terminating the transition.

FIG. 19 illustrates an example process 1900 for excluding tainted code portions from execution within an application in real-time based on a learned control flow directed graph, according to at least one example. At 1902, the process 1900 includes determining a learned control flow directed graph for a process executed on the computing system.

At 1904, the process 1900 includes determining a vulnerability within the process. Determining the vulnerability may include receiving notification of a vulnerability via a cloud-based system.

At 1906, the process 1900 includes determining a software bill of materials (SBOM) for the process. Determining the SBOM may include receiving the SBOM from a cloud-based resource of a provider of the process.

At 1908, the process 1900 includes determining a code portion of the process associated with the vulnerability based at least in part on the SBOM. Determining the code portion of the process may include running a vulnerability scanner on an image of the process. Determining the code portion of the process may include mapping SBOM metadata associated with the code portion to a binary image of the process.

At 1910, the process 1900 includes determining a tainted control flow directed graph for the code portion. Determining the learned control flow directed graph is based on observed transitions of the process during an observation phase and SBOM interpolation.

At 1912, the process 1900 includes excluding the tainted control flow directed graph from the learned control flow directed graph to generate a revised control flow diagram. Excluding the tainted control flow directed graph may include generating a revised SBOM excluding the code portion. At 1914, the process 1900 includes executing the process based on the revised control flow diagram to prevent execution of the vulnerability.

FIG. 20 illustrates an example process 2000 for inline control flow monitoring with enforcement, according to at least one example. At 2002, the process 2000 includes determining a learned control flow directed graph for a process executed on a computing system. Determining the learned control flow directed graph may include observing execution of the process until at least a threshold percentage of code associated with the process is observed.

At 2004, the process 2000 includes determining a system call during execution of the process. Determining the system call may include capturing, via a CPU of the computing system, telemetry associated with the process and maintaining, in memory of the computing system, a predetermined number of batches of the telemetry.

At 2006, the process 2000 includes determining a predetermined number of transitions leading to the system call. Determining the predetermined number of transitions may include determining transitions included in the predetermined number of batches of the telemetry.

At 2008, the process 2000 includes determining a validity for the predetermined number of transitions based at least in part on the learned control flow directed graph. Determining the validity of the predetermined number of transitions may include decoding the telemetry to determine transitions and comparing the transitions against the learned control flow directed graph.

At 2010, the process 2000 includes causing the computing system to perform an action based at least in part on the validity. The action may include determining an error in response to determining that at least one of the predetermined number of transitions is invalid based on the at least one of the predetermined number of transitions not being included in the learned control flow directed graph. The action may include performing the system call in response to determining that the predetermined number of transitions are included in the learned control flow directed graph.

Figure 21:
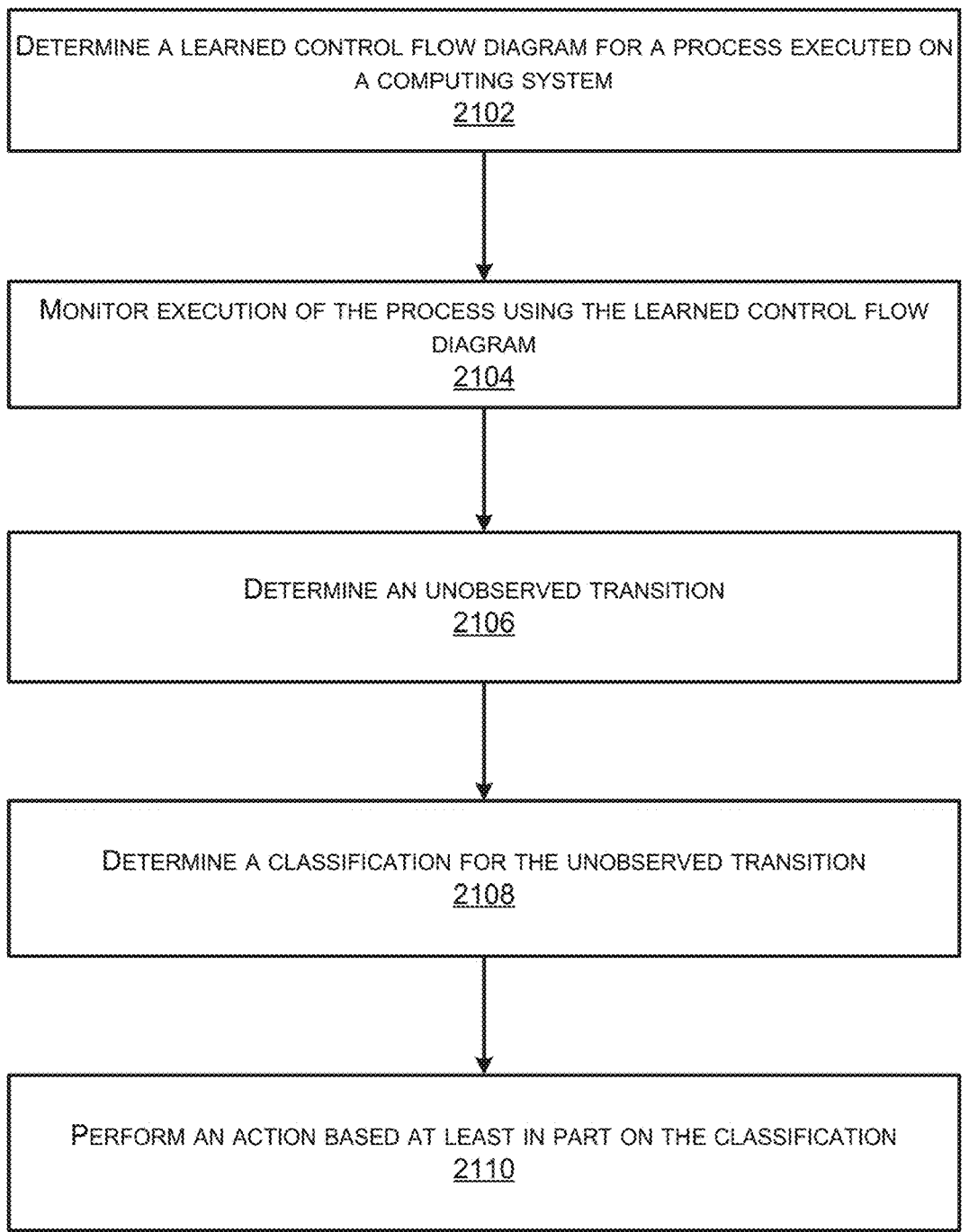
FIG. 21 illustrates an example process for reducing false positives by anticipating execution of unobserved code that is safe to execute, according to at least one execution example.

FIG. 21 illustrates an example process for reducing false positives by anticipating execution of unobserved code that is safe to execute, according to at least one example. At 2102, the process 2100 includes determining a learned control flow diagram for a process executed on a computing system by observing executions of transitions during an observation period.

At 2104, the process 2100 includes monitoring execution of the process on the computing system using the learned control flow diagram. At 2106, the process 2100 includes determining an unobserved transition of the process based at least in part on the learned control flow diagram not including the transition.

At 2108, the process 2100 includes determining a classification of safe or unsafe for the unobserved transition by analyzing, using a monitoring component, the unobserved transition. Analyzing the unobserved transition may include statically analyzing the transition. Determining the classification for the unobserved transition may include determining a context for the transition, performing a static analysis of the unobserved transition, determining the unobserved transition is safe in response to determining a reason for the transition based at least in part on the context and the static analysis, and determining the unobserved transition is unsafe in response to being unable to determine a reason for the transition based at least in part on the context and the static analysis. Determining the classification for the unobserved transition may include determining a type of transition for the unobserved transition, determining a destination for the unobserved transition, determining a characteristic of the destination, and determining the classification using a machine learned model using inputs of the type of transition, the destination, the characteristic of the destination, and the learned control flow directed graph. Determining the classification for the unobserved transition may include, determining a destination linked by the unobserved transition, and determining a risk score associated with the destination, and where the classification is based at least in part on the risk score of the destination. The risk score may further be based on at least one of a presence of a system call eventually at some location at the destination, permissions associated with the destination, a presence of propagating transitions to additional destinations, or a presence of the destination within the learned control flow directed graph. In some examples, the code reuse attacks may not lead to a system call but to some other action that may be identified based on the CFDG as an invalid transition even though it may not include a system call.

At 2110, the process 2100 also includes performing an action based at least in part on the safety classification and the learned control flow diagram. The action may include adding the unobserved transition to the learned control flow directed graph in response to the classification being safe.

FIG. 22 illustrates an example process for determining cloud-based vulnerability and exploit insights based on control flow monitoring in real-time across devices and systems, according to at least one example. At 2202, the process 2200 includes receiving a first report of a first anomaly from real-time control flow graph diagram monitoring of first application executions at a first computer system. At 2204, the process 2200 includes receiving a second report of a second anomaly from real-time control flow graph diagram monitoring of second application executions at a second computer system. The first report and the second report are anonymized to remove identifying information associated with the first computer system and the second computer system. The first report may include information describing the first anomaly, the first application, the first computer system, and a first client associated with the first computer system and the second report may include information describing the second anomaly, the second application, the second computer system, and a second client associated with the second computer system. The first application may be different from the second application.

At 2206, the process 2200 includes generating, using a machine learned model receiving inputs of the first report and the second report, application exploit report data.

At 2208, the process 2200 includes providing, to a cloud-based exploit reporting tool available to the first computer system and the second computer system, the application exploit report data. The application exploit report data may include information describing one or more characteristics shared between the first client and the second client including at least one of an application version or an industry sector. The application exploit report data identifies a portion of code within the first application related to the first anomaly, the portion of code determined based at least in part on the control flow directed graph for the first application. The first report may include geographic information related to the first anomaly, the second report may include second geographic information related to the second anomaly, and the application exploit report data may include geographic scope and location tracking of the anomaly.

FIG. 23 illustrates an example process for program disassembly using a learned control flow directed graph to inform indirect transfers within the program, according to at least one example. At 2302, the process 2300 includes determining a learned control flow directed graph for executable code of an application by observing executions of transitions within the executable code during an observation period. Determining the learned control flow directed graph may include observing at least a threshold percentage of the executable code.

At 2304, the process 2300 includes determining one or more destinations of indirect transfers within the executable code based on the learned control flow directed graph, the indirect transfers to be computed at run time of the executable code.

At 2306, the process 2300 includes determining a disassembly of the executable code based at least in part on the learned control flow directed graph, the one or more destinations of indirect transfers, and the executable code. Determining the disassembly may include using a linear disassembler or a recursive disassembler or other disassembler techniques. Determining the disassembly may also include providing the destinations as valid targets to a disassembler for the indirect transfers. Determining the disassembly may include importing the control flow directed graph and the executable code into a machine learned disassembler configured to determine valid destinations for indirect transfers within the executable code based at least in part on the control flow directed graph. Determining the disassembly may include performing disassembly of the executable code and providing the associated assembly code instructions as a result. In some examples this may also entail determining indirect transfers within the executable code, and providing the destinations as valid targets of the indirect transfers for the disassembly. Determining the disassembly may include determining full coverage of the executable code based at least in part on the control flow directed graph.

Figure 24:
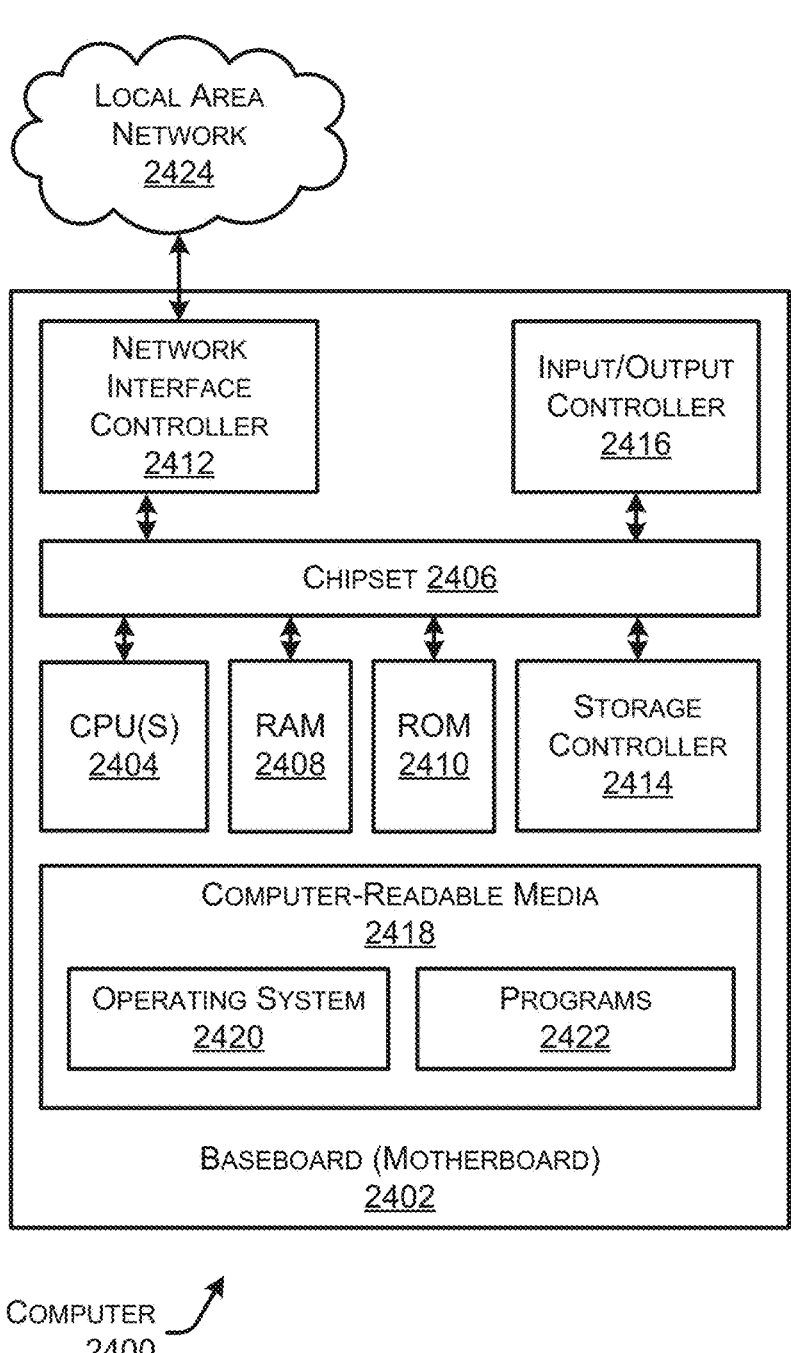
FIG. 24 is a computer architecture diagram showing an illustrative computer hardware architecture for implementing a computing device that can be utilized to implement aspects of the various technologies presented herein.

FIG. 24 is an architecture diagram for a computer 2400 showing an illustrative computer hardware architecture for implementing a computing device that can be utilized to implement aspects of the various technologies presented herein. The computer architecture shown in FIG. 2400 illustrates a conventional server computer, workstation, desktop computer, laptop, tablet, network appliance, e-reader, smartphone, or other computing device, and can be utilized to execute any of the software components presented herein. In some examples, the computer 2400 may be part of a system of computers, such as the local area network 2424 or other such devices described herein. In some instances, the computer 2400 may be included in a system of devices that perform the operations described herein.

The computer 2400 includes a baseboard 2402, or "motherboard," which is a printed circuit board to which a multitude of components or devices can be connected by way of a system bus or other electrical communication paths. In one illustrative configuration, one or more central processing units ("CPUs") 2404 operate in conjunction with a chipset 2406. The CPUs 2404 can be standard programmable processors that perform arithmetic and logical operations necessary for the operation of the computer 2400.

The CPUs 2404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 2406 provides an interface between the CPUs 2404 and the remainder of the components and devices on the baseboard 2402. The chipset 2406 can provide an interface to a RAM 2408, used as the main memory in the computer 2400. The chipset 2406 can further provide an interface to a computer-readable storage media 2418 such as a read-only memory ("ROM") 2410 or non-volatile RAM ("NVRAM") for storing basic routines that help to startup the computer 2400 and to transfer information between the various components and devices. The ROM 2410 or NVRAM can also store other software components necessary for the operation of the computer 2400 in accordance with the configurations described herein.

The computer 2400 can operate in a networked environment using logical connections to remote computing devices and computer systems through a network, such as the local area network 2424 or other networks, including for example the internet. The chipset 2406 can include functionality for providing network connectivity through a network interface controller (NIC) 2412, such as a gigabit Ethernet adapter. The NIC 2412 is capable of connecting the computer 2400 to other computing devices over the local area network 2424. It should be appreciated that multiple NICs 2412 can be present in the computer 2400, connecting the computer to other types of networks and remote computer systems.

The computer 2400 can include storage 2414 (e.g., disk) that provides non-volatile storage for the computer. The storage 2414 can consist of one or more physical storage units. The storage 2414 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 2400 can further read information from the storage 2414 by detecting the physical states or characteristics of one or more particular locations within the physical storage units.

In addition to the storage 2414 described above, the computer 2400 can have access to other computer-readable storage media 2418 to store and retrieve information, such as programs 2422, operating system 2420, data structures, or other data. It should be appreciated by those skilled in the art that computer-readable storage media 2418 is any available media that provides for the non-transitory storage of data and that can be accessed by the computer 2400. Some or all of the operations performed by any components included therein, may be performed by one or more computer(s) 2400 operating in a network-based arrangement.

By way of example, and not limitation, computer-readable storage media 2418 can include volatile and non-volatile, removable, and non-removable media implemented in any method or technology. Computer-readable storage media 2418 includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The computer-readable storage media 2418 can store an operating system 2420 utilized to control the operation of the computer 2400. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The computer-readable storage media 2418 can store other system or programs 2422 and data utilized by the computer 2400.

In one embodiment, the computer-readable storage media 2418, storage 2414, RAM 2408, ROM 2410, and/or other computer-readable storage media may be encoded with computer-executable instructions which, when loaded into the computer 2400, transform the computer from a general-purpose computing system into a special-purpose computer capable of implementing the embodiments described herein. These computer-executable instructions transform the computer 2400 by specifying how the CPUs 2404 transition between states, as described above. According to one embodiment, the computer 2400 has access to computer-readable storage media storing computer-executable instructions which, when executed by the computer 2400, perform the various techniques described above. The computer 2400 can also include computer-readable storage media having instructions stored thereupon for performing any of the other computer-implemented operations described herein.

The computer 2400 can also include one or more input/output controllers 2416 for receiving and processing input from a number of input devices, such as a keyboard, a mouse, a touchpad, a touch screen, an electronic stylus, or other type of input device. Similarly, an input/output controller 2416 can provide output to a display, such as a computer monitor, a flat-panel display, a digital projector, a printer, or other type of output device. It will be appreciated that the computer 2400 might not include all of the components shown in FIG. 24, can include other components that are not explicitly shown in FIG. 24, or might utilize an architecture completely different than that shown in FIG. 24.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for monitoring a computing system, comprising:

determining a learned control flow diagram for a process executed on a computing system by observing executions of transitions during an observation period during which safe executions of transitions are permitted to execute and be observed;

monitoring execution of the process on the computing system using the learned control flow diagram;

determining an unobserved transition of the process based at least in part on the unobserved transition not being represented in the learned control flow diagram;

determining a classification of the unobserved transition as being safe by analyzing, using a monitoring component, the unobserved transition; and performing an action based at least in part on the classification and the learned control flow diagram, the action including adding the unobserved transition to the learned control flow diagram.

2. The method of claim 1, wherein analyzing the unobserved transition comprises statically analyzing the transition.

3. The method of claim 1, wherein determining the classification for the unobserved transition comprises:

determining a context for the transition;

performing a static analysis of the unobserved transition; and determining the unobserved transition is safe in response to determining a reason for the transition based at least in part on the context and the static analysis.

4. The method of claim 1, wherein determining the classification for the unobserved transition comprises:

determining a type of transition for the unobserved transition;

determining a destination for the unobserved transition;

determining a characteristic of the destination; and determining the classification using a machine learned model using inputs of the type of transition, the destination, the characteristic of the destination, and the learned control flow diagram.

5. The method of claim 1, wherein determining the classification for the unobserved transition comprises:

determining a destination linked by the unobserved transition; and determining a risk score associated with the destination, and wherein the classification is based at least in part on the risk score of the destination.

6. The method of claim 5, wherein the risk score is further based on at least one of:

a presence of a system call at the destination;

permissions associated with the destination;

a presence of propagating transitions to additional destinations; or a presence of the destination within the learned control flow diagram.

7. A system comprising:

one or more processors; and one or more non-transitory computer-readable media storing computer-executable instructions that, when executed by the one or more processors, cause the one or more processors to perform operations comprising:

determining a learned control flow diagram for a process executed on a computing system by observing executions of transitions during an observation period during which safe executions of transitions are permitted to execute and be observed;

monitoring execution of the process on the computing system using learned control flow diagram;

determining an unobserved transition of the process based at least in part on the unobserved transition not being represented in the learned control flow diagram;

determining a classification of the unobserved transition as being safe by analyzing, using a monitoring component, the unobserved transition; and performing an action based at least in part on the classification and the learned control flow diagram, the action including adding the unobserved transition to the learned control flow diagram.

8. The system of claim 7, wherein determining the classification for the unobserved transition comprises:

determining a context for the transition;

performing a static analysis of the unobserved transition; and determining the unobserved transition is safe in response to determining a reason for the transition based at least in part on the context and the static analysis.

9. The system of claim 7, wherein determining the classification for the unobserved transition comprises:

determining a type of transition for the unobserved transition;

determining a destination for the unobserved transition;

determining a characteristic of the destination; and determining the classification using a set of heuristics defining the classification in response to the type of transition, the destination, the characteristic of the destination, and the learned control flow diagram.

10. The system of claim 7, wherein determining the classification for the unobserved transition comprises:

determining a destination linked by the unobserved transition; and determining a risk score associated with the destination, and wherein the classification is based at least in part on the risk score of the destination.

11. The system of claim 7, wherein determining the classification for the unobserved transition comprises:

determining a type of transition for the unobserved transition;

determining a destination for the unobserved transition;

determining a characteristic of the destination; and determining the classification using a machine learned model using inputs of the type of transition, the destination, the characteristic of the destination, and the learned control flow diagram.

12. The system of claim 7, wherein analyzing the unobserved transition comprises statically analyzing the transition.

13. One or more non-transitory computer-readable media storing computer-readable instructions that, when executed by one or more processors, cause the one or more processors to:

determine a learned control flow diagram for a process executed on a computing system by observing executions of transitions during an observation period during which safe executions of transitions are permitted to execute and be observed;

monitor execution of the process on the computing system using the learned control flow diagram;

determine an unobserved transition of the process based at least in part on the unobserved transition not being represented in the learned control flow diagram;

determine a classification of the unobserved transition as being safe by analyzing, using a monitoring component, the unobserved transition; and performing an action based at least in part on the classification and the learned control flow diagram, the action adding the unobserved transition to the learned control flow diagram.

14. The one or more non-transitory computer-readable media of claim 13, wherein:

the action comprises allowing execution of the unobserved transition in response to the classification being safe.

15. The one or more non-transitory computer-readable media of claim 13, wherein the instructions to determine the classification for the unobserved transition comprises further instructions to:

determine a context for the transition;

perform a static analysis of the unobserved transition; and determine the unobserved transition is safe in response to determining a reason for the transition based at least in part on the context and the static analysis.

16. The one or more non-transitory computer-readable media of claim 13, wherein the instructions to determine the classification for the unobserved transition comprises further instructions to:

determine a type of transition for the unobserved transition;

determine a destination for the unobserved transition;

determine a characteristic of the destination; and determine the classification using a set of heuristics defining the classification in response to the type of transition, the destination, the characteristic of the destination, and the learned control flow diagram.

17. The one or more non-transitory computer-readable media of claim 13, wherein the instructions to determine the classification for the unobserved transition comprises further instructions to:

determine a type of transition for the unobserved transition;

determine a destination for the unobserved transition;

determine a characteristic of the destination; and determine the classification using a machine learned model using inputs of the type of transition, the destination, the characteristic of the destination, and the learned control flow diagram.

18. The one or more non-transitory computer-readable media of claim 13, wherein the instructions to determine the classification for the unobserved transition comprises further instructions to:

determine a destination linked by the unobserved transition; and determine a risk score associated with the destination, and wherein the classification is based at least in part on the risk score of the destination.

\* \* \* \* \*